(12) United States Patent
Setlur et al.

(10) Patent No.: US 12,499,318 B1
(45) Date of Patent: Dec. 16, 2025

(54) USING MESSAGING SYSTEM THREADING FOR INTERPRETING NATURAL LANGUAGE ANALYTICAL CONVERSATIONS

(71) Applicant: Tableau Software, LLC, Seattle, WA (US)

(72) Inventors: Vidya Raghavan Setlur, Portola Valley, CA (US); Melanie K. Tory, Portland, ME (US)

(73) Assignee: Tableau Software, LLC, Seattle, WA (US)

( * ) Notice: Subject to any disclaimer, the term of this patent is extended or adjusted under 35 U.S.C. 154(b) by 374 days.

(21) Appl. No.: 17/589,825

(22) Filed: Jan. 31, 2022

Related U.S. Application Data

(60) Provisional application No. 63/243,043, filed on Sep. 10, 2021.

(51) Int. Cl.
  *G06F 40/35* (2020.01)
  *G06F 40/186* (2020.01)
  (Continued)

(52) U.S. Cl.
  CPC ............ *G06F 40/35* (2020.01); *G06F 40/186* (2020.01); *G06F 40/205* (2020.01);
  (Continued)

(58) Field of Classification Search
  CPC ...... G06F 40/35; G06F 40/186; G06F 40/205; G06F 40/253; G06F 40/284; G06F 40/40; H04L 51/02
  See application file for complete search history.

(56) References Cited

U.S. PATENT DOCUMENTS 7,302,383 B2  11/2007  Valles
7,603,267 B2  10/2009  Wang
(Continued)

OTHER PUBLICATIONS

Altinok, Duygu. "An ontology-based dialogue management system for banking and finance dialogue systems." (2018) (Year: 2018).*
(Continued)

*Primary Examiner* — Bhavesh M Mehta
*Assistant Examiner* — Nandini Subramani
(74) *Attorney, Agent, or Firm* — Morgan, Lewis & Bockius LLP

(57) ABSTRACT

A method uses natural language processing for visual analysis of a dataset, in a messaging application. The method includes receiving a first natural language (NL) input directed to a data source, in a messaging application. The first NL input includes at least one underspecified or ambiguous utterance. The method also includes parsing the first NL input into tokens based on a grammar and the data source. The method also includes generating and displaying an intermediate NL response, based on the tokens. In response to receiving a user input to provide missing information in the at least one underspecified or ambiguous utterance, the method includes generating an input query based on the user input and querying the data source using the input query, to obtain a result set. The method also includes generating and displaying a first NL output and a snapshot of a data visualization based on the result set.

14 Claims, 43 Drawing Sheets

(51) Int. Cl.
*G06F 40/205* (2020.01)
*G06F 40/253* (2020.01)
*G06F 40/284* (2020.01)
*G06F 40/40* (2020.01)
*H04L 51/02* (2022.01)

(52) U.S. Cl.
CPC .......... *G06F 40/253* (2020.01); *G06F 40/284*
(2020.01); *G06F 40/40* (2020.01); *H04L 51/02*
(2013.01)

(56) References Cited

U.S. PATENT DOCUMENTS

| | | | |
|---|---|---|---|
| RE44,418 E | 8/2013 | Dominach | |
| 9,299,173 B2 | 3/2016 | Rope | |
| 9,501,585 B1 | 11/2016 | Gautam | |
| 9,818,211 B1 | 11/2017 | Gibb | |
| 9,858,292 B1 | 1/2018 | Setlur | |
| 9,978,365 B2 | 5/2018 | Adler | |
| 10,331,720 B2 | 6/2019 | Neels | |
| 10,418,032 B1 | 9/2019 | Mohajer | |
| 10,515,121 B1 | 12/2019 | Setlur | |
| 10,546,001 B1 | 1/2020 | Nguyen | |
| 10,546,003 B2 | 1/2020 | Gupta | |
| 10,564,622 B1 | 2/2020 | Dean | |
| 10,565,196 B2* | 2/2020 | Das | G06F 16/24522 |
| 10,599,469 B2* | 3/2020 | Min | G06F 3/048 |
| 10,817,527 B1 | 10/2020 | Setlur | |
| 10,956,655 B2 | 3/2021 | Choe | |
| 11,055,489 B2* | 7/2021 | Djalali | G06F 3/0484 |
| 11,080,336 B2 | 8/2021 | Van Dusen | |
| 11,114,189 B2 | 9/2021 | Prosky | |
| 11,409,763 B1* | 8/2022 | Setlur | G06F 16/2457 |
| 11,720,240 B1 | 8/2023 | Setlur | |
| 12,182,526 B2* | 12/2024 | Vadella | G06F 40/58 |
| 2007/0129936 A1 | 6/2007 | Wang | |
| 2009/0313576 A1 | 12/2009 | Neumann | |
| 2010/0114944 A1 | 5/2010 | Adler | |
| 2011/0119047 A1 | 5/2011 | Ylonen | |
| 2012/0022872 A1 | 1/2012 | Gruber | |
| 2012/0035932 A1 | 2/2012 | Jitkoff | |
| 2012/0323948 A1 | 12/2012 | Li | |
| 2013/0249917 A1 | 9/2013 | Fanning | |
| 2013/0275138 A1 | 10/2013 | Gruber | |
| 2016/0092090 A1 | 3/2016 | Stojanovic | |
| 2017/0091277 A1 | 3/2017 | Zoch | |
| 2018/0032576 A1 | 2/2018 | Romero | |
| 2018/0039614 A1 | 2/2018 | Govindarajulu | |
| 2018/0068657 A1 | 3/2018 | Khan | |
| 2018/0129941 A1 | 5/2018 | Gustafson | |
| 2018/0137424 A1 | 5/2018 | Gabaldon | |
| 2018/0158245 A1 | 6/2018 | Govindan | |
| 2018/0203924 A1 | 7/2018 | Agrawal | |
| 2018/0210883 A1 | 7/2018 | Ang | |
| 2018/0316637 A1* | 11/2018 | Desjardins | H04L 65/4025 |
| 2018/0329987 A1 | 11/2018 | Tata | |
| 2018/0336009 A1 | 11/2018 | Yoganandan | |
| 2019/0121801 A1 | 4/2019 | Jethwa | |
| 2019/0138648 A1 | 5/2019 | Gupta | |
| 2019/0197605 A1 | 6/2019 | Sadler | |
| 2019/0236144 A1 | 8/2019 | Hou | |
| 2019/0384815 A1 | 12/2019 | Patel | |
| 2020/0065385 A1 | 2/2020 | Dreher | |
| 2020/0075002 A1 | 3/2020 | Pufahl | |
| 2020/0089700 A1 | 3/2020 | Ericson | |
| 2020/0089760 A1 | 3/2020 | Ericson | |
| 2020/0110779 A1 | 4/2020 | Setlur | |
| 2020/0110803 A1 | 4/2020 | Djalali | |
| 2020/0134103 A1 | 4/2020 | Mankovskii | |
| 2020/0312318 A1 | 10/2020 | Olson | |
| 2020/0356629 A1* | 11/2020 | Tan | G06F 40/289 |
| 2021/0209292 A1* | 7/2021 | Varma | H04L 51/216 |
| 2022/0277145 A1 | 9/2022 | Lin | |
| 2022/0318261 A1 | 10/2022 | Setlur | |
| 2023/0134235 A1 | 5/2023 | Setlur | |

OTHER PUBLICATIONS

Setlur, Vidya, Melanie Tory, and Alex Djalali. "Inferencing underspecified natural language utterances in visual analysis." Proceedings of the 24th International Conference on Intelligent User Interfaces. 2019 (Year: 2019).*

Setlur, Office Action, U.S. Appl. No. 17/589,813, filed May 28, 2024, 35 pgs.

* cited by examiner

Figure 7B

USING MESSAGING SYSTEM THREADING FOR INTERPRETING NATURAL LANGUAGE ANALYTICAL CONVERSATIONS

CROSS-REFERENCE TO RELATED APPLICATIONS

This application claims priority to U.S. Provisional Application Ser. No. 63/243,043, filed Sep. 10, 2021, entitled "Multi-Modal Natural Language Interfaces for Data Exploration," which is incorporated by reference herein in its entirety.

This application is related to U.S. patent application Ser. No. 17/589,813, filed Jan. 31, 2022, entitled "Optimizing Natural Language Analytical Conversations Using Platform-Specific Input and Output Interface Functionality," which is incorporated by reference herein in its entirety.

TECHNICAL FIELD

The disclosed implementations relate generally to data visualization and more specifically to systems, methods, and user interfaces that enable users to interact with and explore datasets using a conversational interface.

BACKGROUND

Conversational interfaces (CIs) such as smart assistants and chatbots have become prevalent for tasks ranging from simple fact-finding (e.g., asking for the weather) to question-and-answer scenarios, such as making a restaurant reservation. CIs constitute a distinctive form of interaction that borrows patterns from natural human conversation. With access to online resources, increased computational power, and machine-learning, CIs have come a long way from early natural language programs that were fraught with difficulty in user understanding; they are now more conversational and understand reasonably complex utterances within known contexts.

Recently, natural language (NL) interfaces for visual analysis tools have garnered interest in supporting expressive ways for users to interact with their data and see results expressed as visualizations. Users interact with a dataset or a visualization and can change the data display by filtering, navigating, and seeking details-on-demand. In these information-seeking conversations, the user may express their intent using NL input, and the system provides visualization responses. The analytical experience focuses on keeping the user in the flow of conversation. These interfaces are often designed for a specific platform or modality, with user intent understanding constrained by the domain of the knowledge base or context in which the interaction occurs. Furthermore, these conversational interfaces tend to focus on natural language only as an input mechanism, not as part of the system response.

SUMMARY

The promise that natural language brings to users for broadening the accessibility of visual analysis tools has led to a proliferation of new potential entry points, platforms, and styles of interaction. An emerging interaction modality is the analytical chatbot, a software application that engages in a back-and-forth natural language dialogue with the user about data. Like other types of chatbots, analytical chatbots are designed to simulate the way a human would act as a conversational partner, and therefore need to employ natural language as both an input and output mechanism. They may additionally employ visualizations in their responses. When compared to existing NL interfaces for visual analysis, analytical chatbots have a different style of interaction and more "agent-like" behavior.

The emergence of analytical bots as mediators of data analysis activities presents new challenges and opportunities, some of which are addressed using techniques described herein. Merely repurposing how user intent is interpreted for one type of NL interface in another does not always lead to precise interpretation. Therefore, some implementations consider the interplay of natural language and visualization components in how a bot responds to user questions. To build functionally intuitive natural language interfaces on chatbot platforms, some implementations automatically understand how users interact in these information-seeking environments. Identifying the interaction design space for these platforms helps develop NL techniques for effectively analyzing and characterizing user interactions and utterance intent.

In accordance with some implementations, a method executes at an electronic device with a display, one or more processors, and memory. For example, the electronic device can be a smart phone, a tablet, a notebook computer, or a desktop computer. The method includes receiving a first natural language (NL) input directed to a data source, in the messaging application. The first NL input includes at least one underspecified or ambiguous utterance. The method also includes parsing the first NL input into tokens based on a grammar and the data source. In some implementations, parsing the tokens includes resolving the tokens as data attributes and values, intent lexicons, or modifiers.

The method also includes generating and displaying, in the messaging application, an intermediate NL response, based on the tokens. The method also includes, in response to receiving a user input to provide missing information in the at least one underspecified or ambiguous utterance: generating an input query based on the user input; and querying the data source using the input query, to obtain a result set; and generating and displaying a first NL output and a snapshot of a data visualization, in the messaging application, based on the result set. In some implementations, generating and displaying the snapshot of the data visualization includes, in accordance with a determination that a response to the input query requires a single answer, displaying the single answer in the messaging application.

In some implementations, the method further includes: receiving a second NL input directed to the data source, in the messaging application, in response to the first NL output; and in accordance with a determination that the second NL input corresponds to a follow-up question, generating and displaying an NL response to the follow-up question, in the messaging application, as a new thread.

In some implementations, the method further includes: subsequently receiving a second NL input in the messaging application; detecting an anaphora in the second NL input; and in accordance with a determination that the anaphora corresponds to a follow-up utterance, generating and displaying a second NL output in a same thread as the first NL output.

In some implementations, the method further includes: subsequently receiving a second NL input in the messaging application; detecting an anaphora in the second NL input; and in accordance with a determination that the anaphora corresponds to a reset utterance, identifying a break in conversational flow where context should be reset, and generating and displaying a second NL output in a thread different from the first NL output.

In some implementations, the method further includes: generating alternatives and interpretations for terms in the first NL input. The alternatives include one or more alternative analytical functions, updates to one or more attributes, and/or value filters; providing one or more affordances, in the messaging application, to refine and/or repair the alternatives and interpretations; and generating the input query based on a selection of the one or more affordances.

In some implementations, the method further includes: in accordance with a determination that disambiguation is not possible or other viable interpretations are possible, generating and displaying, in the messaging application, a second intermediate NL response that asks for clarification as to data attributes or data range of values to filter. In some implementations, the method further includes: in accordance with a determination that one or more terms in the first NL input require clarification, simultaneously generating and displaying, in the messaging application, a textual explanation relevant to context of the data source.

In some implementations, the method further includes: selecting an expression type for the first NL input from amongst aggregation, grouping, filtering, limiting and sorting; and selecting and displaying a response from a predefined template of responses based on the expression type.

In some implementations, the method further includes: identifying intent for the first NL input based on detecting at least one predetermined term for: (i) starting a new conversation; (ii) comparing two values in a field; (iii) providing a clarifying response; or (iv) providing a specific visualization type; and generating the intermediate NL response, the input query, the first NL output, and/or the snapshot of the data visualization, further based on the intent.

In some implementations, generating and displaying the intermediate NL response includes providing one or more affordances that correspond to alternatives for resolving ambiguity in the at least one underspecified or ambiguous utterance; and receiving the user input includes receiving a selection of the one or more affordances corresponding to an alternative that resolves ambiguity in the at least one underspecified or ambiguous utterance.

In some implementations, generating and displaying the intermediate NL response includes providing missing information in the at least one underspecified or ambiguous utterance, to create a valid query against the data source; and receiving the user input includes receiving a confirmation that the missing information fills in for underspecified information in the at least one underspecified or ambiguous utterance.

In some implementations, the messaging application includes a plurality of threads, and the first NL input is received in a first thread of the plurality of threads, and the method further includes generating the intermediate NL response, the input query, the first NL output, and/or the snapshot of the data visualization, further based on a context of the first thread.

In another aspect, a method is provided for analysis of a dataset based on input and/or output modalities of clients. The method executes at an electronic device with a display, one or more processors, and memory. For example, the electronic device can be a smart phone, a tablet, a notebook computer, or a desktop computer. The method includes receiving a first natural language (NL) input directed to a data source, from a first client. The method also includes parsing the first NL input into tokens based on a grammar and the data source. The method also includes generating and outputting an intermediate NL response, to a second client, based on the tokens and output modality of the second client. The method also includes in response to receiving, from the second client, a user input to provide missing information in the first NL input: generating an input query based on the user input; and querying the data source using the input query, to obtain a result set. The method also includes generating and outputting, to the second client, a first NL output and a snapshot of a data visualization, based on the result set and the output modality of the second client.

In some implementations, the method further includes: in accordance with a determination that the first NL input includes at least one ambiguous utterance: in accordance with a determination that the output modality of the second client includes a display: providing, in an interface on the display of the second client, one or more affordances, that correspond to alternatives for resolving ambiguity in the at least one ambiguous utterance; and receiving, from the second client, a selection of the one or more affordances corresponding to an alternative that resolves ambiguity in the at least one ambiguous utterance; and in accordance with a determination that the output modality of the second client includes voice-only responses: generating and playing, on the second client, a speech output of a textual explanation relevant to context of the data; and receiving, from the second client, a voice input that resolves ambiguity in the at least one ambiguous utterance.

In some implementations, the method further includes: in accordance with a determination that the first NL input includes at least one underspecified utterance: generating missing information in the at least one underspecified utterance, to create a valid query against the data source; in accordance with a determination that the output modality of the second client includes a display: providing, in an interface on the display of the second client, the missing information; in accordance with a determination that the output modality of the second client includes voice-only responses: generating and playing, on the second client, a speech output corresponding to the missing information; and receiving the user input comprises receiving, from the second client, a confirmation that the missing information fills in for underspecified information in the at least one underspecified utterance.

In some implementations, the method further includes: in accordance with a determination that the intermediate NL response requires refinement or repair: generating alternatives and interpretations for terms in the first NL input, wherein the alternatives include one or more alternative analytical functions, updates to one or more attributes, and/or value filters; in accordance with a determination that the output modality of the second client includes a display: providing, in an interface on the display of the second client, one or more affordances to refine and/or repair the alternatives and interpretations; and generating the input query based on a selection of the one or more affordances on the second client; and in accordance with a determination that the output modality of the second client includes voice-only responses: generating and outputting, on the second client, speech output, based on alternatives and interpretations, for eliciting clarification through a series of verbal actions; and generating the input query based on a clarifying user input on the second client.

In some implementations, the method further includes: prior to receiving the first NL input: in accordance with a determination that the output modality of the first client includes a display: generating and displaying, on the first client, a brief summary of the data source on the display of the first client; and in accordance with a determination that the output modality of the second client includes voice-only responses: generating and playing, on the first client, a speech output corresponding to a brief textual summary of the data source.

In some implementations, the method further includes: selecting an expression type for the first NL input from amongst aggregation, grouping, filtering, limiting and sorting; selecting a response from a pre-defined template of responses based on the expression type; in accordance with a determination that the output modality of the second client includes voice-only responses: generating and playing, on the second client, (i) a speech output corresponding to the response and (ii) a follow-up question; and in accordance with a determination that the output modality of the second client includes a display: generating and displaying, on the second client, a screenshot of a corresponding visualization for the response. In some implementations, the system uses previous user history and/or training data instead of, or in addition to, pre-defined templates of responses. In some implementations, templates are created based on previous user history and/or training data.

In some implementations, generating and outputting the snapshot of the data visualization comprises: in accordance with a determination that (i) the query response requires a single answer and (ii) the second client is a messaging application: displaying the single answer in the messaging application.

In some implementations, the second client is a messaging application, the method further includes: subsequently receiving a second NL input in the messaging application; detecting an anaphora in an utterance in the second NL input; in accordance with a determination that the anaphora corresponds to a follow-up utterance: generating and displaying a second NL output in a same thread as the first NL output.

In some implementations, the first client and the second client are different applications. In some implementations, the first client and the second client are a same application executing on different devices. In some implementations, input modality of the first client is different from the output modality of the second client.

In some implementations, generating and outputting the intermediate NL response and/or the first NL output to the second client includes: storing context and/or session information for user interactions on the first client; and retrieving the context and/or session information for the user interactions on the first client and generating the intermediate NL response and/or the first NL output based on the context and/or session information.

Typically, an electronic device includes one or more processors, memory, a display, and one or more programs stored in the memory. The programs are configured for execution by the one or more processors and are configured to perform any of the methods described herein. The one or more programs include instructions for displaying a data visualization based on a first dataset retrieved from a database using a first set of one or more queries. The one or more programs also include instructions for performing any of the methods described herein.

In some implementations, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow users to efficiently explore data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 7A-7E show example interactions between a user and a chatbot, via a conversational interface, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
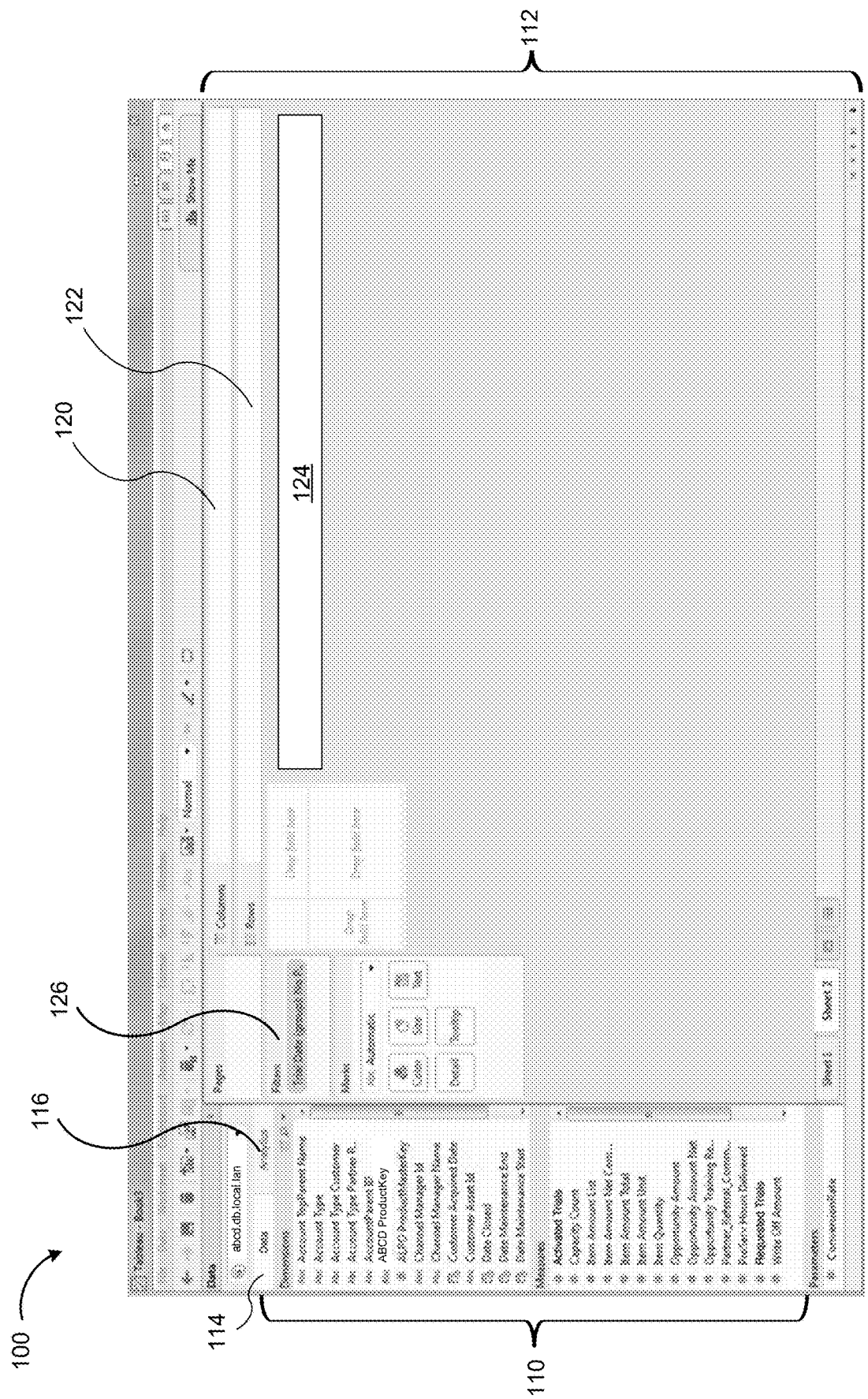
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
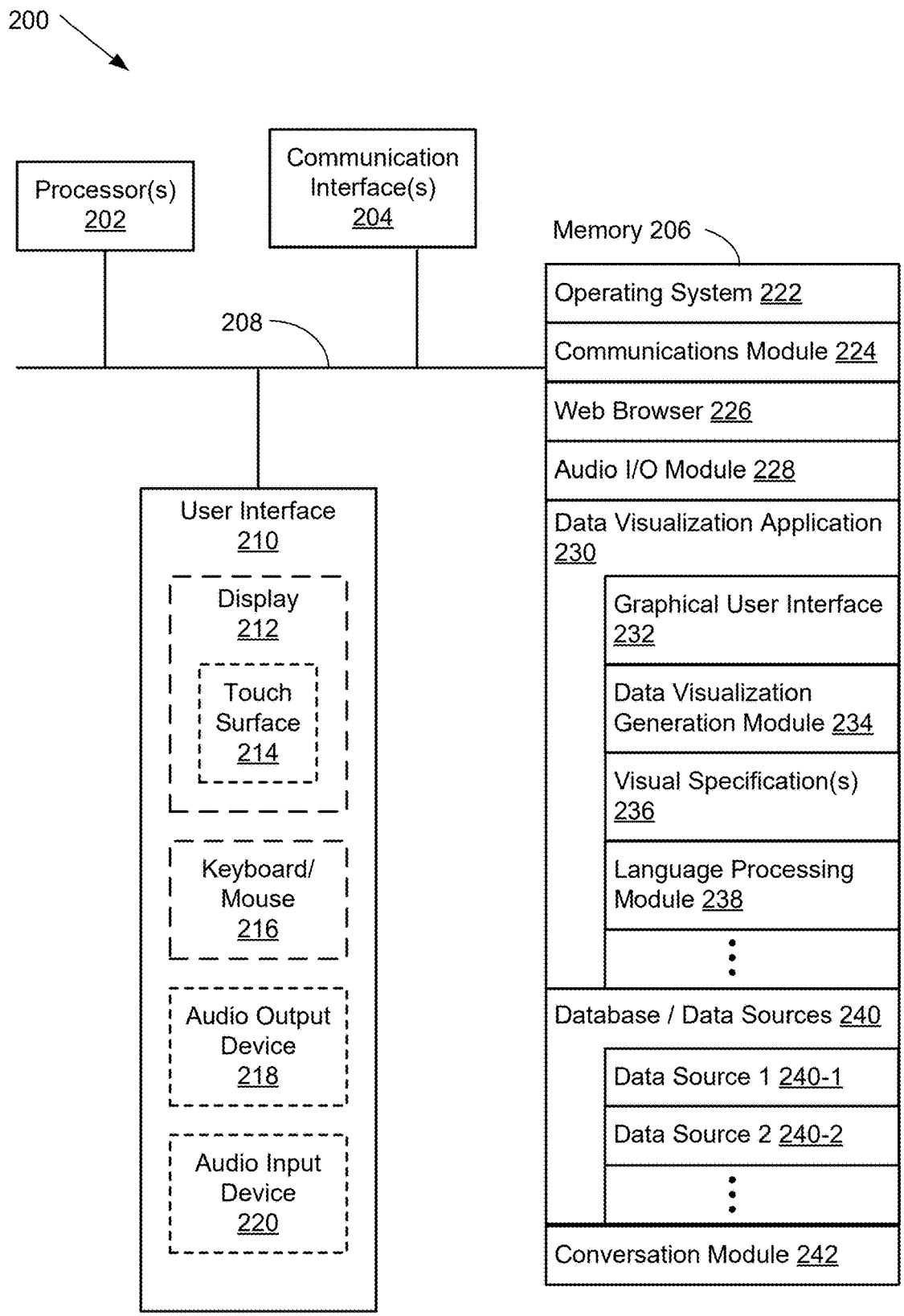
FIG. 2 is a block diagram of a computing device according to some implementations.

FIG. 2 is a block diagram illustrating a computing device 200 that can be used for analysis of a dataset using natural language in accordance with some implementations. In some implementations, the computing device 200 can display the graphical user interfaces 100. In some implementations, the computing device 200 can be used for analysis of a dataset in a messaging application using natural language. In some implementations, the computing device 200 can be used for interfacing with devices with different input or output modalities (e.g., smart phones, an iPad, Amazon Echo, Bluetooth device). Various examples of the computing device 200 include a desktop computer, a laptop computer, a tablet computer, and other computing devices that have a display and a processor capable of running a data visualization application 230. The computing device 200 typically includes one or more processing units/cores (CPUs) 202 for executing modules, programs, and/or instructions stored in memory 206 and thereby performing processing operations; one or more network or other communications interfaces 204; memory 214; and one or more communication buses 208 for interconnecting these components. The communication buses 208 may include circuitry that interconnects and controls communications between system components.

The computing device 200 includes a user interface 210. In some implementations, the user interface 210 includes a display device 212 and/or one or more input devices or mechanisms. In some implementations, the input device/mechanism includes a keyboard or mouse 216. In some implementations, the input device/mechanism includes a "soft" keyboard, which is displayed as needed on the display device 212, enabling a user to "press keys" that appear on the display 208. In some implementations, the display 212 and input device/mechanism comprise a touch screen display 214 (also called a touch sensitive display or a touch surface). Some implementations include an audio input device 220 for inputting audio to the computing device 200, and/or an audio output device 218 to output audio (e.g., speech output).

In some implementations, the memory 206 includes high-speed random-access memory, such as DRAM, SRAM, DDR RAM or other random access solid state memory devices. In some implementations, the memory 206 includes non-volatile memory, such as one or more magnetic disk storage devices, optical disk storage devices, flash memory devices, or other non-volatile solid state storage devices. In some implementations, the memory 206 includes one or more storage devices remotely located from the CPU(s) 202. The memory 206, or alternatively the non-volatile memory devices within the memory 206, comprises a non-transitory computer readable storage medium. In some implementations, the memory 206, or the computer readable storage medium of the memory 206, stores the following programs, modules, and data structures, or a subset thereof:

- an operating system 222, which includes procedures for handling various basic system services and for performing hardware dependent tasks;
- a communications module 224, which is used for connecting the computing device 200 to other computers and devices via the one or more communication network interfaces 208 (wired or wireless) and one or more communication networks, such as the Internet, other wide area networks, local area networks, metropolitan area networks, and so on;

- optionally, a web browser 226 (or other application capable of displaying web pages), which enables a user to communicate over a network with remote computers or devices;
- optionally, an audio input/output module 228 for processing audio or speech input and/or output (e.g., for converting speech to text and/or text to speech);
- a data visualization application 230, which provides a data visualization user interface 232 (e.g., the graphical user interface 100) for a user to construct visual graphics and/or ask natural language queries. For example, a user selects one or more data sources 240 (which may be stored on the computing device 200 or stored remotely), selects data fields from the data sources and/or searches for data fields from the data sources that match a natural language query, and uses the selected fields to define a visual graphic. In some implementations, the data visualization user interface 232 generates snapshots of data visualizations for display in a conversational interface (e.g., Slack or Teams). In some implementations, the snapshots are generated based on a form factor (e.g., size, memory requirements) of an output device that displays the snapshot. In some implementations, the information the user provides is stored as a visual specification 236. The data visualization application 230 includes a data visualization generation module 234, which takes the user input (e.g., the visual specification 236), and generates a corresponding visual graphic (also referred to as a "data visualization" or a "data viz"). In some implementations, the data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server. In some implementations, the data visualization application 230 includes a language processing module 238 for processing (e.g., interpreting) commands provided by a user of the computing device. In some implementations, the commands are natural language commands (e.g., captured by an audio input device). In some implementations, the language processing module 238 includes sub-modules, such as an autocomplete module, a pragmatics module, and/or an ambiguity module. In some implementations, the language processing module also includes a natural language generation (NLG) module for generating natural language output. In some implementations, the language processing module parses natural language input into tokens (thereby resolving the tokens as, for e.g., data attributes and values, intent lexicons, or modifiers) based on grammar rules (may be specific to a data source) and the data source. In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206;
- zero or more databases or data sources 240 (e.g., a first data source 240-1 and a second data source 240-2), which are used by the data visualization application 230. In some implementations, the data sources are stored as spreadsheet files, CSV files, XML files, or flat files, or stored in a relational database; and
- a conversation module 242 that processes user input, via a conversational interface (e.g., interfaces described below in reference to FIGS. 3 and 4), and generates text, audio, and/or visualization responses based on question types and/or user preferences, and/or output of the data visualization application 230.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated. Operations of the modules shown in the memory 206 are further described below in reference to FIGS. 6, 13A-13L, and 14A-14H, according to some implementations. Interfaces shown and described below in reference to other figures provide illustrations.

Some implementations allow users to effectively utilize functionality provided by data visualization applications. Some implementations provide a natural language interface as part of a data visualization application (e.g., within the user interface for the data visualization application) for an interactive query dialog that provides graphical answers to natural language queries. The natural language interface allows users to access complex functionality using ordinary questions or commands. Questions and insights often emerge from previous questions and patterns of data that a person sees. By modeling the interaction behavior as a conversation, the natural language interface can apply principles of pragmatics to improve interaction with visual analytics. Through various techniques for deducing the grammatical and lexical structure of utterances and their context, the natural language interface supports various pragmatic forms of natural language interaction with visual analytics. These pragmatic forms include understanding incomplete utterances, referring to entities within utterances and visualization properties, supporting long, compound utterances, identifying synonyms and related concepts, and 'repairing' responses to previous utterances. Furthermore, the natural language interface provides appropriate visualization responses either within an existing visualization or by creating new visualizations when necessary, and resolves ambiguity through targeted textual feedback and ambiguity widgets. In this way, the natural language interface allows users to efficiently explore data displayed (e.g., in a data visualization) within the data visualization application.

Some implementations analyze conversational threads and interactive responses to support repair and refinement of natural language utterances for visual analytics of datasets and data exploration. The techniques described herein can be applied to analytical chatbots, for interpreting users' intent, helping with data orientation, and/or establishing trust and provenance through appropriate system responses. CIs for data exploration constitute a distinctive form of interaction based on the form factors and modalities of the platform. The techniques can be used for creating useful experiences for visual analysis tasks in these CIs. Text interaction via a CI (e.g., Slack) elicit a variety of analytical questions beyond simple fact-finding, often involving multi-turn conversation threads.

Some users use terms, such as "clear" and "start over," to explicitly reset the context. Many users use anaphora such as "that chart" to refer to the current context. This usage pattern is pronounced in conversational interfaces, such as Slack. Some implementations leverage native threads in platforms like Slack to explicitly provide feedback to the system that a user intends to follow-up on a previous conversation. In this way, the problem of automatically detecting follow-up versus a new utterance in voice-based interaction may be addressed.

As described above, chatbots have garnered interest as conversational interfaces for a variety of tasks. While general design guidelines exist for chatbot interfaces, conventional analytical chatbots do not support conversing with data. Gricean Maxims can help inform the basic design of effective conversational interaction. Natural language interfaces for data exploration can support ambiguity and intent handling.

Figure 3:
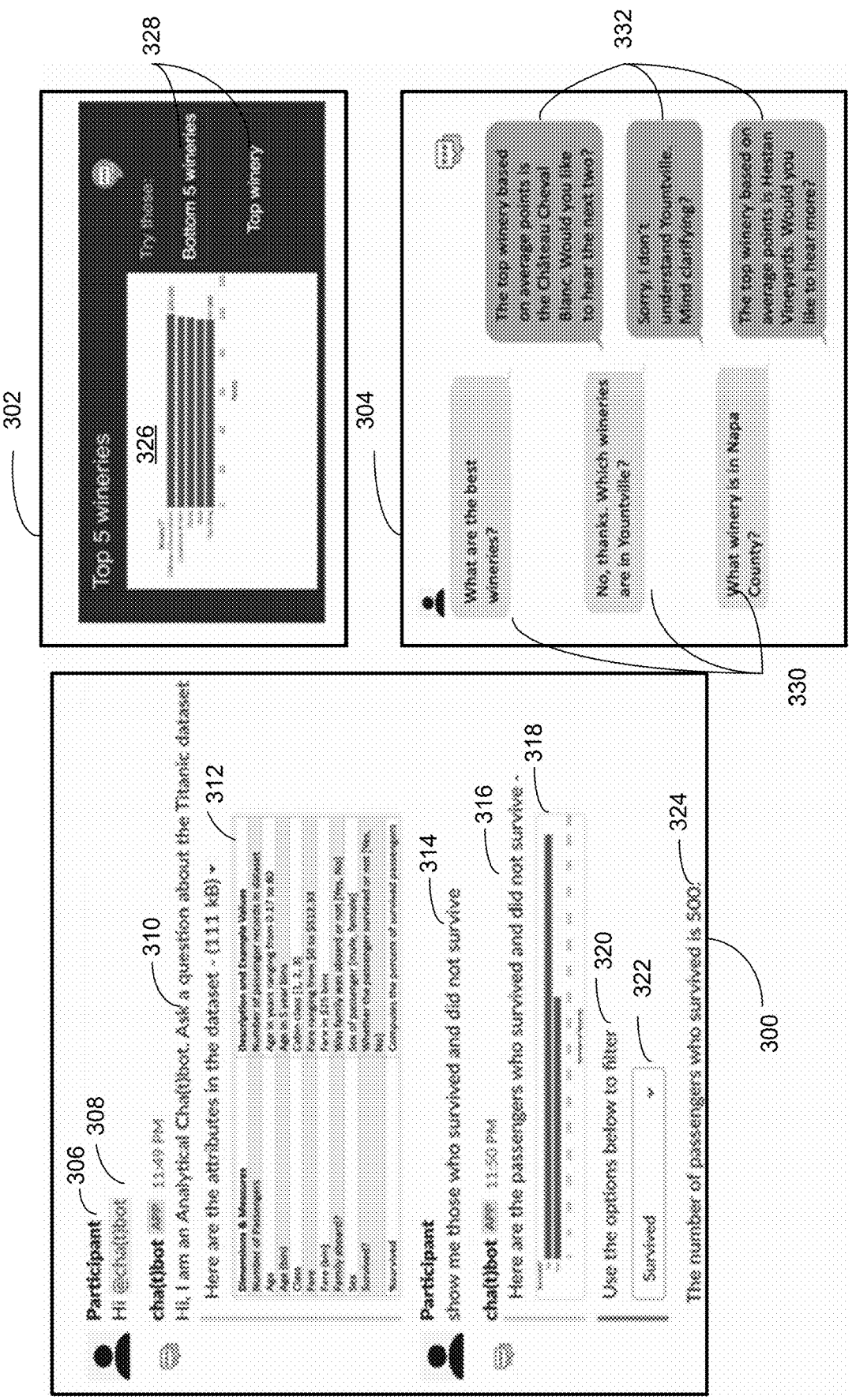
FIG. 3 illustrates examples of user interaction with data within text- and voice-based chatbots, according to some implementations.

FIG. 3 shows example conversational interfaces where participants are conversing with various analytical chatbots, according to some implementations. Example interface 300 shows a Slack chatbot showing an interactive message with a drop-down menu to help a user refine a previous response within the conversation thread. After a participant 306 initiates a conversation (by typing "Hi @chatbot" 308), the chatbot responds by displaying "Hi, I am an Analytical Chatbot. Ask a question about the Titanic dataset" 310, and provides a listing 312 of attributes in the dataset. The participant asks "show me those who survived and did not survive" 314, to which the chatbot responds with a message 316 ("Here are the passengers who survived and did not survive"), and shows a chart 318. The chatbot also displays a message 320 ("Use the options below to filter"), and provides options (or drop-down menu) 322 to filter. After the filter is selected (Survived, in this example), the chatbot displays a message 324 ("The number of passengers who survived is 500"). Example interface 302 shows interaction with an Echo Show chatbot simulator screen showing the top 5 wineries result 326 along with two other follow-up utterance options 328 on the right side of the screen. Example interface 304 shows interaction with an Echo chatbot. The grey text bubbles 330 indicate voice transcripts from the participants while the blue ones 332 are responses from the chatbot. Follow-up questions and feedback from the chatbot encourage conversational behavior.

Chatbot design often draws inspiration from human-to-human conversation and mechanisms that facilitate the exchange of information between speaker and listener. In such conversations, there is an expectation that the information shared is relevant and that intentions are conveyed. Grice's Cooperative Principle (CP) states that participants in a conversation normally attempt to be truthful, relevant, concise, and clear. Consider this conversation snippet:

Lizzie: Is there another carton of juice?
Milo: I'm going to the supermarket in a few minutes!

A human who reads the above conversation can easily infer that at the moment there is no juice, and that juice will be bought from the supermarket soon. Examples like these prompted Grice to propose various maxims where the CP explains the implication process. Grice argued that the generation and perception of implicatures are based on the following principle: "Make your conversational contribution such as is required, at the stage at which it occurs, by the accepted purpose or direction of the talk exchange in which you are engaged." Though these Gricean Maxims have provided some guidance for human-computer mediated communication, conventional systems fail to support cooperative conversation when a user is specifically exploring data with the help of an agent. In this cooperative framework, some implementations provide visualization and/or language response, when appropriate.

Some implementations support users' data exploration in chatbot interfaces for commonly available modalities, ranging from text interaction with visual responses in a medium like Slack to voice-based interaction commonly found in smart assistants. Understanding the structure of a single utterance and its semantic content is not enough to have a complete understanding of the conversational context. Pragmatic reasoning that understands the context and intent of the conversation lends itself to a more engaging experience. The interaction design space for implementing conversational experiences for chatbots can be vast and vague. Despite the importance of pragmatic processing, evaluating the quality of conversation is difficult to determine. While grammars and well-defined language rules can address syntactic and semantic handling of individual input utterances, there is no gold standard to evaluate the quality of a chatbot with respect to its conversational behavior. In order to ground the possible variants in this conversational design space to specific conversational characteristics, chatbot developers are often guided by Grice's cooperative principles that describe how speakers act cooperatively to be mutually understood for effective communication. Grice divided the cooperative principle into four conversational maxims. Described below are details on each of the maxims and how each maxim is applied to chatbot design, specifically guidelines for effective system responses and interaction behavior.

Maxim of Quantity: Be informative. Provide all the information necessary for the purpose of the current conversational exchange. Do not make contribution more informative than is required but ensure that the response addresses the intent in the question. For example, the conversation snippet below has just the right amount of information about the nearest store along with its opening time.

human: "When does the nearest grocery store open?"

chatbot: "The nearest grocery store is at 48 Main Street and it opens at 8:00 am."

Violations of this maxim are either a terse chatbot response saying, "8:00 am" or too detailed a response such as, "There are three grocery stores located within a radius of 10 miles. The nearest store is 1.4 miles away at 48 Main Street and opens at 8:00 am."

Maxims of Quality: Be truthful. Avoid stating information that what is believed might be wrong, unless there is some compelling reason to do so. If the system does choose to include it, then provide a disclaimer that points out doubts regarding this information. Avoid including information that cannot be supported by evidence. For example, in the conversation snippet below, the chatbot greets the human and sets the appropriate expectations regarding its capabilities of understanding the conversation.

chatbot: "Welcome! I'm a virtual assistant that can help you book a concert ticket. You can ask me simple questions or follow my lead. Remember that I'm not a human and can't understand everything. Shall we start?"

values to filter the query to. In this case, the chatbot could infer Sales and/or Profit as the relevant attributes with some pre-defined range filters. The chatbot should present a concise text or verbal explanation of its inferences that is relevant to the context of the data. If there are other viable interpretations, the chatbot should provide follow-up options to present alternatives to the user. If disambiguation is not possible, the chatbot should request help from the user to explicitly clarify the utterance. A message introducing the clarification request could include phrases such as, "Did you mean . . . ", "Was this answer helpful?", or "This is what I could find . . . ."

DP6: Refinement and repair: Complementary to the handling of ambiguity and under-specification, chatbots should provide interface affordances (visual or language) so users can refine and repair system choices and interpretations. In a GUI context, graphical elements, such as buttons, images, and menus could be mixed into the interaction alongside NL input. These elements can enable the user to choose alternative analytical functions (e.g. 'average' instead of 'count'), options to change or include other data attributes, and value filters for updating the system response and visualization. Voice-only chatbots need to elicit clarification through a series of verbal actions that are presented one at a time. For example, "how about adjusting young to be 12 and under instead?"

Some implementations are based on design goals for text and voice chatbot experiences described below.

Voice-Based Interaction

Voice-based chatbots recognize and interpret independent commands; multi-turn conversation is typically limited to remembering an intent only until dependent details are elicited. For example, a follow-up chatbot's response to a user's utterance "I need to make an appointment" could be "for what time?".

Text-Based Interaction

These interfaces also recognize NL and support multi-turn exchanges. However, text-based interfaces return additional text information as part of the responses rather than just nonverbal actions. The utterances tend to be verbose with related utterances pertaining to a particular conversational topic occurring together.

Conversational Support

Contemporary chatbots employ conversational turn-taking, so users do not need to specify all the details at once. The chatbot understands context between sequential utterances and anaphoric references to prior utterances (e.g. "What did you mean by that?", "how about adding coffee beans to the order"). Responses may be relatively short; rather than giving the user a long and thorough response, the system breaks the same content into smaller chunks, returns the most relevant chunk first, and allows the user to add follow-up clarification as needed.

Repair and Refinement

Conversational interaction for text-based chatbots is often mixed-initiative, drawing design principles from graphical, web and mobile interfaces, which rely on direct manipulation. Graphical elements, such as buttons, images, and menus, are mixed into the interaction alongside NL input. These widgets improve the interpretation of user intent by providing affordances to repair and refine the responses. For example, the chatbot could ask, "Was this answer helpful?" along with buttons for 'yes' and 'no'. While text-based chatbots can support repair and refinement through visual elements, voice-only chatbots need to elicit clarification through verbal actions.

Some implementations provide chatbot interfaces and/or analytical chatbot systems (e.g., chatbots for human-data interaction) based on the general design guidelines or goals described above. In some implementations, platform and modality differences influence users' analysis workflows. Some implementations support text and voice-based CIs, based on observed conversational behavior and user expectations when users explore and ask questions about data. Some implementations support three or more platforms (e.g., voice-only, voice with visual responses, and text-based). In some implementations, the CIs automatically select between different platforms based on the characteristics of natural language (NL) utterances (e.g., whether an utterance is input via text or via a voice command). Some implementations determine a type of ambiguous and under-specified questions users ask with these modalities (e.g., voice, text) to determine and output an appropriate response. Some implementations generate a response based on past user expectations. For example, system responses are based on user preferences for a text or voice response, whether users prefer to see charts along with a text or voice response, and/or users' expectations of the charts shown in response to NL questions. Some implementations provide different modalities for user feedback to repair system behavior when the result provided by the system is unexpected.

Some implementations provide NL interfaces for visual analysis on communication platforms, such as Slack, and smart assistant devices, such as Alexa. Some implementations collect NL utterances, plus qualitative data on user expectations, to determine future responses. Some implementations collect and/or use data for different modalities (e.g., text interaction using Slack, voice interaction using a Bluetooth speaker device, voice interaction using an iPad). Some implementations collect and/or analyze data for individual users. Some implementations perform the data collection and analysis for a set of users. Some implementations target users with various visual analytics experience, such as an administrator, supply chain consultant, legal, user researcher, engineering leader, data analyst, senior manager of BI, product manager, technical program manager and a marketing manager.

Some implementations generate visualizations and provide text or voice responses based on a template of responses. An example template is shown in the table below, according to some implementations.

TABLE 1

| Type of message | Text response | Audio response |
| --- | --- | --- |
| Welcome message | Welcome! I'm here to help answer questions about your data. | Welcome! I'm here to help answer questions about your data. |
| Single answer/ aggregation question Group question | Inserting the <the single number/response in bold> in a full sentence with complete context of what question was asked. Text: Here is a visualization broken down by <field(s)> | Saying the <the single number/response> in a full sentence with complete context of what question was asked. (heuristic to be 3 items max) Say the numbers for each combination, otherwise ask—There are 6 combinations of sex and class. Would you like me to tell you the top combination? |

TABLE 1-continued

| Type of message | Text response | Audio response |
|---|---|---|
| Filter question | After filtering the <field> to <value>/between <value 1> and <value 2>, the top result is <value>. | After filtering the <field> to <value>/between <value 1> and <value 2>, the top result is <value>. |
| Sort question | Alphabetical: The first value is <value> Descending: The highest value is <value> Ascending: The lowest value is <value> | Alphabetical: The first value is <value> Descending: The highest value is <value> Ascending: The lowest value is <value> |
| Scatterplot type question | Here is a scatterplot of <fields>. < Field 1> and <Field 2> are: < choose one>: Positively correlated Negatively correlated Not correlated | <Field 1> and <Field 2> are: <choose one>: Positively correlated Negatively correlated Not correlated |

In some implementations, a user can interact with a data source by generating a question into a CI, such as Slack. For example, the user can type questions related to aggregation, group, filter, limit, and sort expression types (e.g., analytical expressions found in Tableau). In some implementations, the system generates a response based on a pre-defined template of responses for each corresponding expression type. In some implementations, the system generates a response based on previous user history or training data instead of, or in addition to, the pre-defined templates. Some implementations generate and display an image of a data visualization for that question (e.g., using Mojave OS Screenshot app on Mac) into the CI (e.g., Slack channel). In some situations, single answer responses are pasted as text into the CI without any chart response.

In some implementations, the system accepts voice commands via a Bluetooth speaker. Some implementations use a chatbot, such as Amazon Polly, to convert the text response into computer generated speech output. A user may interact with the data by verbally asking a question about the data. The questions could be of aggregation, group, filter, limit and sort expression types. The system may respond by generating a response into Polly based on a pre-defined template of responses (and/or using previous user history or training data) for each corresponding expression type. Responses may be played on the Bluetooth speaker as audio output.

Some implementations provide multiple modalities (e.g., voice interaction using an iPad and a Bluetooth speaker) for user interactions. A separate Bluetooth speaker may provide audio output, while an iPad may be used as a display to show visualization responses. Some implementations use an NL interface, such as Amazon Polly, to convert the text response into computer-generated speech output. A user may interact with the data by verbally asking a question about the data. The questions could be of aggregation, group, filter, limit, and sort expression types as found in Tableau. The system may respond by generating a response into Polly based on a pre-defined template of responses for each corresponding expression type. The system may generate a screenshot of the corresponding visualization generated via Tableau (e.g., using Screenshot app on Mac). The system may send the chart image to the iPad via a messaging application (e.g., Message app on a Mac laptop). Single answer responses may be sent as verbal responses without an accompanying chart image.

Some implementations collect natural language utterances with audio recording of the voice input and Slack history for the text input. Some implementations screen-record and/or audio-record sessions. Some implementations generate a video log through a partial transcription of the videos. Some implementations determine themes and trends by qualitatively coding the video log (and raw video for reference).

Figure 4:
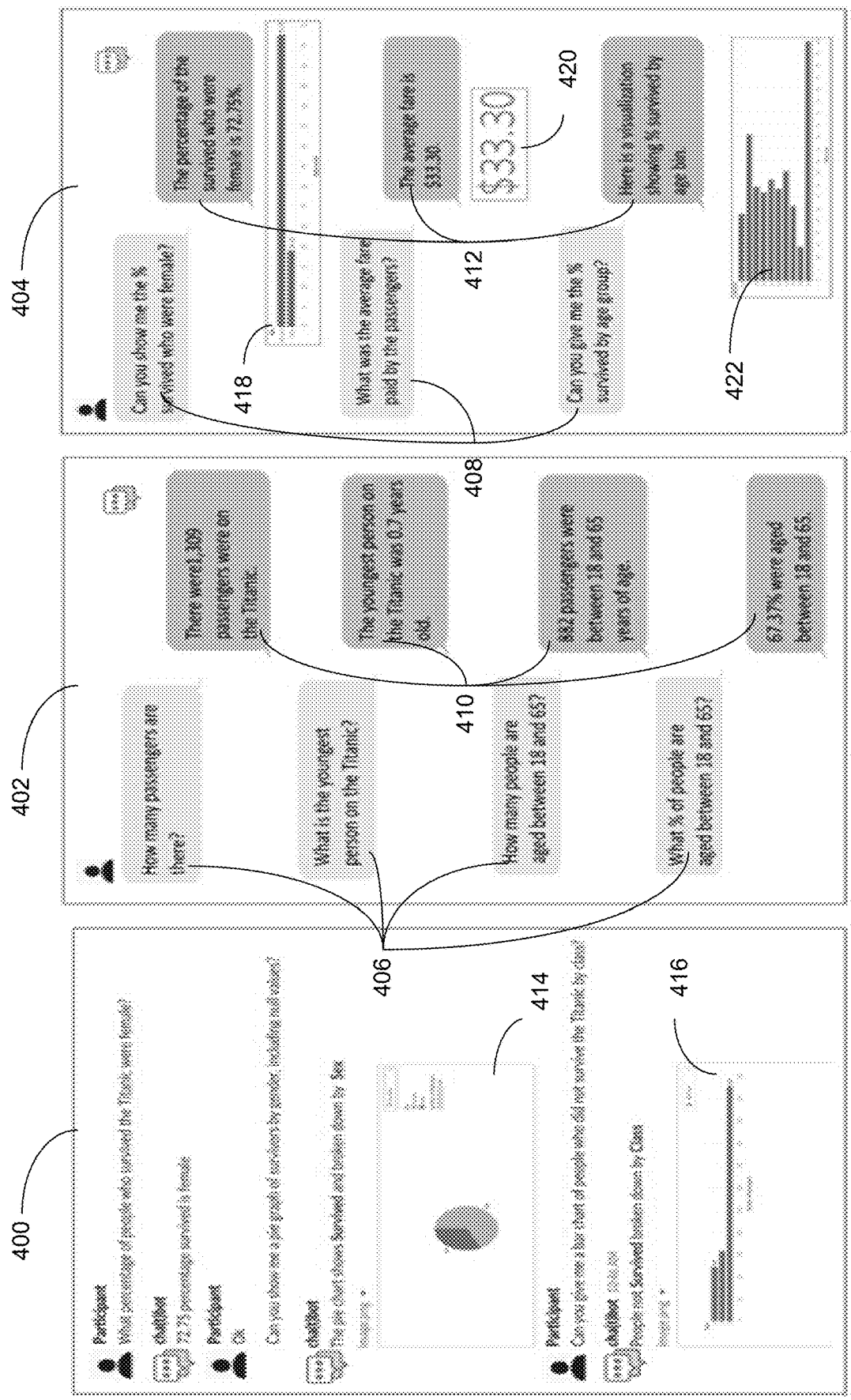
FIG. 4 shows example conversation snippets for different platforms and modalities, according to some implementations.

FIG. 4 shows example conversation snippets from experimental studies of different modalities, according to some implementations. Example interface 400 shows a user interacting via Slack, example interface 402 shows voice interaction via Bluetooth, and example interface 404 shows voice interaction using iPad, according to some implementations. Text bubbles 406 and 408 indicate voice transcripts from the participants, while boxes 410 and 412 are responses from the chatbot. Visualizations 414, 416, 418, 420, and 422 are displayed alongside the respective system responses.

Figure 5A:
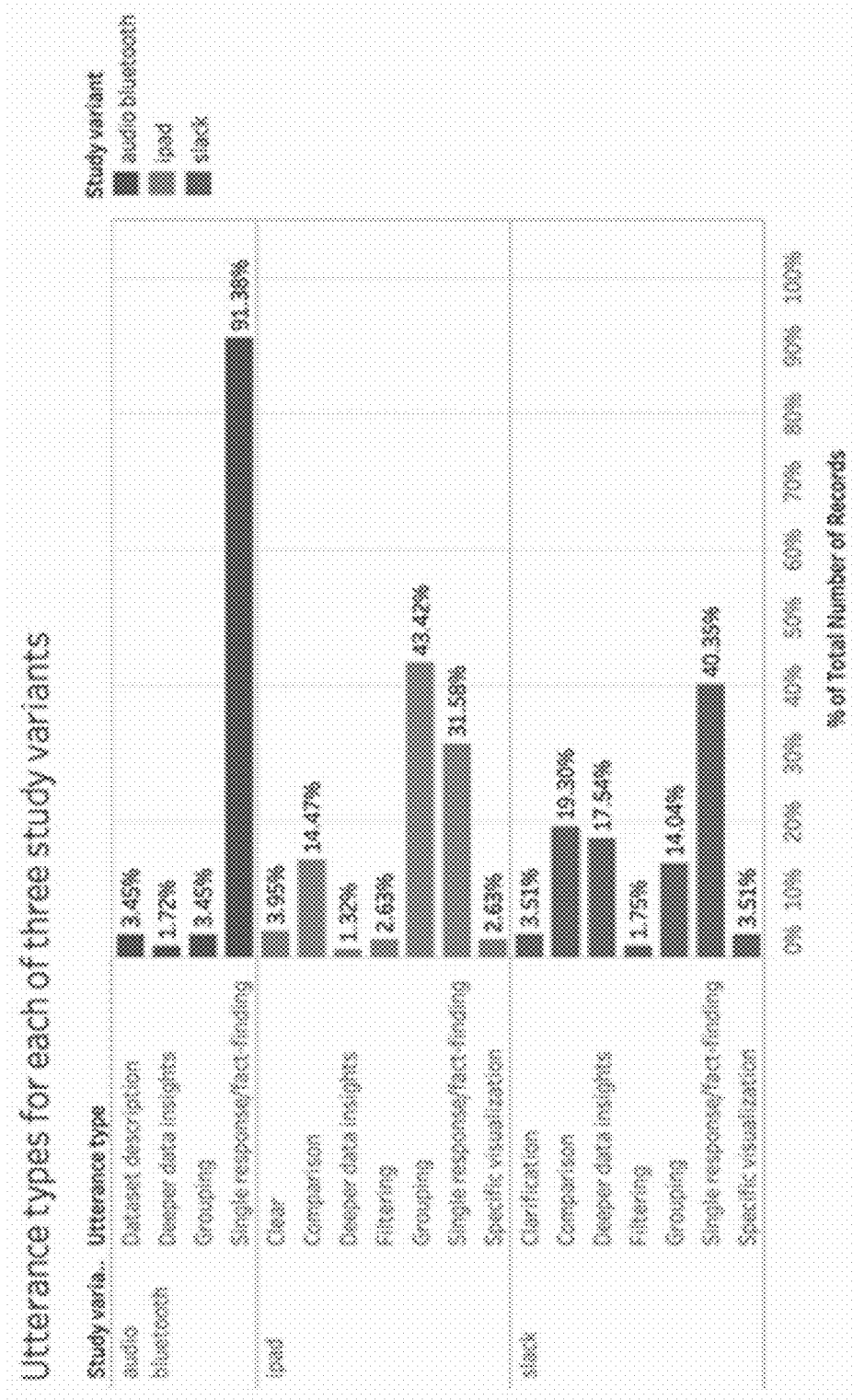
FIGS. 5A and 5B show experimental results from case studies, according to some implementations.
Figure 5B:
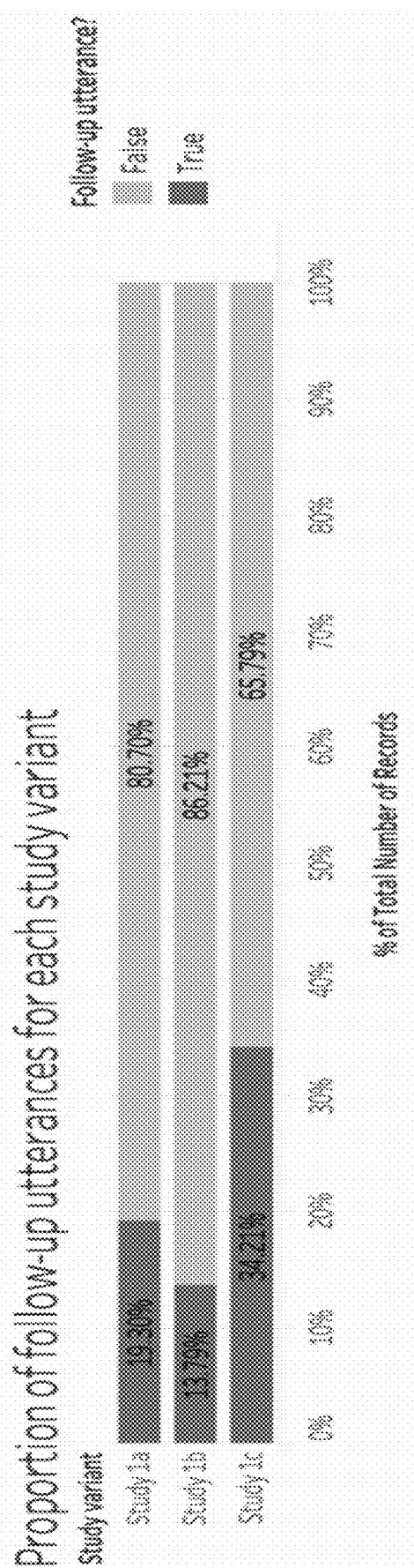

Some implementations categorize the input utterances based on the type of analytical intent they refer to. In some implementations, the categories include the five basic database operations found in VizQL along with other intents, such as 'clear' for starting a new conversation, 'compare' for comparing two values in a field, 'clarification' for wanting to clarify the system's response, and asking for a specific visualization type. Some implementations classify whether the utterances are follow-up utterances to a previous conversation thread or not. These data differed in interesting ways for the three variants. FIG. 5A shows utterance classification from the studies described above in reference to FIG. 4, according to some implementations. Voice modalities elicited a greater proportion of fact-finding questions, especially with voice interactions using Bluetooth (e.g., the interface 402). The analytical categories expressed were varied with the need for deeper analytical insights in the case of Slack interactions. As shown in FIG. 5B, there were fewer follow-up utterances across all the three studies, with the voice-only variant having the least proportion.

Some implementations automatically filter out nulls, with accompanying language indicating that the filter was applied to the visualization response.

Some implementations provide context to fact-finding questions. For example, in the iPad variant, for an utterance "what % of passengers in cabin class 1 survived?", a response "62% of class 1 survived when compared to 43% in class 2 and 26% in class 3" is preferred instead of displaying "62%". In the voice-only variant, the system may parrot back some version of the question, especially those questions that could be answered by a single number or a yes/no response; here the context confirms that the system correctly understood the user's request.

Some implementations support various forms for expressing queries. One of the challenges while designing a natural language interface is the high variability in how people express questions. Some implementations support follow-up threads in the Slack and iPad variants, unless the utterances are determined to be precise, self-contained fact-finding questions (e.g., "how many people who were 50 or older were on the titanic?").

Some implementations handle different semantics and recognize a variety of synonyms and related concepts in utterances. For example, "How many families are fully lost on the boat", where "fully lost" pertained to "not survived," or "Average fare these women paid", where paid refers to "Fare". Recognizing synonyms and concepts helps enhance the recognizability of these types of utterances, in addition to providing self-service tools for users to add domain-specific concepts with their datasets.

Some implementations support repair and refinement. Some implementations recognize follow-up utterances for the Slack and iPad variants. Some implementations automatically add an additional attribute to the analysis. Some implementations swap out a number for a percentage to do a comparison or filter out information. In the voice-only variant, some implementations support follow-up questions that include a fact-finding inquiry based on the current context.

Some implementations distinguish between follow-up utterances and resetting the context. Some implementations recognize utterances, such as "clear" and "start over" to explicitly reset the context, even though that information was part of the instructions. Some implementations recognize anaphora, such as "that chart", to refer to the current context. Some implementations use Slack threads to indicate that a user intends to follow-up on a previous conversation. Some implementations support interactive visualizations or editable interface via an authoring tool. Some implementations support a text description, feedback pills, or a caption describing the visualization. Some implementations show the attributes the system uses to generate the visualization, helping users to determine whether the system correctly interpreted their question.

Some implementations provide deeper insights and reasoning with chart variants and include reasons for outliers and trends. Some implementations extend the capabilities of analytical conversation interfaces to not only provide the "what", but the "why" and "how" from the data and facilitate richer and deeper analytical workflows.

Some implementations integrate chatbots into other visual analysis workflows, such as creating dashboards and saving results to a workbook.

Conversational Threads and Ambiguity Handling in Conversational Interfaces

In some conversational interfaces, message threading facilitates focused follow-up conversations inside a 'flex pane' next to a main chat pane. Threads help organize information by making the public channels more readable and moving discussions about discrete topics into their own workspace. Interactive messaging frameworks also augment messages with interactive interface affordances, such as buttons, menus, and custom actions. These features in conversational platforms, such as Slack, are useful for data exploration and enhance user workflows.

Some implementations use a Slack chatbot. Some implementations allow selection of the presence or absence of threading and interactive messaging. The chatbot is based on a client-server architecture using the Slack API and node.js for listening to Slack events. Slack responses from the template shown in Table 1 above may be passed as input to the prototype as a JSON file. Some implementations provide two types of interactive widgets to accompany the chatbot responses: (1) a drop-down menu for filtering to specific values on the data domain; (2) a yes/no button option to clarify whether the response is expected when the input utterance is ambiguous. Some implementations do not include additional widgets in Slack, such as checkboxes, radio buttons, and a date picker. Drop-down menus provide the equivalent functionality as checkboxes and radio buttons but are more space efficient. In some situations, such as when the dataset does not contain any date fields, there is no need for a date picker. The chatbot may enable conditions by indicating the condition as a parameter in the JSON file.

Some implementations using Slack automatically generate a system response as a new thread to an original top-level utterance. In some implementations, when a user responds in a thread, the Slackbot also automatically responds in the same thread. In some implementations, when the user types a question in a main channel, a new thread is automatically created with the corresponding system response. Some implementations automatically identify breaks in conversational flow where the context should be reset.

In some implementations, threaded responses are shown for single word/number responses, but not when the Slack flex pane is too small to read visualizations. Some implementations provide widgets along with threading. The presence of widgets helps users focus their gaze to the bottom of a thread and see responses in-situ while interacting with the widgets. Follow-up utterances for repair may either reformulate a misunderstood query or revise a chart to continue the analysis. Users may use widgets for repair. Widgets also offer a mechanism to rapidly explore variants of a chart to see different perspectives (e.g., by adjusting filters).

Example System Implementation

Figure 6:
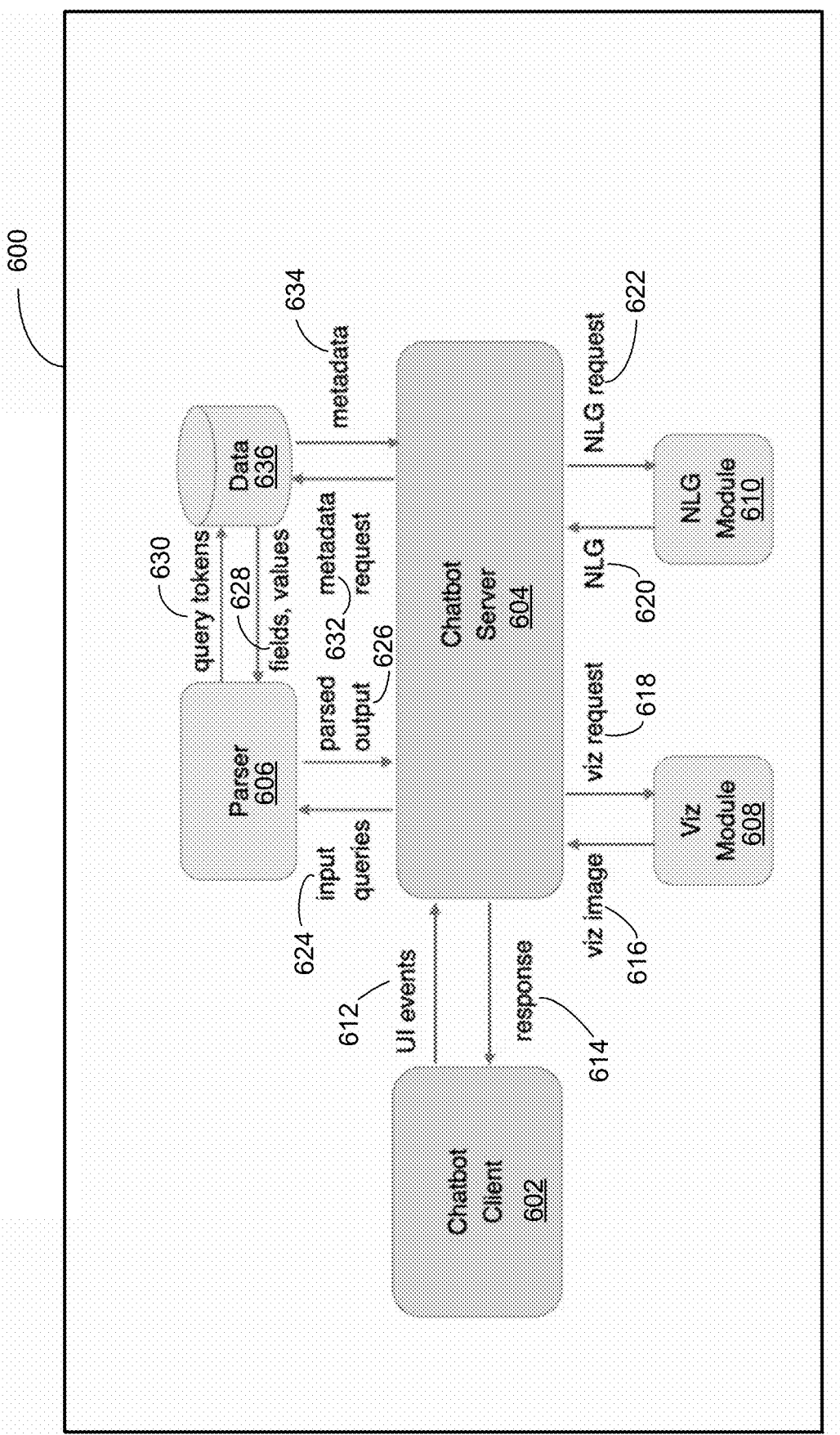
FIG. 6 shows a block diagram of an example chatbot system, according to some implementations.

FIG. 6 is a block diagram of an example chatbot system 600, according to some implementations. The chatbot system 600 employs a node.js client-server architecture and have the following general components:

Chatbot Client 602: Listens to user greetings, interaction events and message events from a Chatbot Server 604 (DP1). In the case of Slack and Echo Show platforms, the interface also displays native interactive widgets for surfacing ambiguity;

Chatbot Server 604: The main application-specific server bridge between the Chatbot Client 602 and the other components of the application. The server translates input client events 612 (e.g. Slack messages or voice commands) into appropriate API requests, and API responses 614 into a format appropriate for the client 602;

Parser 606: Parses input NL queries 624 (text- and voice-based) into tokens 630 based on an underlying grammar. These tokens are resolved as data attributes and values (with information 628 from a data source 636), or intent lexicons, such as 'trend' and 'correlation' as well as modifiers such as 'young' and 'best'. The parser also supports intent handling and infers underspecified or ambiguous information (DP5). The server passes the parsed tokens 626 to the Chatbot Server, so that the information can be used to generate a system response;

Viz Module 608: Generates images of data visualization results (shown as viz image 616) based on information, such as chart type, intent strategy, data attributes, and values (e.g., using Vegalite commands), in response to visualization request(s) 618 from the server 604; and Natural Language Generation (NLG) Module 610: Responds to NLG request 622 from the server 604 and employs simple language templates for NLG 620 with pre-defined text and placeholders to insert information for generating system responses (DP3). Given that the application domain for these chatbot interactions uses a set of known analytical intents along with attributes and values from the underlying data, the space of linguistic variations is relatively small, and the outputs can be specified using templates. The templates may be defined by referring to utterances from experimental studies described above, along with utterances commonly supported across existing NLIs and sample utterances collected through studies investigating the use of NL to create or interact with data visualizations. The grammar rules from the parser modules may be used to aid in the NLG process, which involves ordering constituents of the NLG output and generating the right morphological forms (including verb conjugations and agreement).

Components of the example chatbot system 600 described above may be implemented as different applications or software modules of a same device, or on different devices. For example, the Chatbot Client 602 may be implemented as part of the conversation module 242, the Chatbot server 604 may be implemented as part of the data visualization application 230, the parser 606 and the NLG module 610 may be implemented in the language processing module 238, and the Viz module 608 may be implemented in the data visualization generation module 234.

In some implementations, the Slack chatbot uses the Slack API for listening to Slack events. Slack responses from the template used in the study described above are passed as input to the prototype as a JSON file. The prototype automatically generates a system response as a new thread to the original top-level utterance when it detects follow-up questions (DP2); for example, when the user refers to the context in the previous utterance using anaphoric references such as "that viz" or "how about showing the response for first class instead." Some implementations do not provide specific instructions to the participants about when to interact in threads so as to observe (and learn from) user behavior without any priming. In some implementations, when a participant chose to respond in a thread, the Slackbot also automatically responds in the same thread. In some implementations, when the participant decides to type a question in the main channel, a new thread is automatically created with the corresponding system response (DP3, DP4). In some implementations, the prototype utilizes Slack's interactive messaging framework that augments messages with interactive interface affordances, such as buttons, menus, and custom actions, for displaying ambiguity widgets (DP6) (e.g., the widget 322 described above in reference to FIG. 3). Some implementations provide two types of interactive widgets to accompany the chatbot responses: (1) a drop-down menu for filtering to specific values on the data domain; (2) a yes/no button option to clarify whether the response is expected when the input utterance is ambiguous (DP5).

In some implementations, the Echo Show and Echo chatbot systems have a similar implementation architecture to the Slack chatbot. However, rather than using a bespoke parser, the application employs the Alexa API for parsing intents in the utterances. Some implementations activate a feature called Follow-Up Mode that lets users make multiple requests, including follow-up inquiries without having to say the trigger phrase, "hey chatbot!" each time a question is asked (DP2). In some implementations, users may be instructed to use the trigger phase once at the beginning of the interaction session to set the Echo device in active listening mode, indicated by a blue halo light on the chatbot device. In some implementations, both the Echo Show and Echo chatbots provide verbal follow-up prompts to either continue or refine the current conversation, or ask a new question (DP3, DP4). In some implementations, the Echo Show displays a list of options on its touch screen based on pre-defined display templates available for Alexa devices when it encounters ambiguous or underspecified utterances (DP5, DP6). Some implementations use a popular US-English based female voice option called 'Joanna' for both the voice chatbots. FIG. 3 described above shows examples of these conversational interfaces, according to some implementations.

Figure 7A:
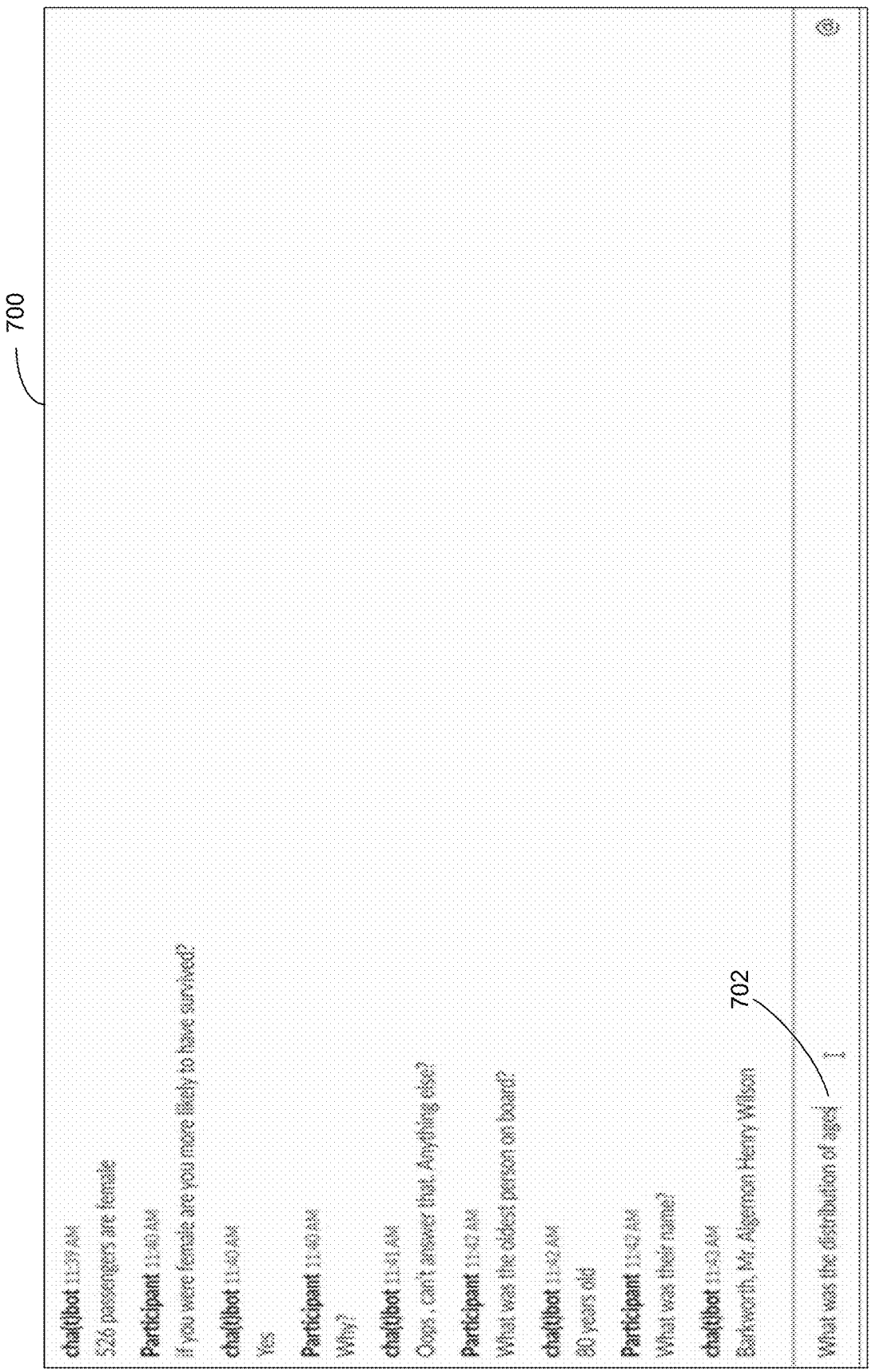
Figure 7B:
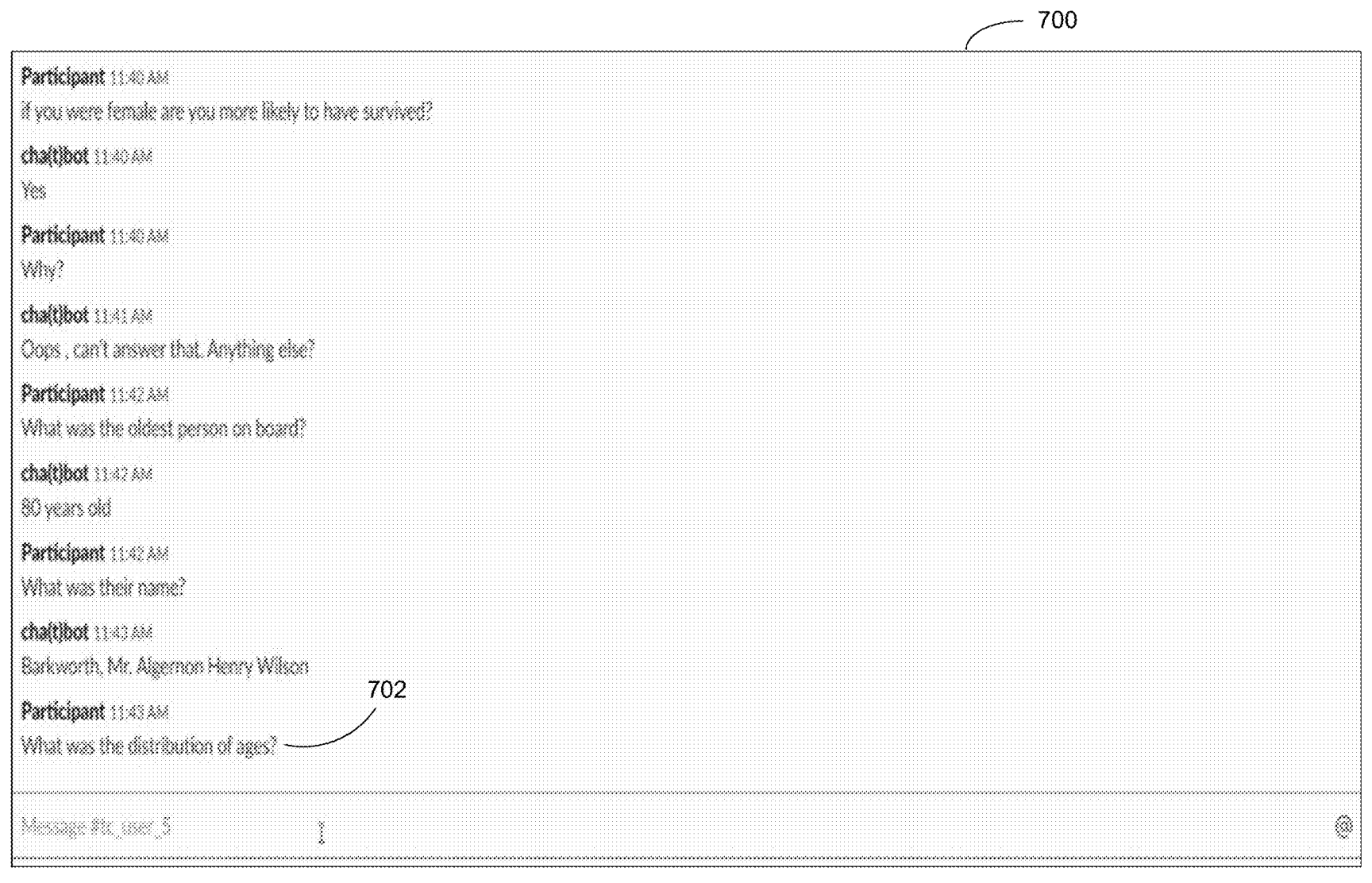
Figure 7C:
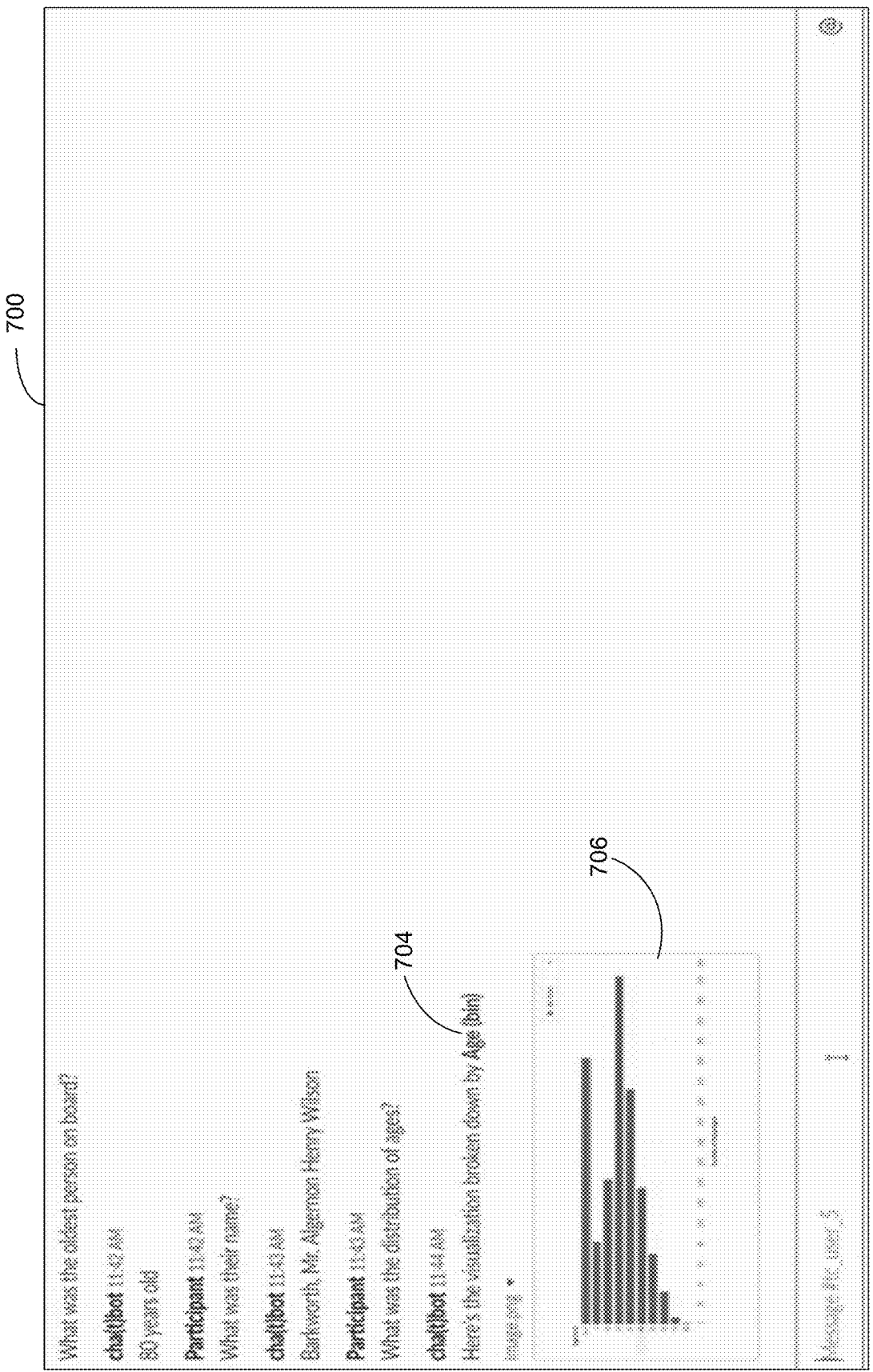
Figure 7D:
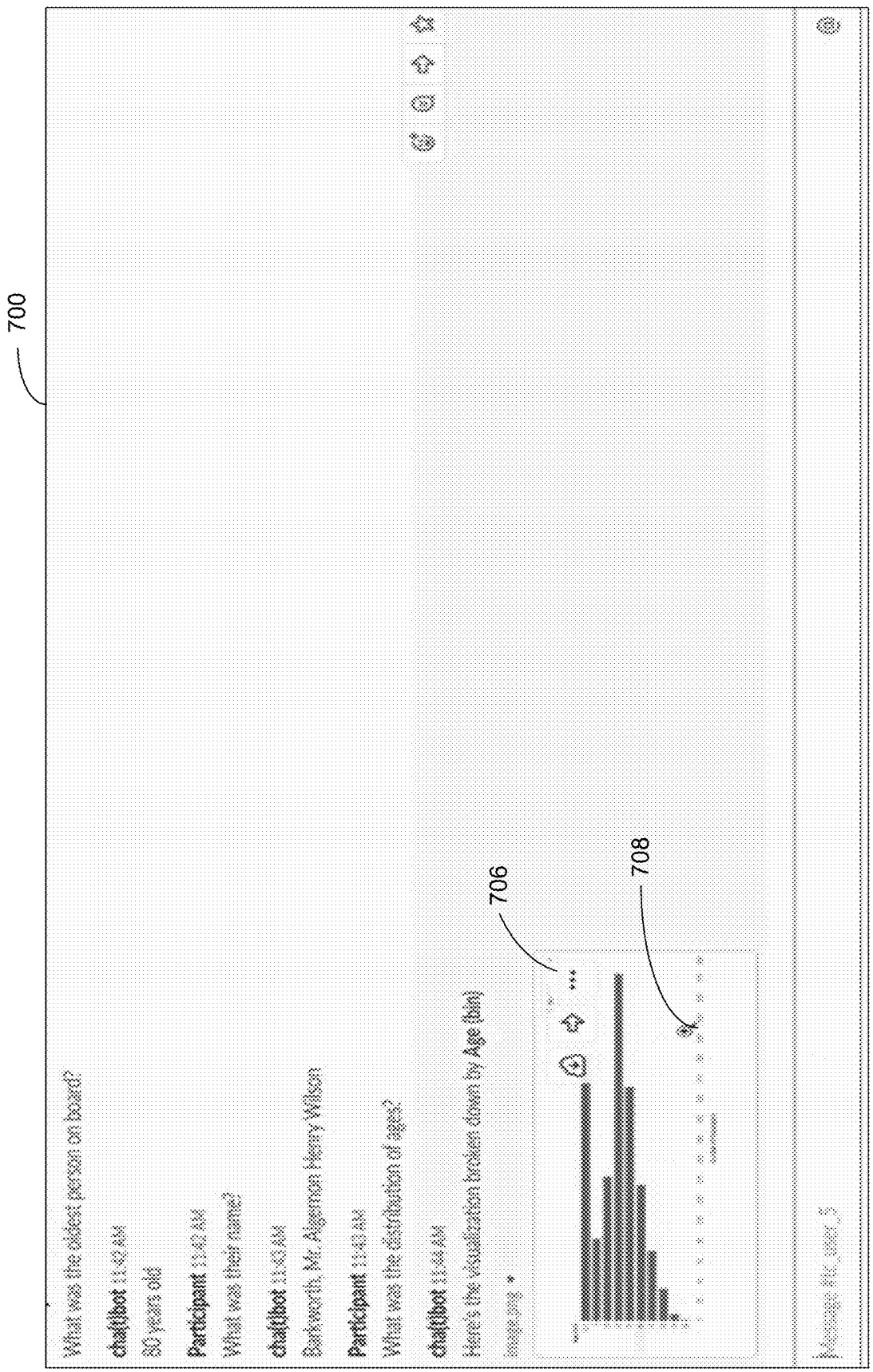
Figure 7E:
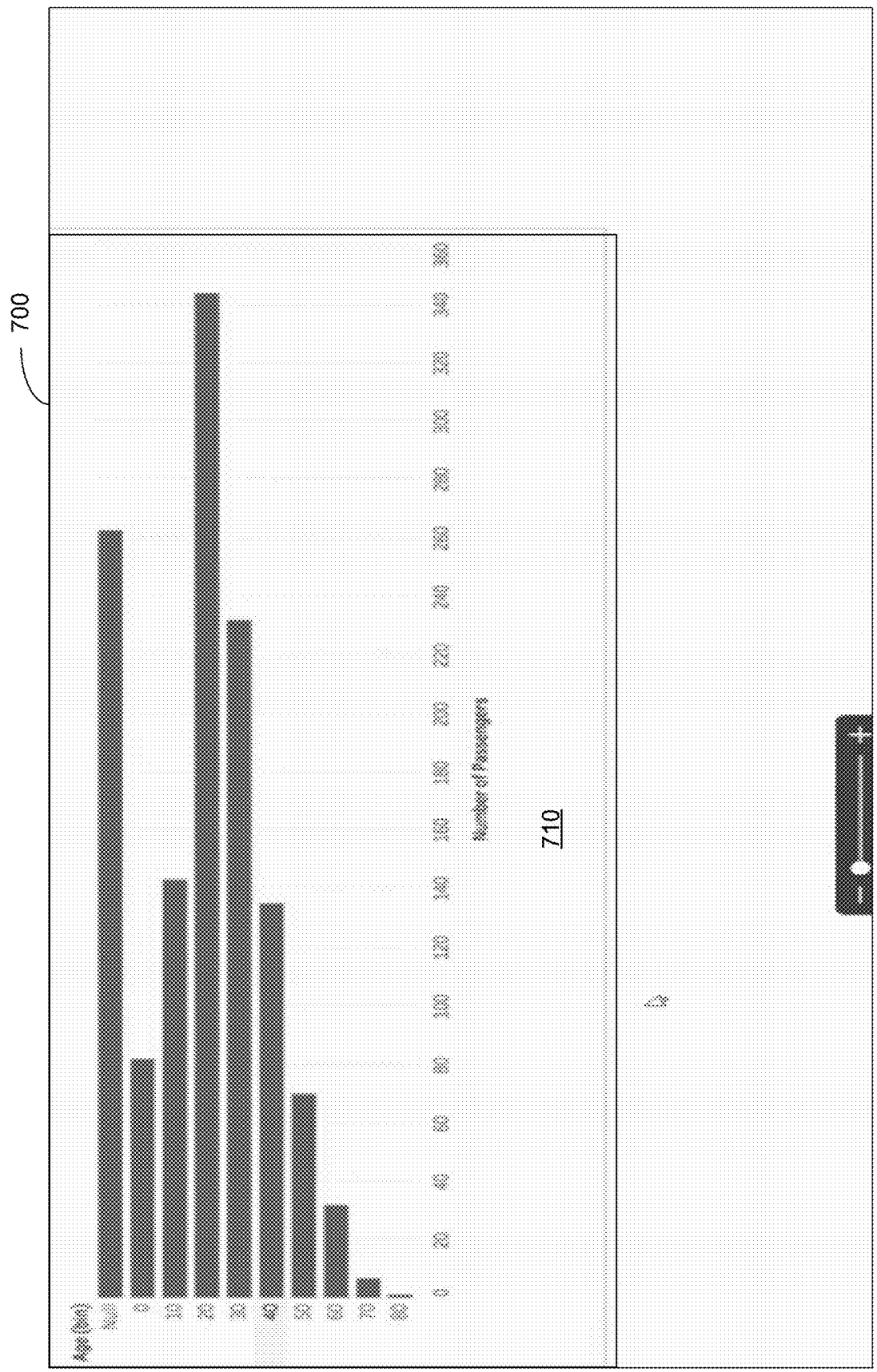

FIGS. 7A-7E show example interactions between a user and a chatbot, via a conversational interface 700, according to some implementations. In FIG. 7A, a user is shown asking "What was the distribution of ages" 702 (on board the ship Titanic, for the data source Titanic). In FIG. 7B, the question 702 is shown as part of the conversational thread. In FIG. 7C, the system responds with a natural language response "Here's the visualization broken down by Age (bin)" 704 and a data visualization 706 (a bar chart). In FIG. 7D, the user has moved the cursor 708 over the chart 706 and when the user clicks on the chart, the system enlarges and displays the chart 710 as shown in FIG. 7E, according to some implementations.

Figure 8A:
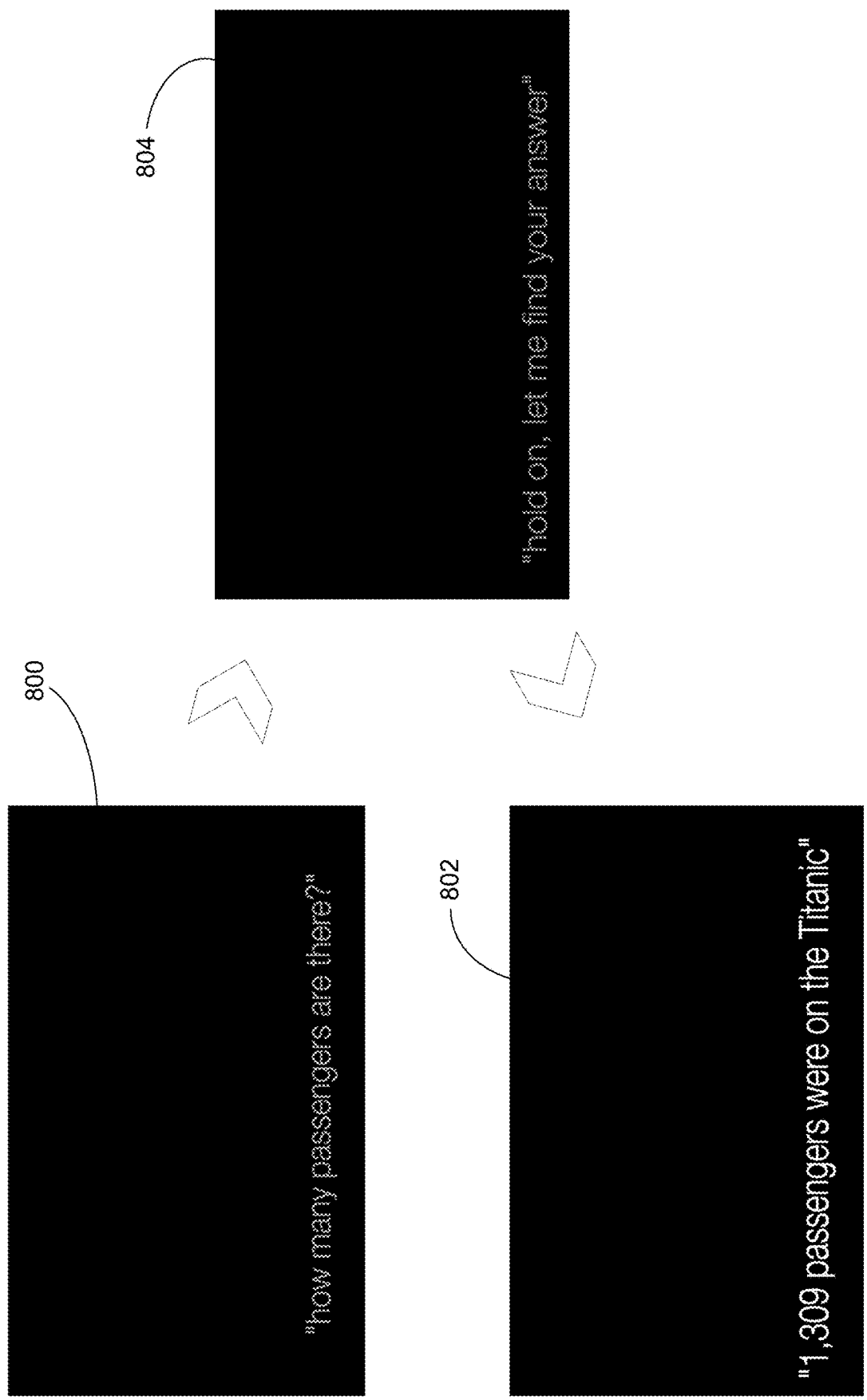
FIGS. 8A and 8B show example interactions between a user and a chatbot, via an audio interface, according to some implementations.
Figure 8B:
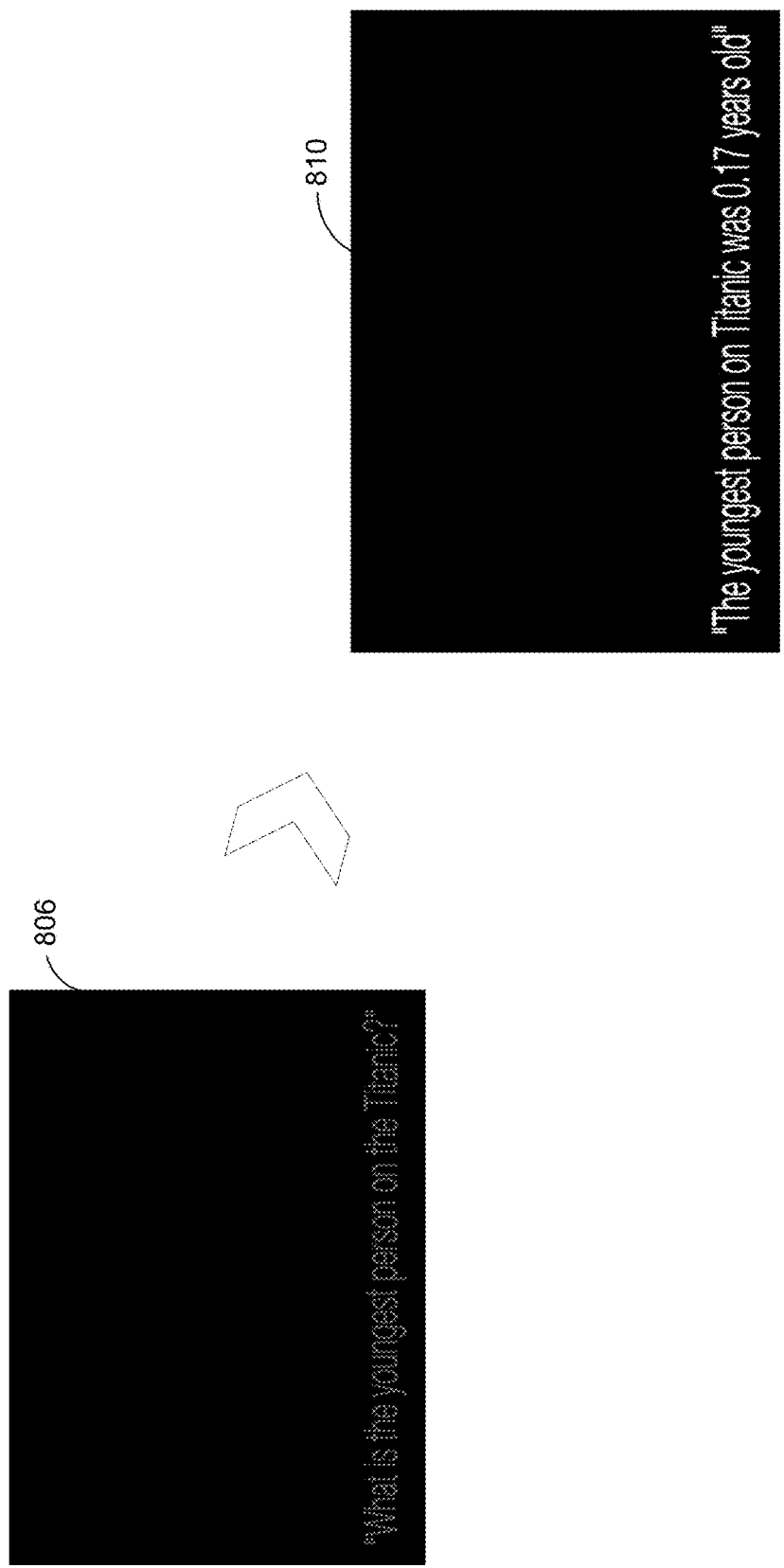

FIGS. 8A and 8B show example interactions between a user and a chatbot, via an audio interface (e.g., using a Bluetooth device), according to some implementations. In FIG. 8A, a user is shown asking "how many passengers are there?" 800 (on board the ship Titanic, for the data source Titanic). The system responds by displaying "hold on, let me find your answer" 804 followed by "1,309 passengers were on the Titanic" 802. In FIG. 8B, the user is shown asking "What is the youngest person on the Titanic?" 806. The system responds by displaying "The youngest person on Titanic was 0.17 years old" 810. In FIGS. 8A and 8B, the text shown are transcripts of speech input.

Figure 9A:
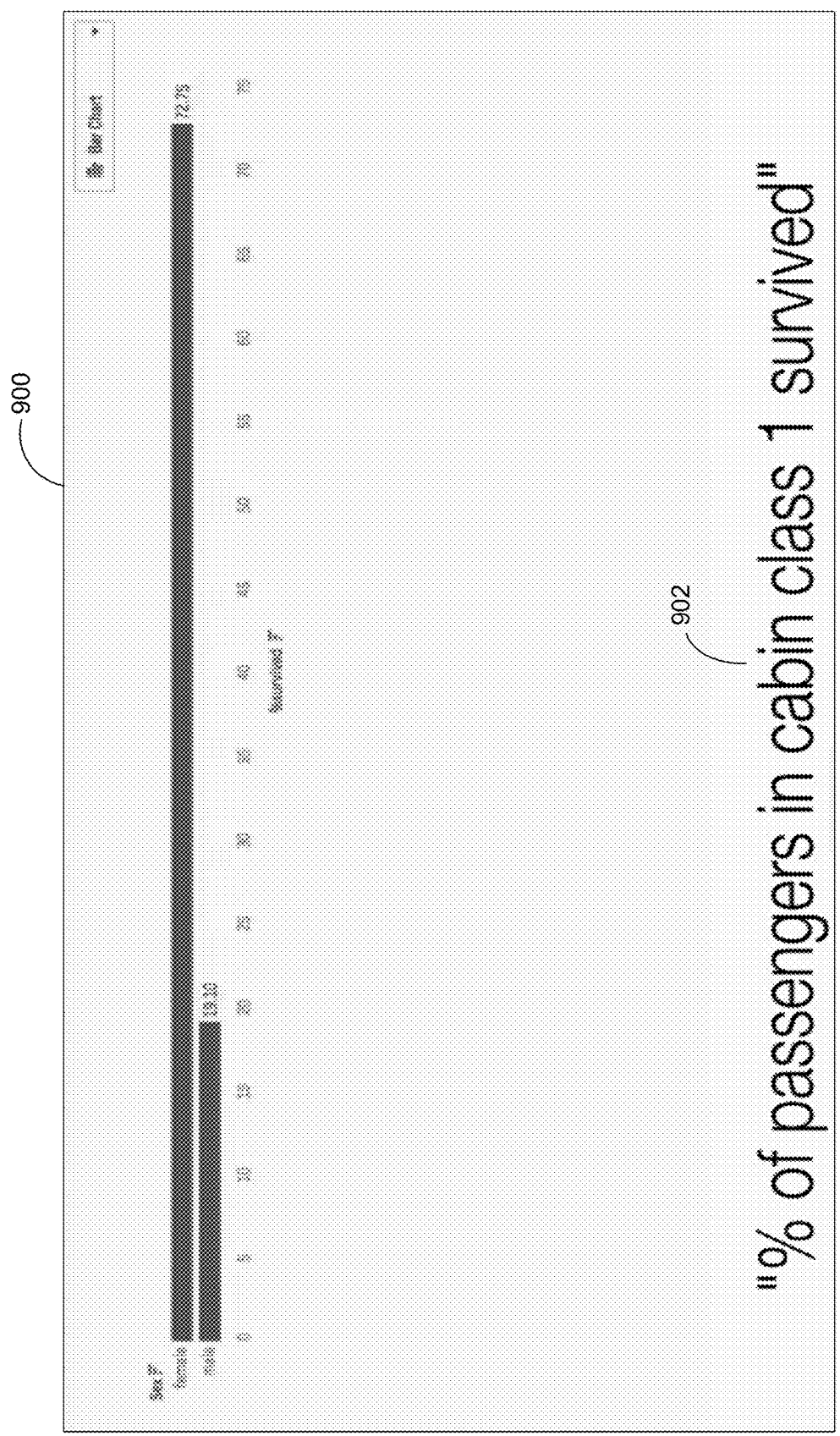
FIGS. 9A-9G show example interactions between a user and a chatbot, via an iPad interface, according to some implementations.
Figure 9B:
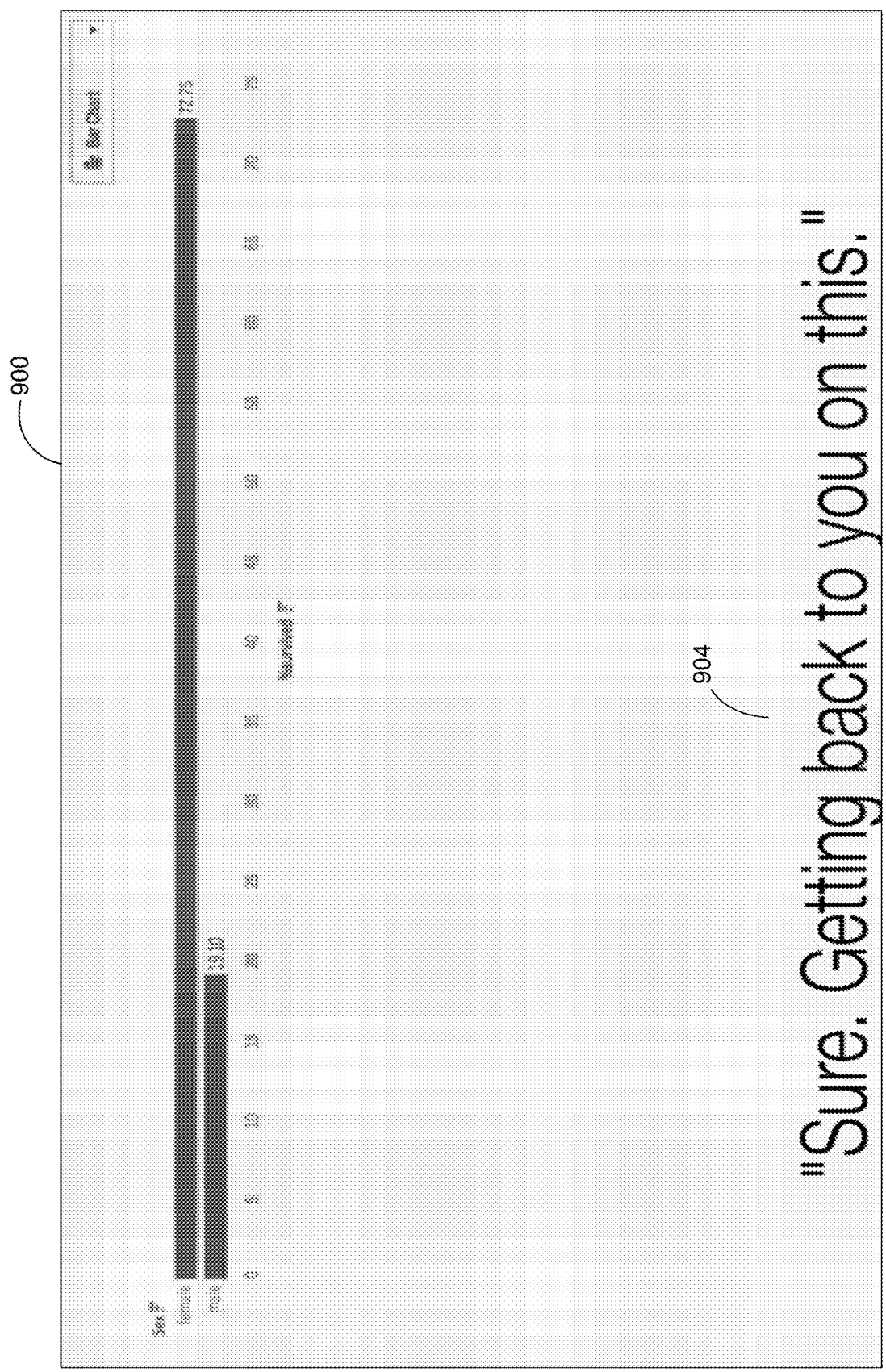
Figure 9C:
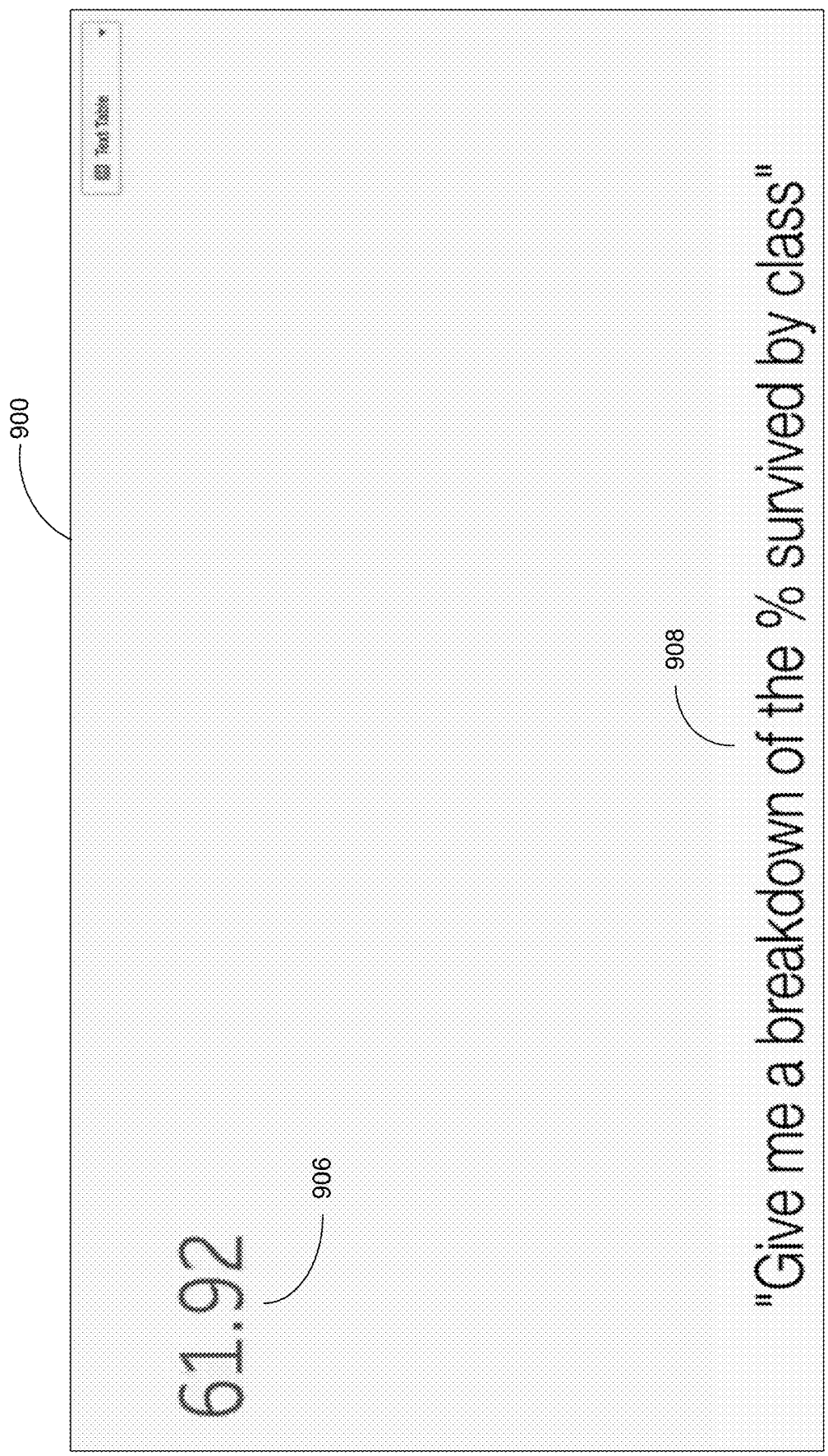
Figure 9D:
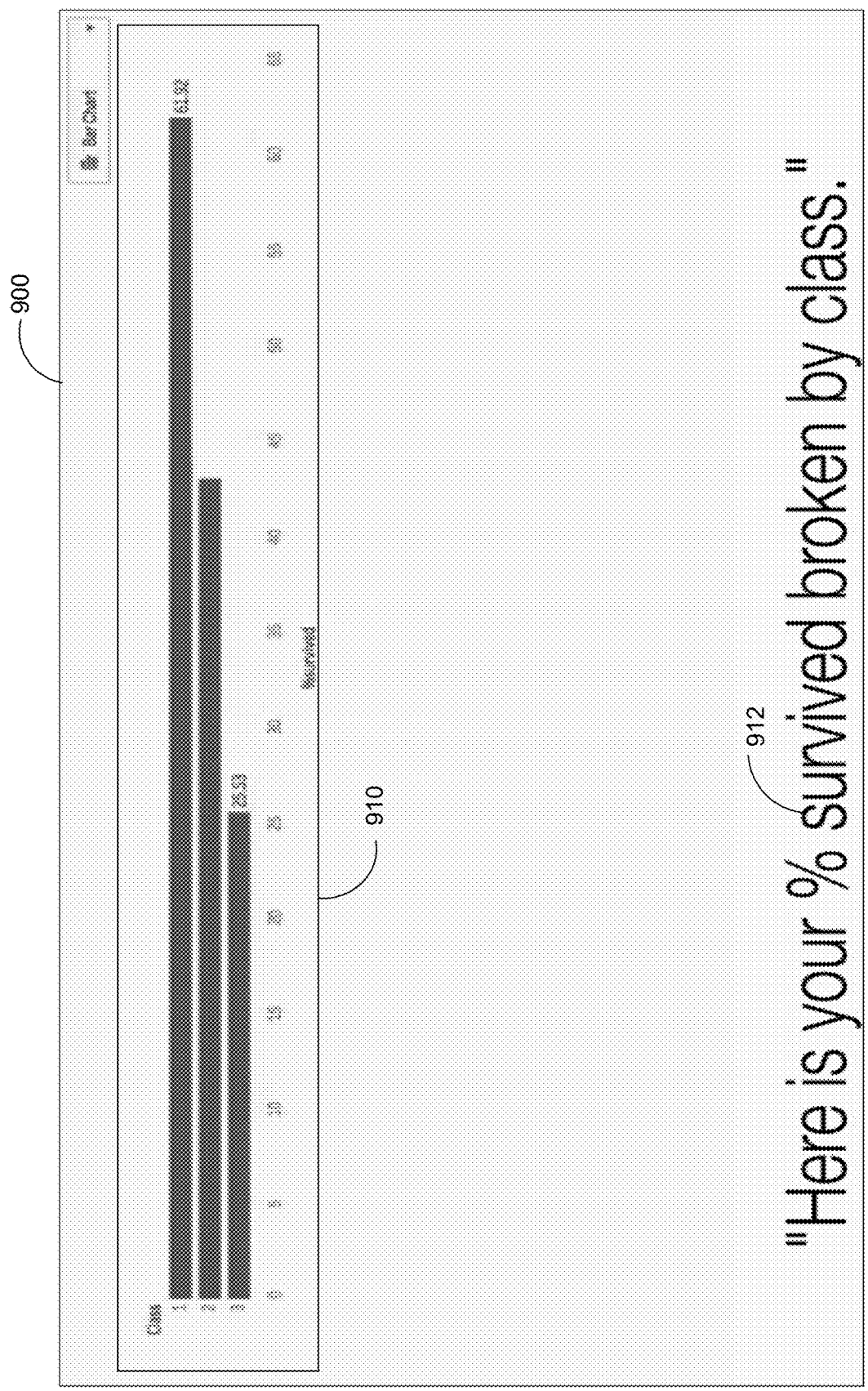
Figure 9E:
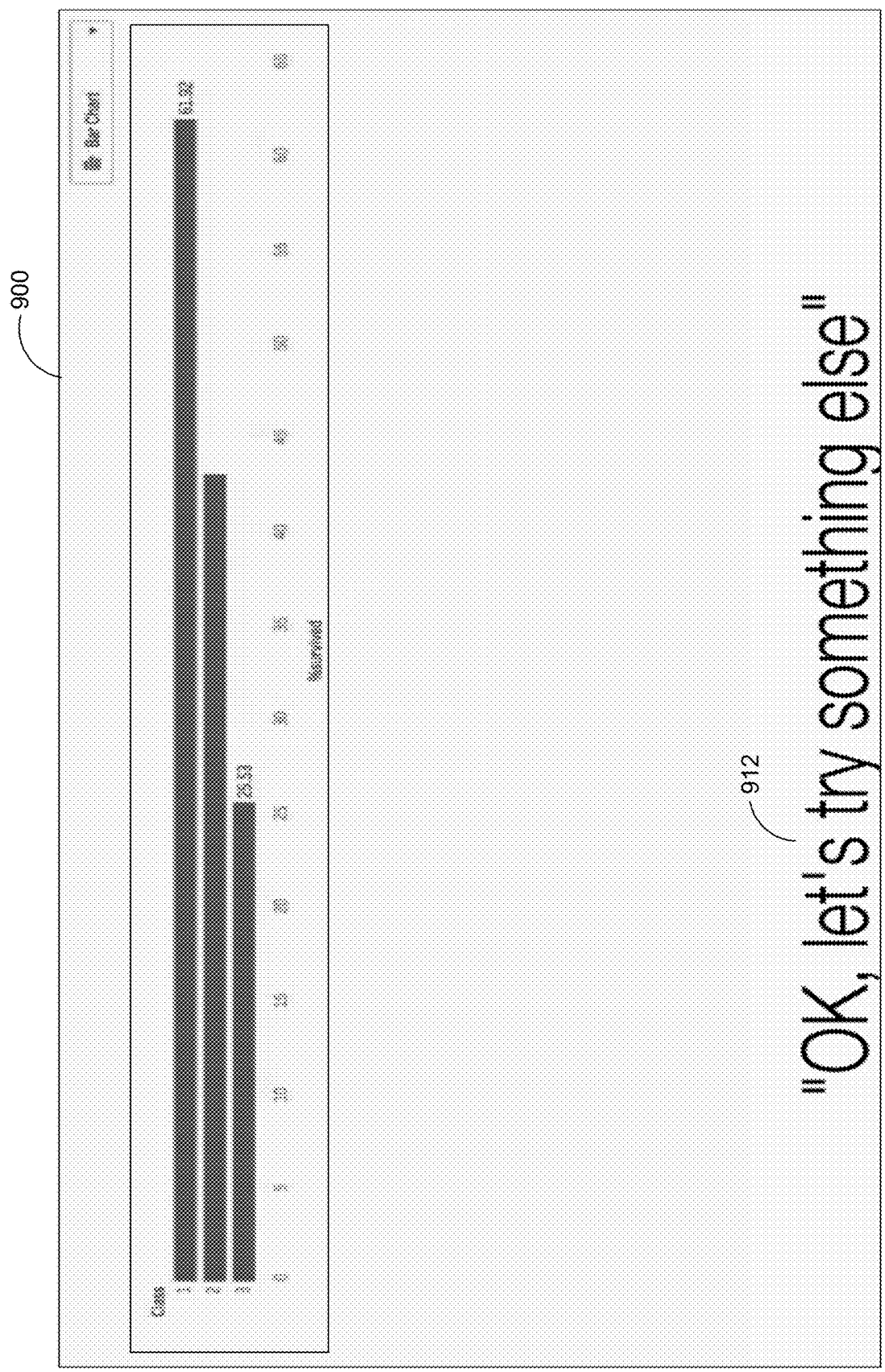
Figure 9F:
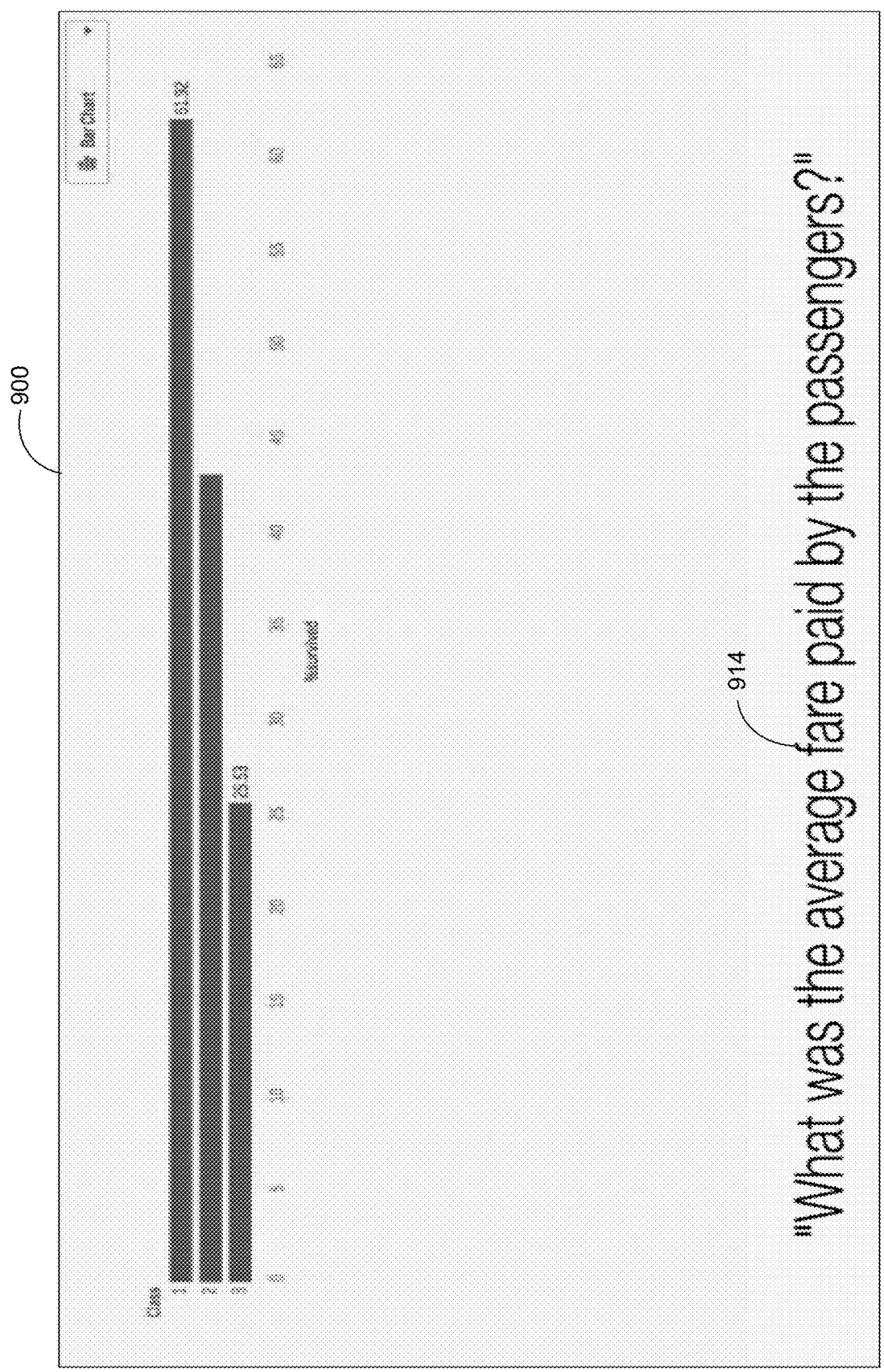
Figure 9G:
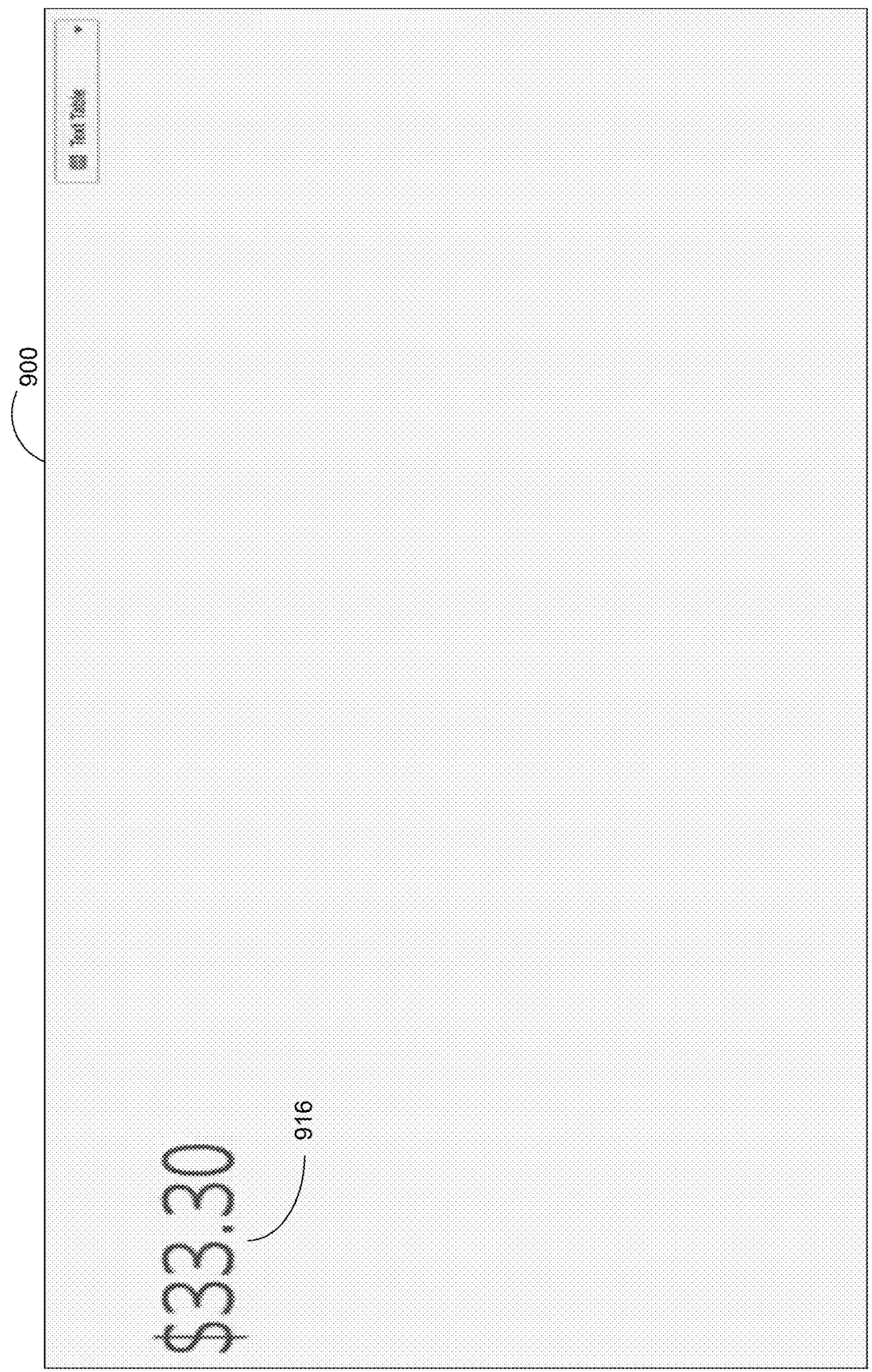

FIGS. 9A-9G show example interactions between a user and a chatbot, via an iPad interface 900, according to some implementations. In FIG. 9A, a user is shown asking "% of passengers in cabin class 1 survived" 902 (on board the ship Titanic, for the data source Titanic). The system responds, as shown in FIG. 9B, by displaying "Sure. Getting back to you on this" 904 and follows with a numeric response or answer "61.92" 906 as shown in FIG. 9C. The user asks a follow-up question "Give me a breakdown of the % survived by class" 908, as shown in FIG. 9C. In response, the system responds with a bar chart 910 that shows a class-wise distribution, and outputs "Here is your % survived broken by class" 912, as shown in FIG. 9D. In FIG. 9E, the user is shown uttering "OK, let's try something else" which does not translate to any query as such. Subsequently, the user asks, "What was the average fare paid by the passengers?" 914, as shown in FIG. 9F. The system responds with a single answer "$33.30" as shown in FIG. 9G. In FIGS. 9A-9G, the text shown in quotes are also read aloud by the system or the text message is also converted to speech (to be played by a different output device), according to some implementations.

Figure 10:
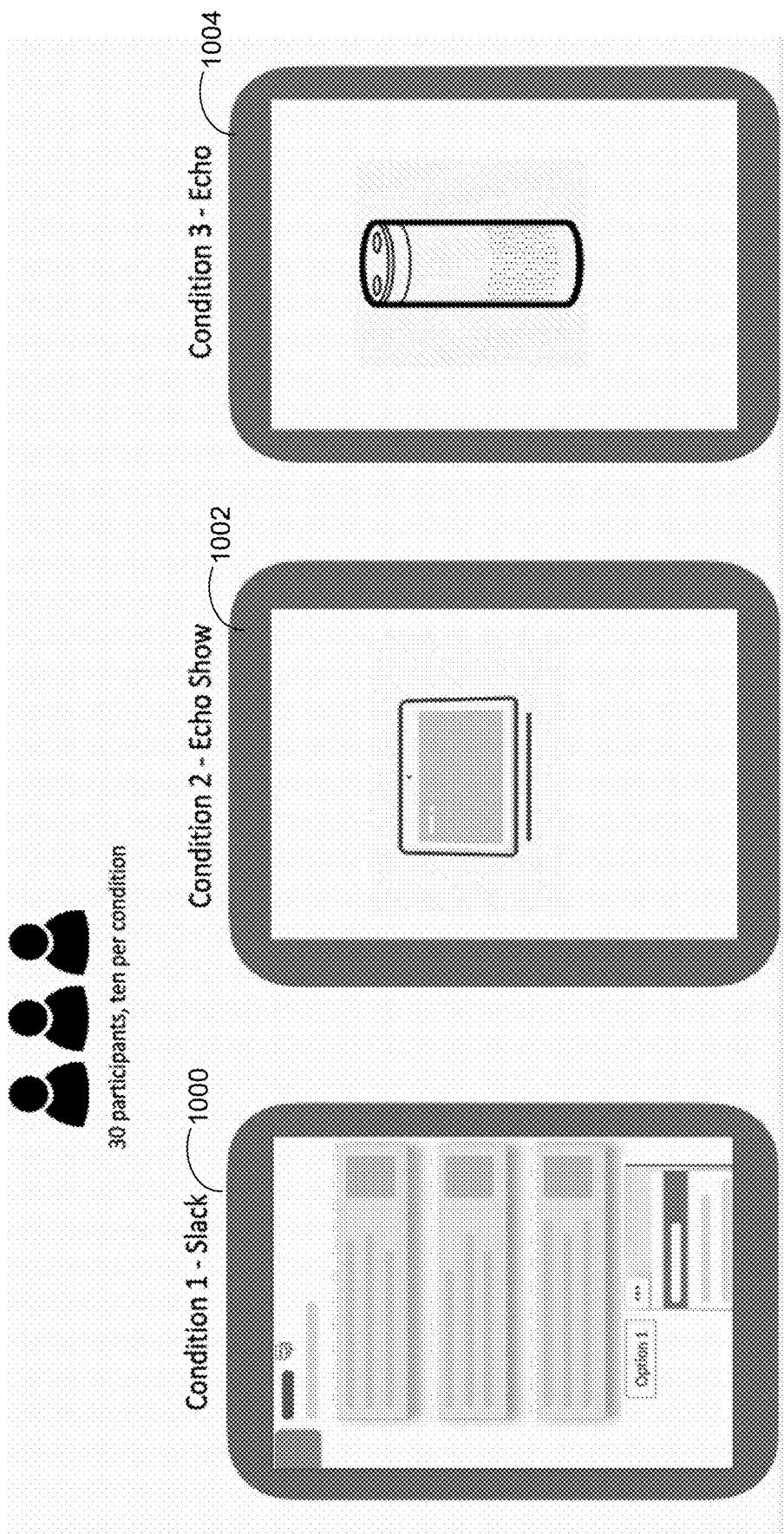
FIG. 10 shows example implementations of the chatbot system of FIG. 6 within various conversational interfaces, according to some implementations.

FIG. 10 shows example implementations of the chatbot system of FIG. 6 within various conversational interfaces, according to some implementations. The implementations were used to perform a set of three studies for evaluating the analytical chatbot interfaces. The chatbot system of FIG. 6 was implemented in Slack 1000 (that showed widgets and conversation threads), Echo Show 1002 (that took verbal commands and showed data visualizations along with audio responses), and for voice-only interactions on Echo 1004.

Figure 11A:
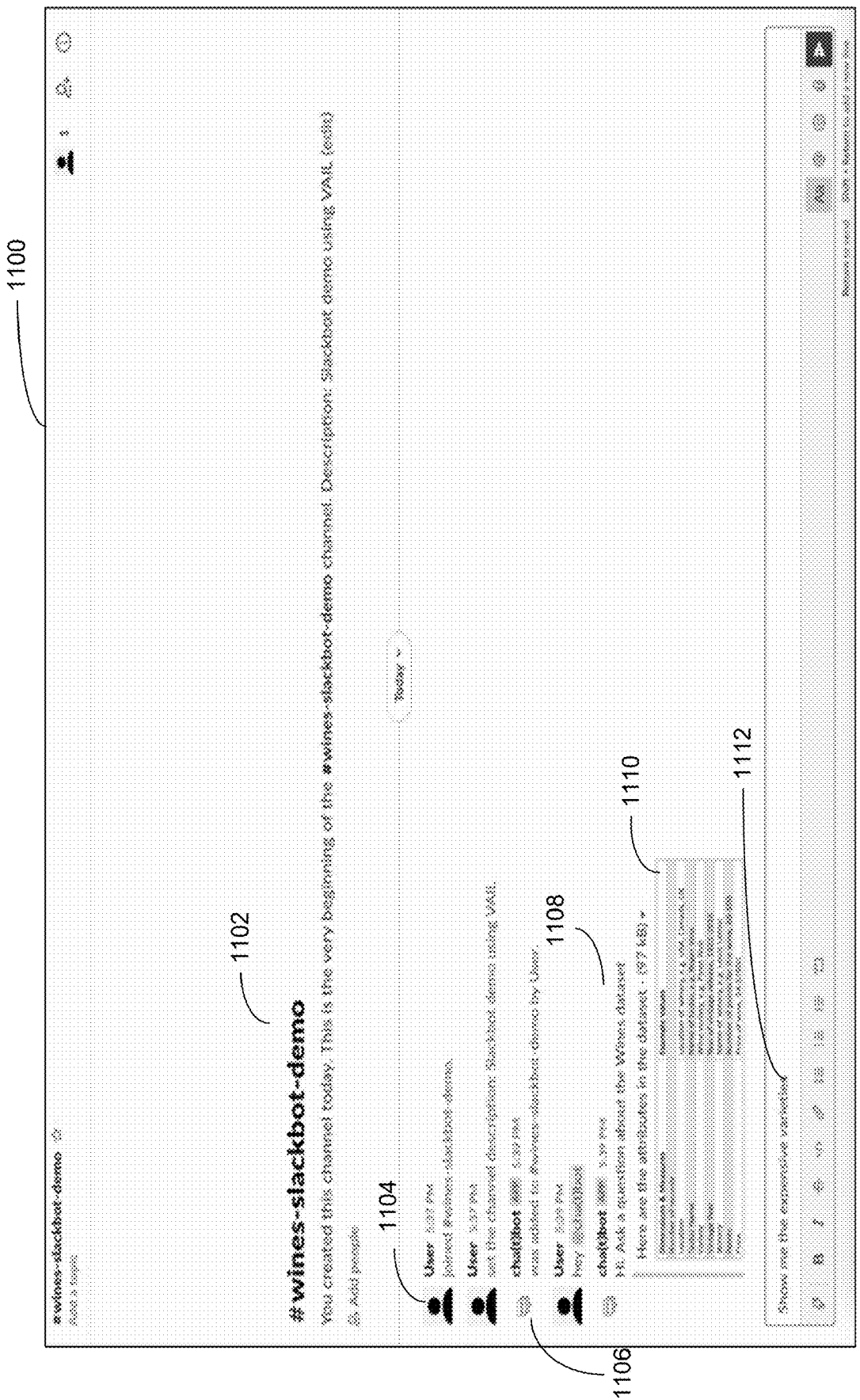
FIGS. 11A-11D show example conversations within a Slack-based interface that implements the chatbot system of FIG. 6, according to some implementations.
Figure 11B:
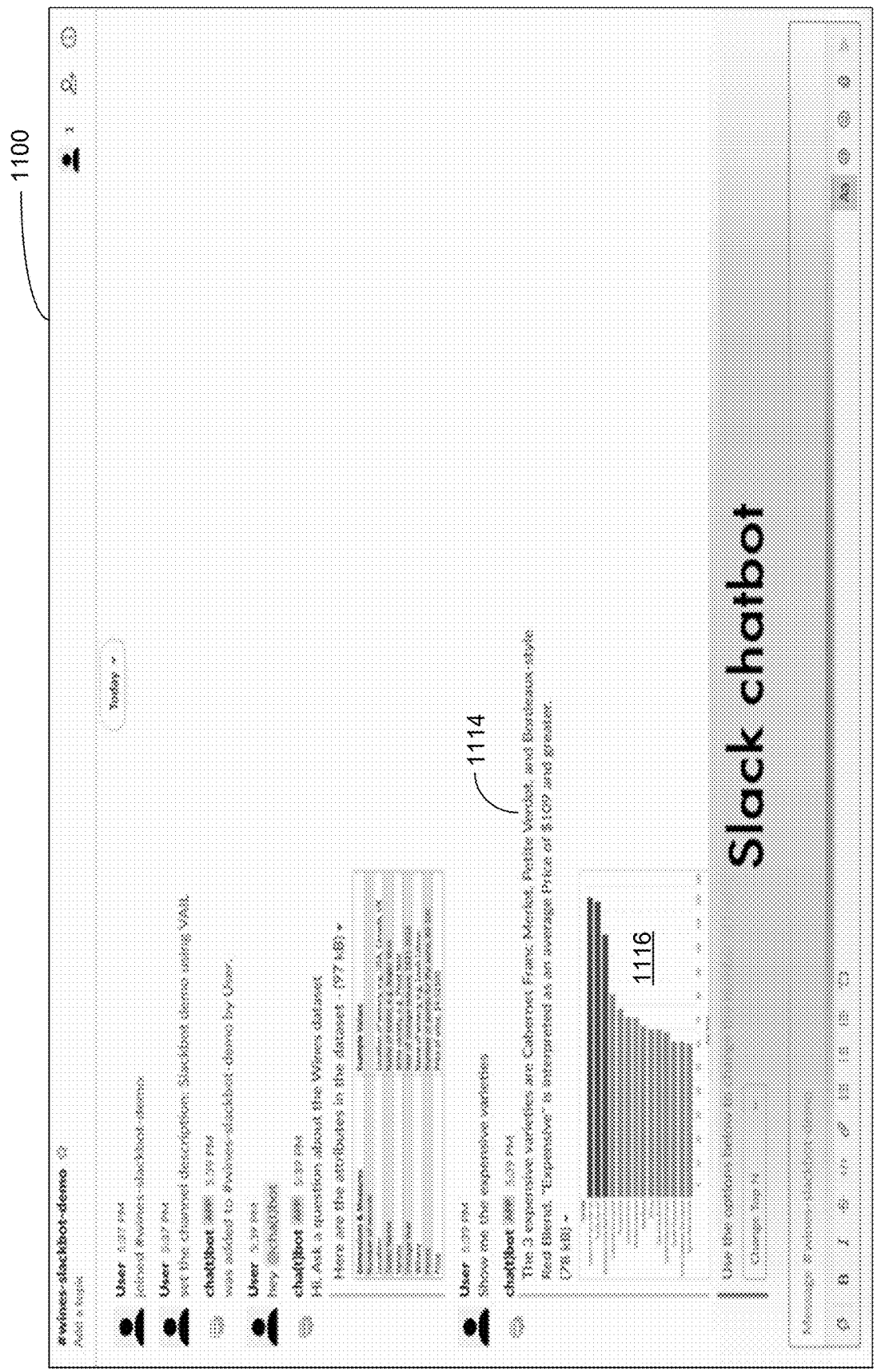
Figure 11C:
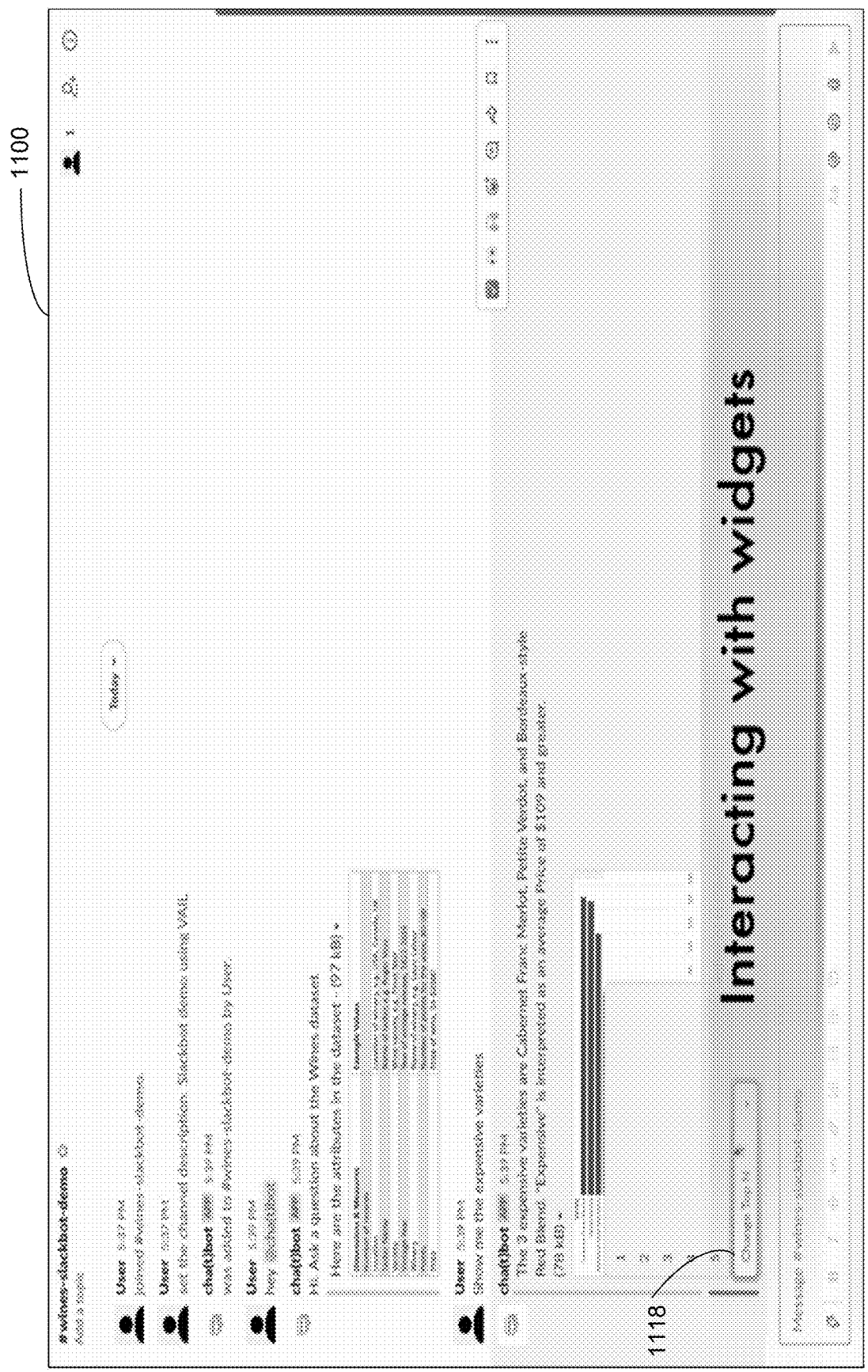
Figure 11D:
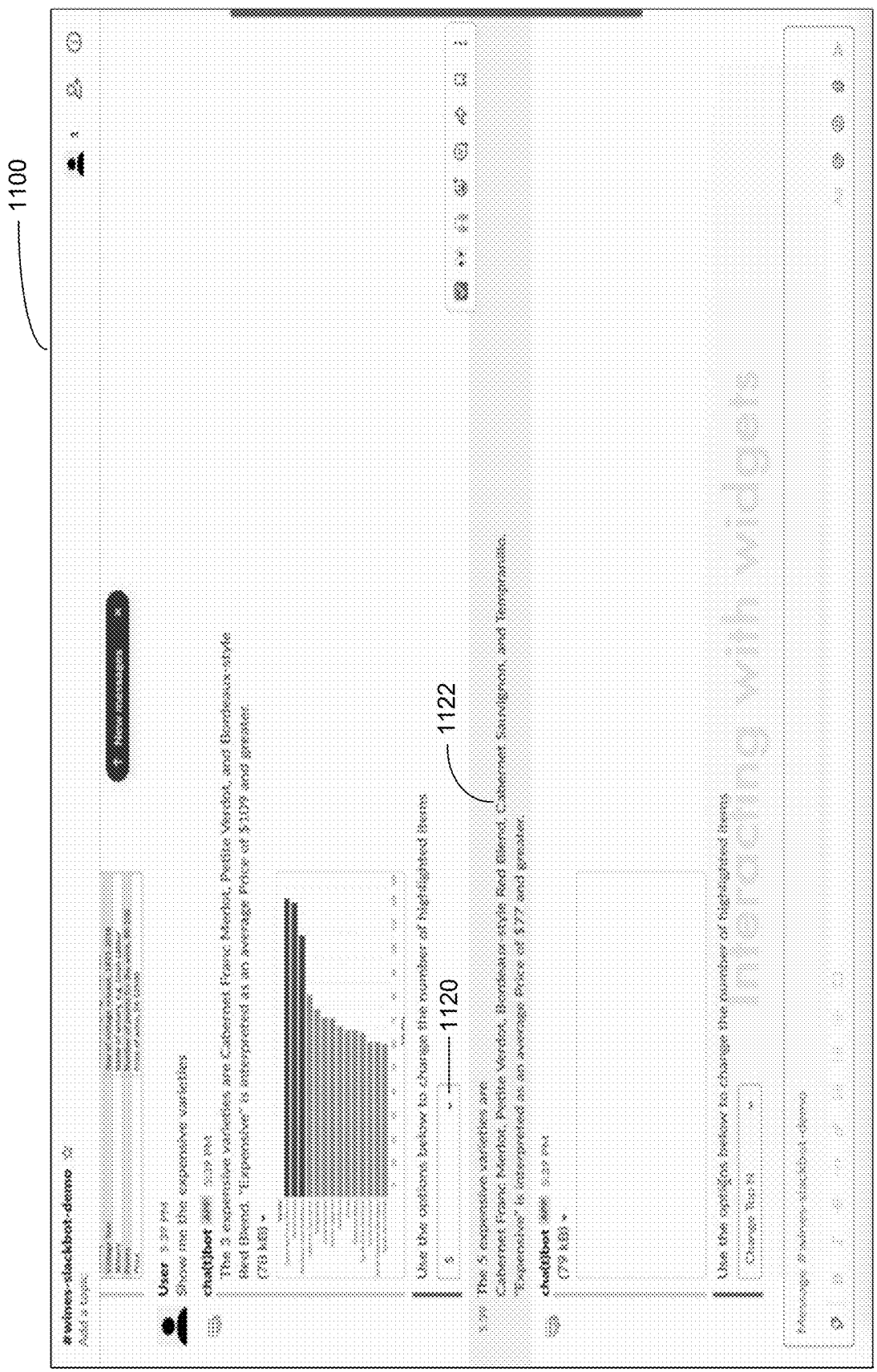

FIGS. 11A-11D show example conversations within a Slack-based interface that implements the chatbot system of FIG. 6, according to some implementations. The interface shows a #wines-slchbot-demo channel where a user (User 1104) is conversing with a chatbot 1106. After the user joins the channel and adds the chatbot 1106 to the channel, the chatbot is shown asking the user "Hi, ask a question about the Wines dataset" 1108 followed by a list 1110 of attributes in the dataset. The user is shown to have typed "Show me the expensive varieties" 1112. The system responds, as shown in FIG. 11B, with a message 1114 about three expensive varieties and displays a chart 1116. Next, as shown in FIG. 11C, the user interacts with a widget 1118. Referring next to FIG. 11D, after the user selects option 5 (label 1120) to change the number of highlighted items, the system responds with a textual message 1122 listing the five most expensive varieties.

Figure 12A:
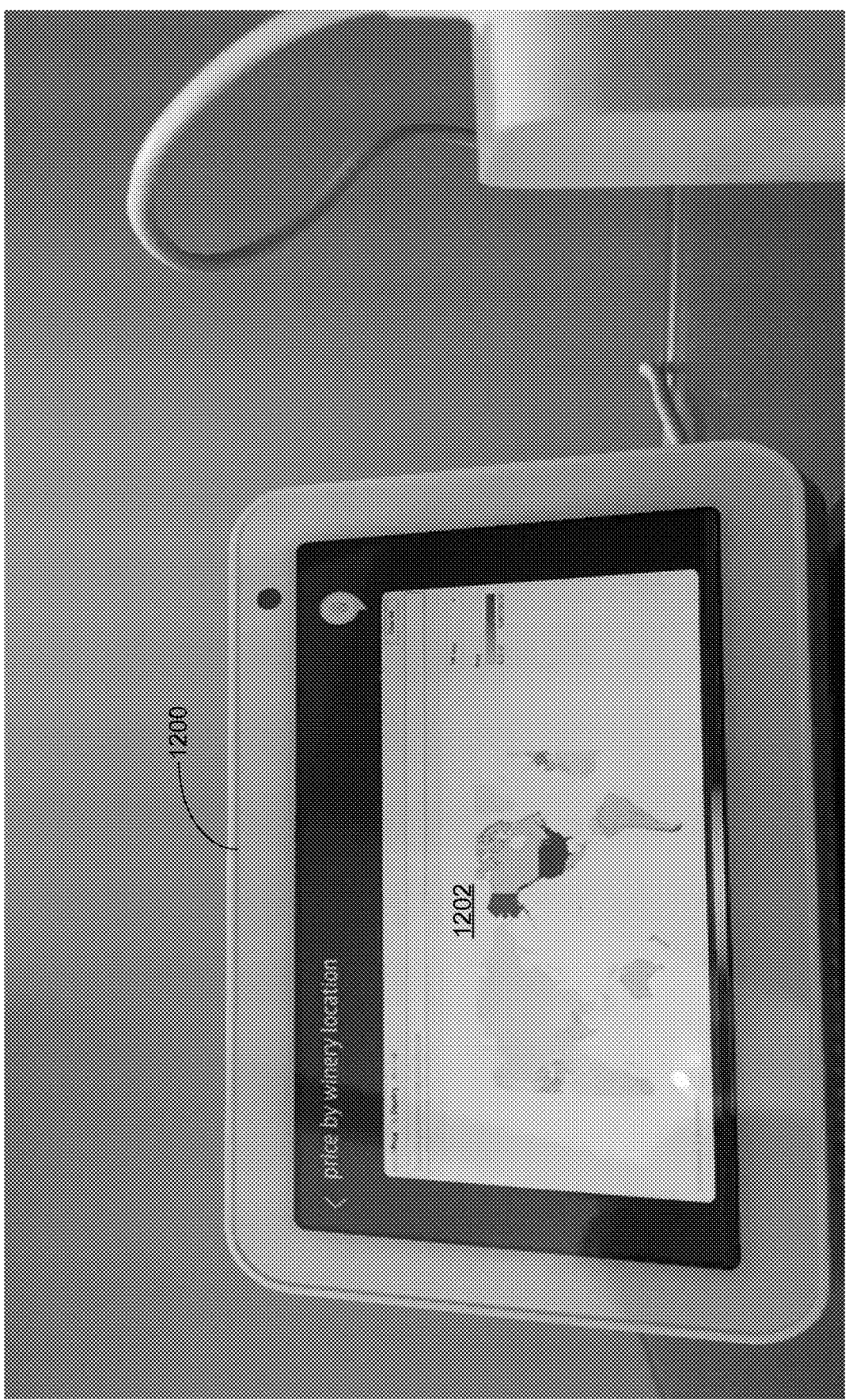
FIGS. 12A and 12B show example conversations within an Echo Show-based interface that implements the chatbot system of FIG. 6, according to some implementations.
Figure 12B:
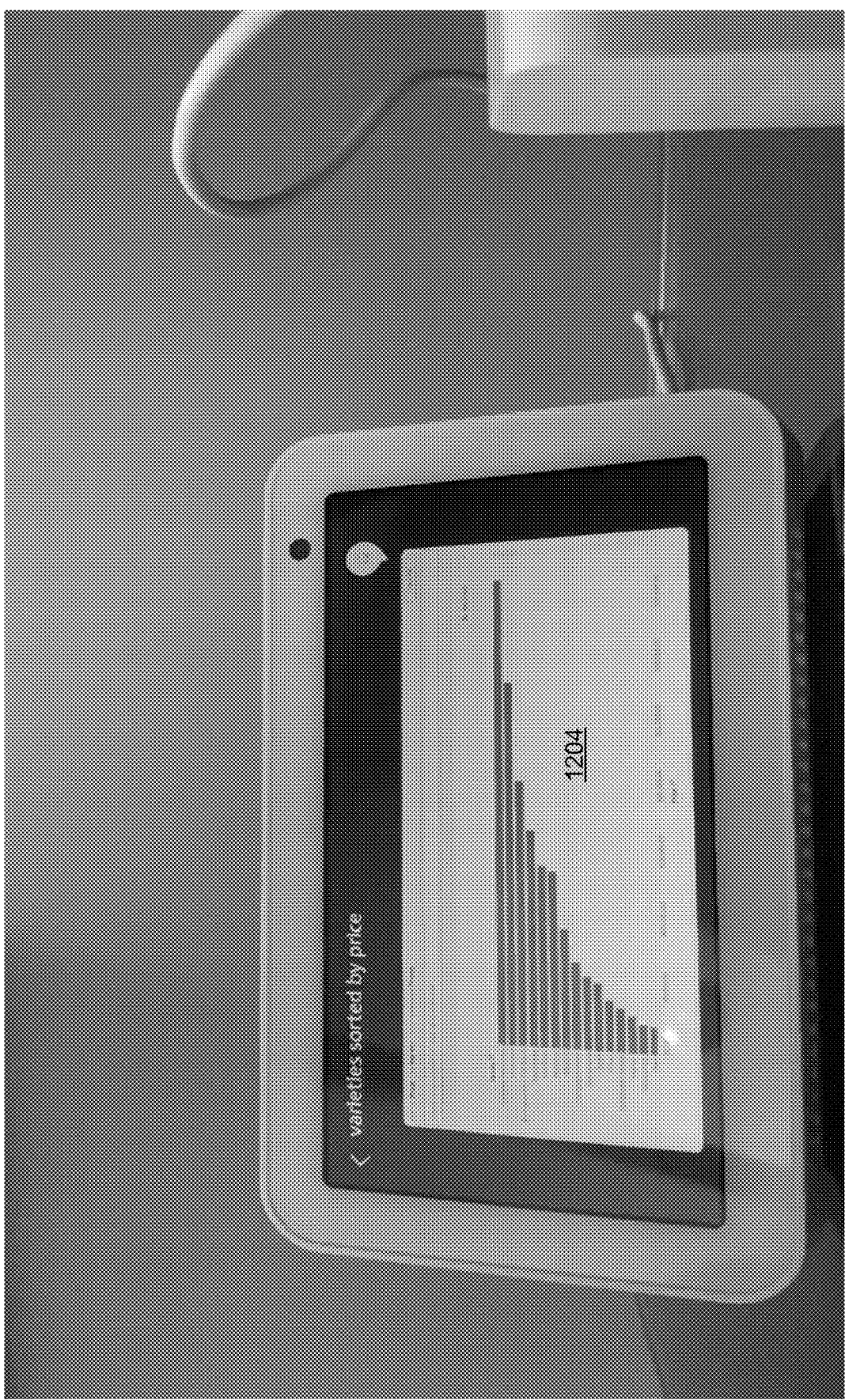

FIGS. 12A and 12B show example conversations within an Echo Show-based interface that implements the chatbot system of FIG. 6, according to some implementations. As shown in FIG. 12A, after a user speaks to the system and utters "show me the wines by location" (not shown), the system (i.e., the Echo Show device 1200) responds with a map 1202 for "price by winery location" and a speech output "the most expensive wines are located in the United States" (not shown). The user subsequently asks, "show me the most expensive varieties" (not shown), to which the system responds, as shown in FIG. 12B, with a chart 1204 and a speech output that is not shown (to name the most expensive variety).

FIGS. 13A-13L provide a flowchart of a method 1300 that uses (1302) natural language for visual analysis of a dataset in a messaging application, according to some implementations. The method is performed (1304) at a computer (e.g., the computing device 200) having a display (e.g., the display 212), one or more processors (e.g., the processors 202), and memory (e.g., the memory 206). The memory stores (1306) one or more programs configured for execution by the one or more processors.

The method includes receiving (1308) a first natural language (NL) input directed to a data source, in the messaging application (e.g., the data visualization application 230 receives NL input received via the conversation module 242). The first NL input includes at least one underspecified or ambiguous utterance, examples of which are described above. The method also includes parsing (1310, e.g., using the language processing module 238) the first NL input into tokens based on a grammar and the data source. In some implementations, parsing the tokens includes resolving (1312) the tokens as data attributes and values, intent lexicons, or modifiers, examples of which are described above in reference to FIG. 6.

The method also includes generating and displaying (1314), in the messaging application, an intermediate NL response, based on the tokens. For example, the language processing module 238 generates the intermediate NL response, and the graphical user interface 232 is used to display the intermediate NL response. For example, in FIG. 3, the text 316 ("Here are the passengers who survived and did not survive") is an intermediate NL response based on tokens parsed from the natural language input 314 ("show me those who survived and did not survive").

Figure 13A:
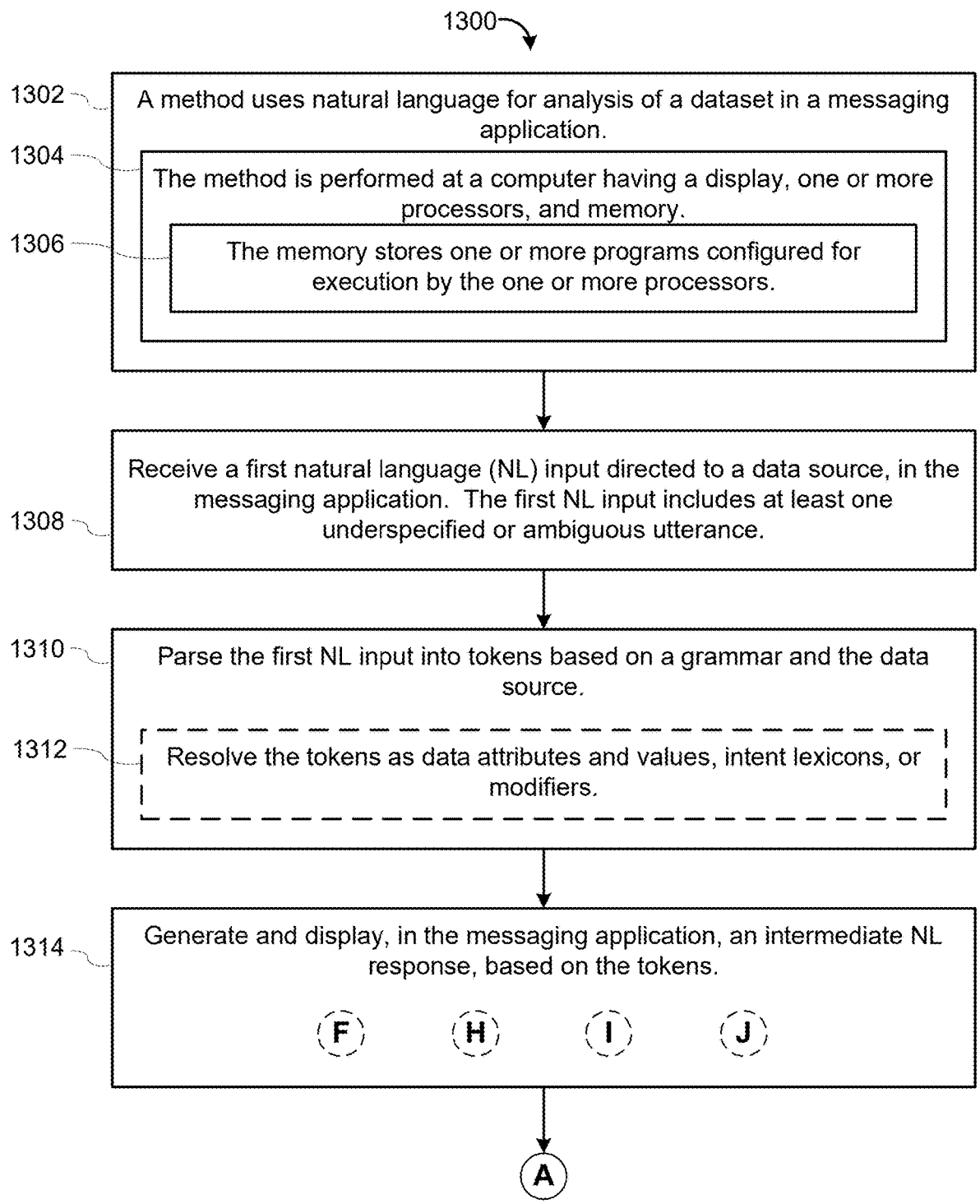
FIGS. 13A-13L provide a flowchart of a method that uses natural language for visual analysis of a dataset in a messaging application, according to some implementations.
Figure 13B:
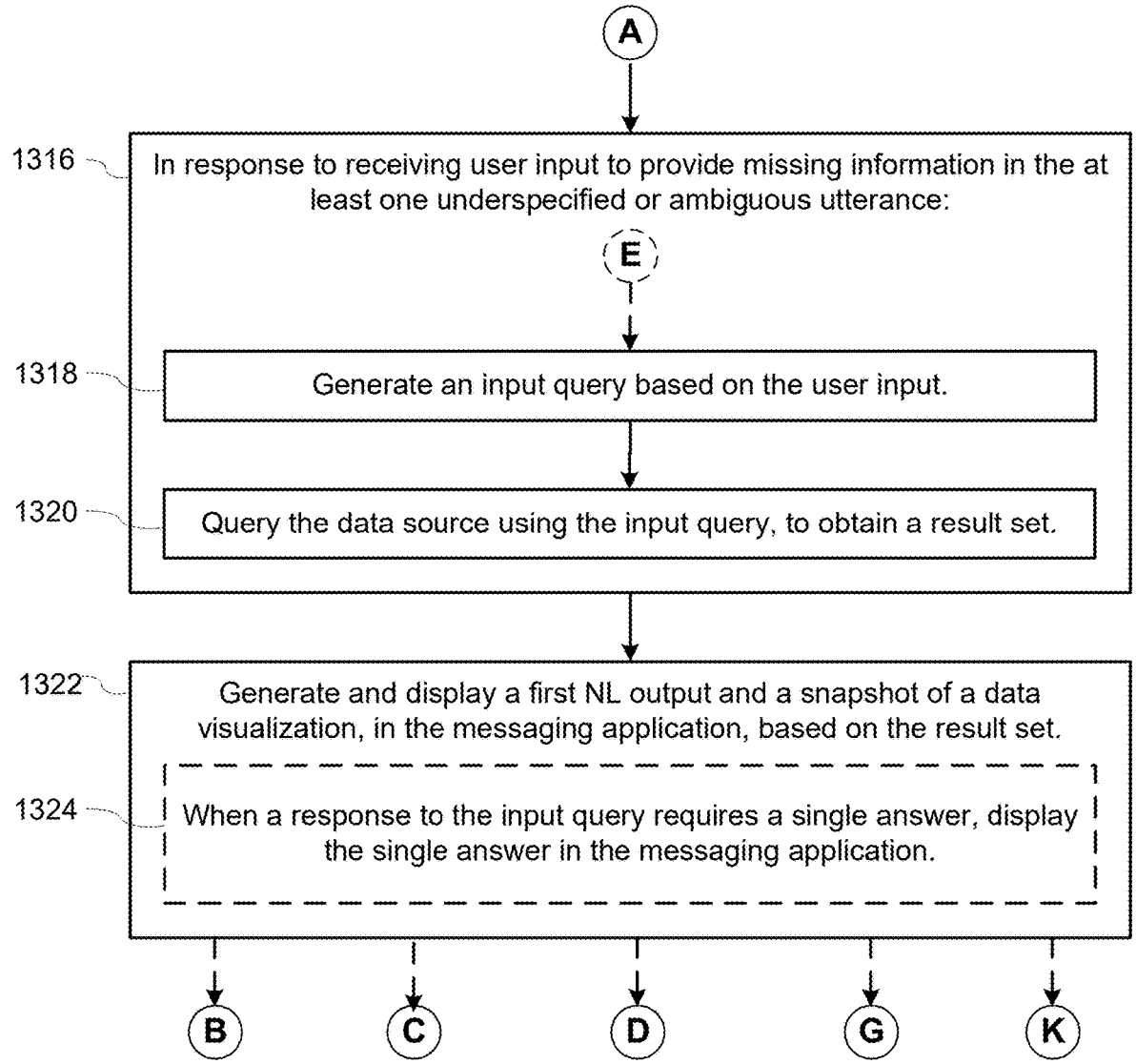

Referring next to FIG. 13B, the method also includes, in response (1316) to receiving a user input to provide missing information in the at least one underspecified or ambiguous utterance: generating (1318) an input query (e.g., using the data visualization application 230) based on the user input; and querying (1320) the data source using the input query, to obtain a result set; and generating and displaying (1322, e.g., using the data visualization generation module 234) a first NL output and a snapshot of a data visualization (e.g., images for the chart 318, the chart 326, or the chart 1110), in the messaging application, based on the result set. For example, FIG. 11C described above illustrates a user interaction with a widget for changing top N (for the most expensive varieties). The system starts by showing three expensive varieties (in the bar chart 1116), but after the user selects top five, the system updates the data visualization to show the top five most expensive varieties. Because the user did not initially provide a precise number for expensive varieties, the system showed a default number (three) of expensive varieties, and updated the data visualization after the user provides the missing information. In some implementations, generating and displaying the snapshot of the data visualization includes, in accordance with a determination that a response to the input query requires a single answer, displaying (1324) the single answer in the messaging application, an example of which is shown and described above in reference to FIGS. 9A and 9C.

Figure 13C:
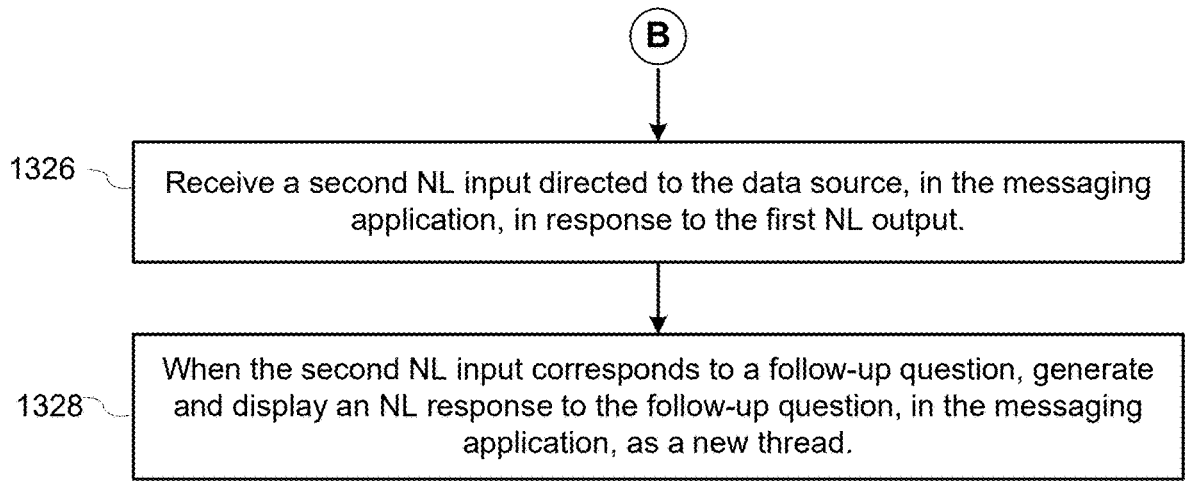

Referring next to FIG. 13C, in some implementations, the method further includes: receiving (1326) a second NL input directed to the data source, in the messaging application, in response to the first NL output; and in accordance with a determination that the second NL input corresponds to a follow-up question (an example of which is described above in reference to FIG. 9C), generating and displaying (1328) an NL response to the follow-up question, in the messaging application, as a new thread.

Figure 13D:
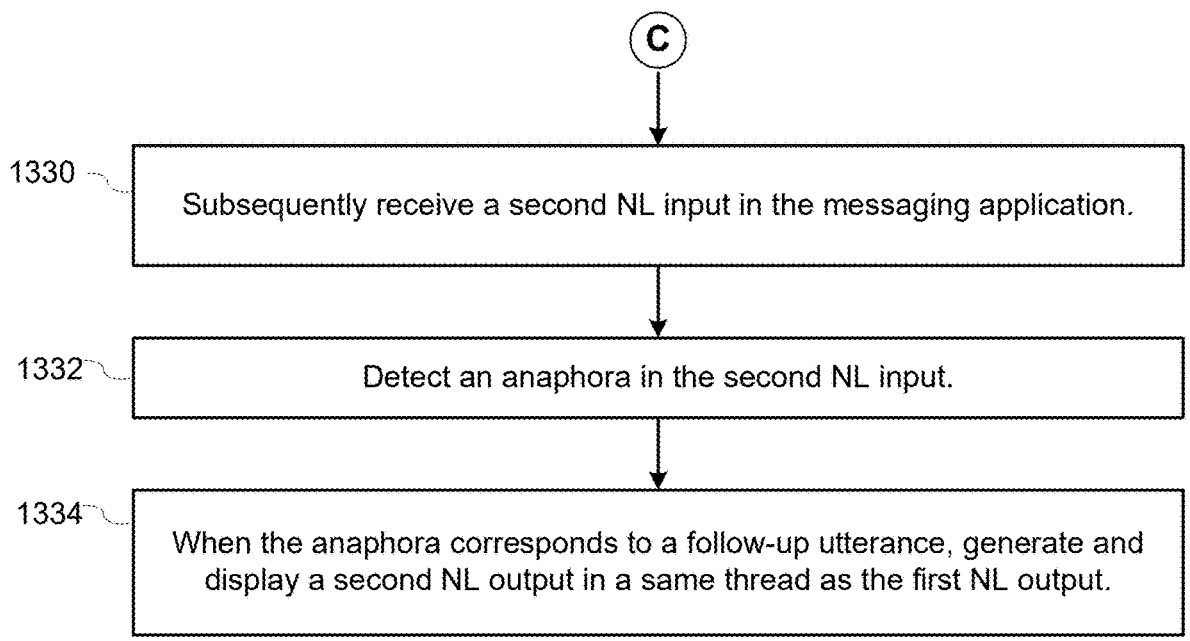

Referring next to FIG. 13D, in some implementations, the method further includes: subsequently receiving (1330) a second NL input in the messaging application; detecting (1332) an anaphora in the second NL input; and in accordance with a determination that the anaphora corresponds to a follow-up utterance (e.g., "that chart"), generating and displaying (1334) a second NL output in a same thread as the first NL output.

Figure 13E:
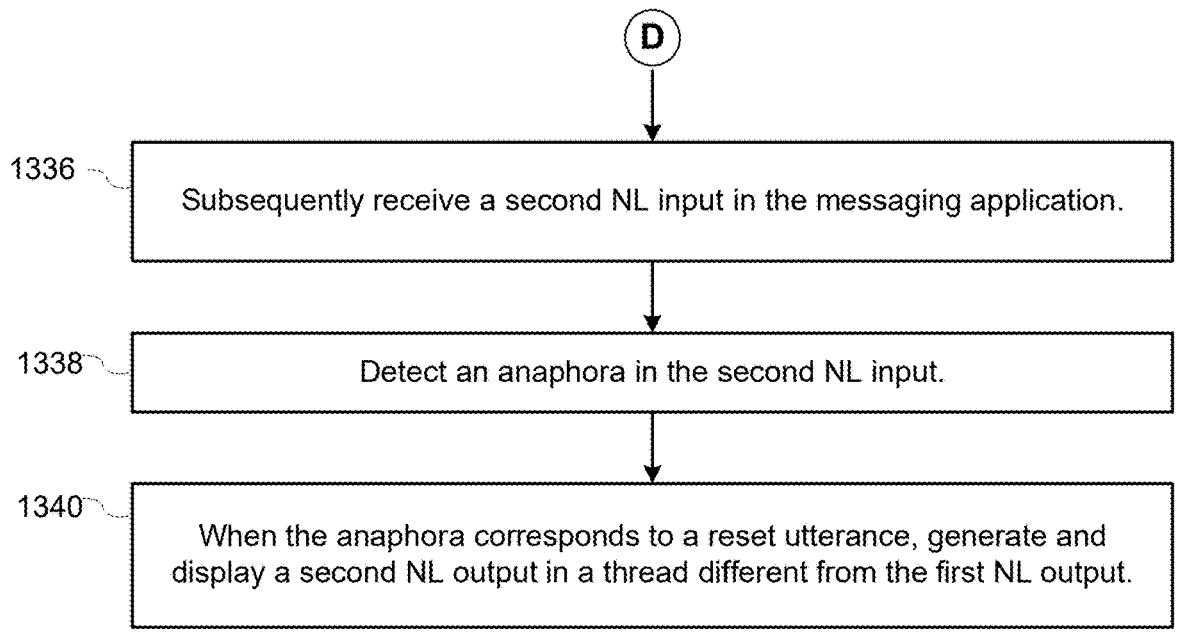

Referring next to FIG. 13E, in some implementations, the method further includes: subsequently receiving (1336) a second NL input in the messaging application; detecting (1338) an anaphora in the second NL input; and in accordance with a determination that the anaphora corresponds to a reset utterance (e.g., "start over"), identifying a break in conversational flow where context should be reset, and generating and displaying (1340) a second NL output in a thread different from the first NL output.

Figure 13F:
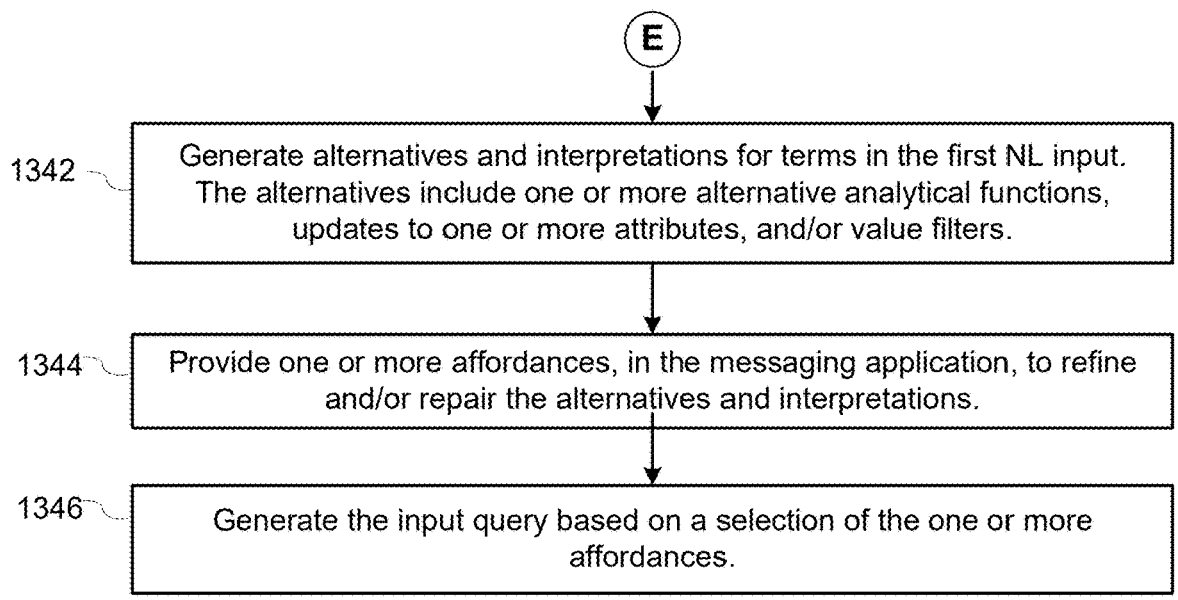

Referring next to FIG. 13F, in some implementations, the method further includes: generating (1342) alternatives and interpretations for terms in the first NL input. The alternatives include one or more alternative analytical functions (e.g. 'average' instead of 'count'), updates to one or more attributes, and/or value filters; providing (1344) one or more affordances, in the messaging application, to refine and/or repair the alternatives and interpretations; and generating (1346) the input query based on a selection of the one or more affordances. For example, similar to how a widget is shown in FIG. 11B, to change top N, a drop-down menu may be shown with options for alternative analytical functions, updates to one or more attributes, and/or value filters.

Figure 13G:
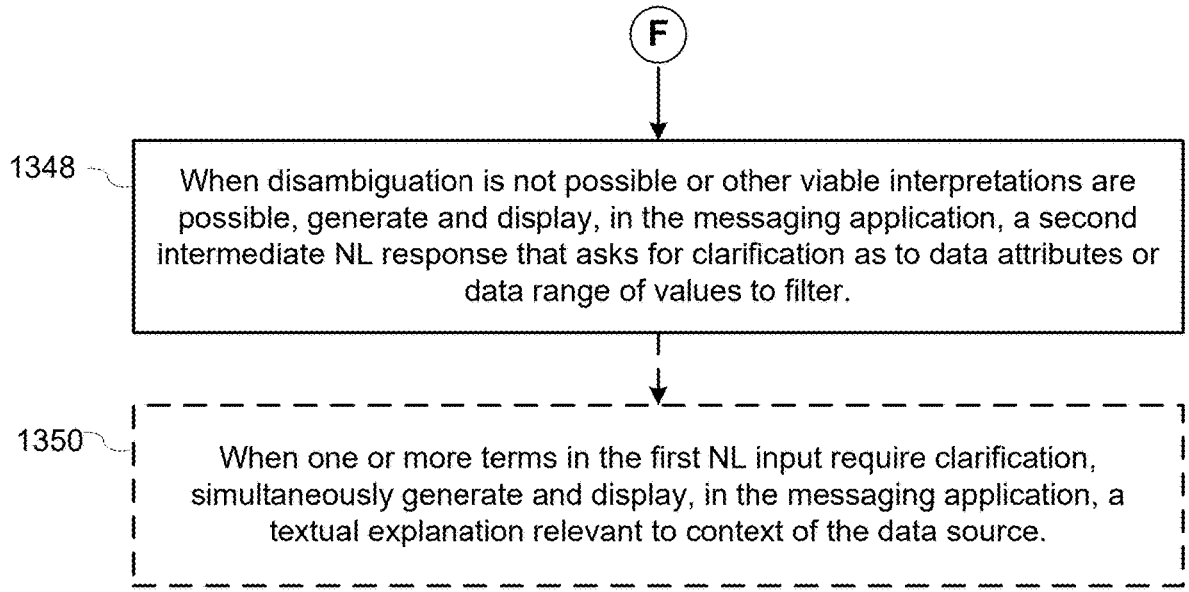

Referring next to FIG. 13G, in some implementations, the method further includes: in accordance with a determination that disambiguation is not possible or other viable interpretations are possible, generating and displaying (1348), in the messaging application, a second intermediate NL response that asks for clarification as to data attributes or data range of values to filter. In some implementations, the method further includes: in accordance with a determination that one or more terms in the first NL input require clarification, simultaneously generating and displaying (1350), in the messaging application, a textual explanation relevant to context of the data source. For example, the attributes shown in the table 1110 along with the preceding text ("Here are the attributes in the dataset") may be shown in accordance with a determination that disambiguation is not possible or other viable interpretations are possible.

Figure 13H:
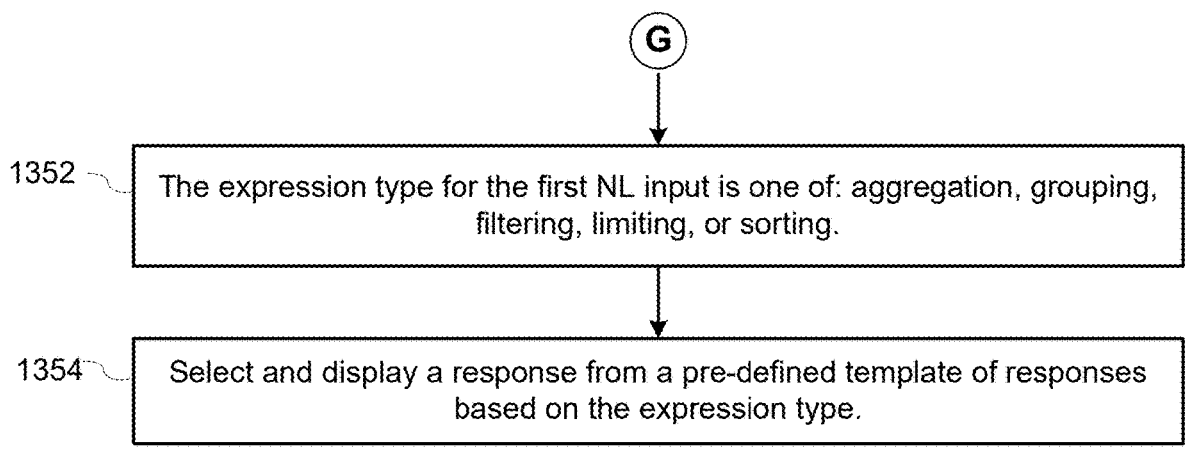

Referring next to FIG. 13H, in some implementations, the method further includes: selecting (1352) an expression type for the first NL input from amongst aggregation, grouping, filtering, limiting and sorting; and selecting and displaying (1354) a response from a pre-defined template of responses based on the expression type.

Figure 13I:
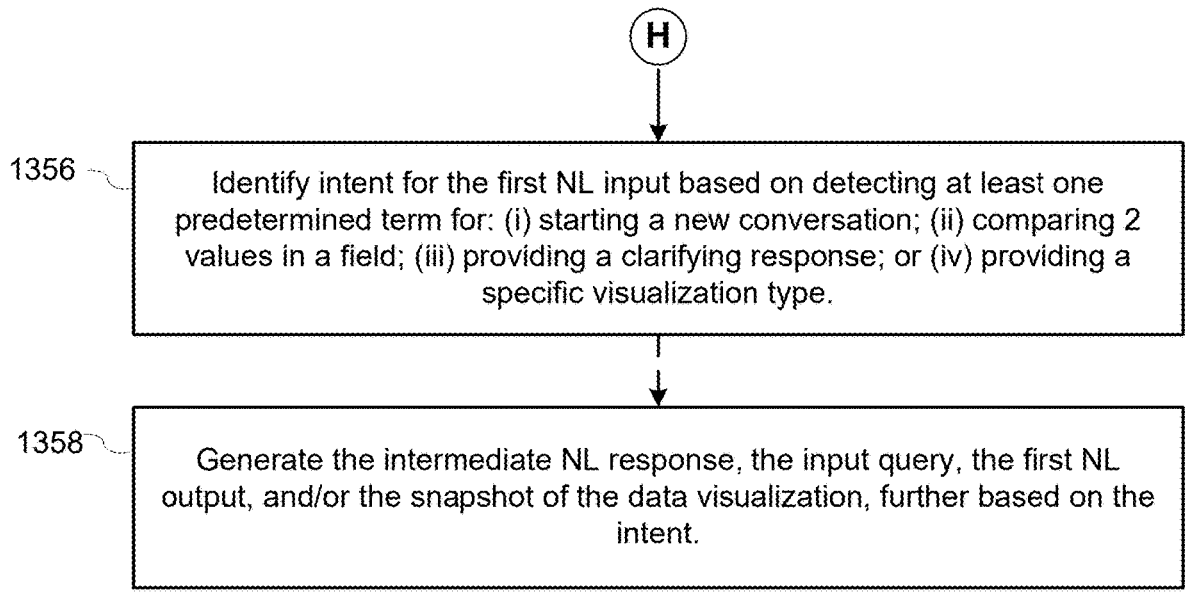

Referring next to FIG. 13I, in some implementations, the method further includes: identifying (1356) intent for the first NL input based on detecting at least one predetermined term for: (i) starting a new conversation (e.g., "clear"); (ii) comparing two values in a field ("e.g., compare"); (iii) providing a clarifying response ("clarification"); or (iv) providing a specific visualization type ("bar chart"); and generating (1358) the intermediate NL response, the input query, the first NL output, and/or the snapshot of the data visualization, further based on the intent.

Figure 13J:
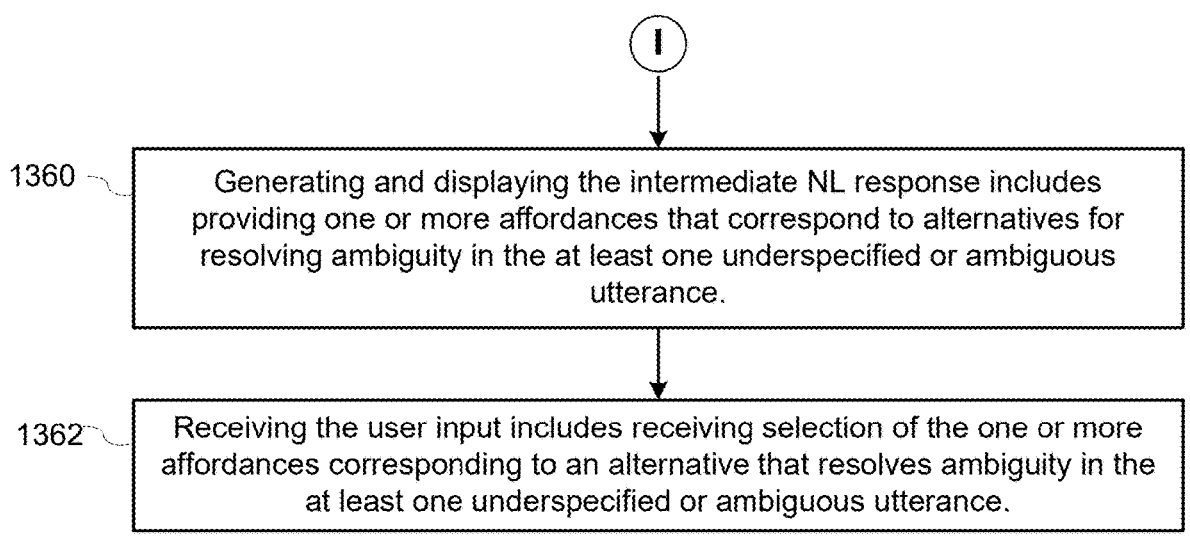

Referring next to FIG. 13J, in some implementations, generating and displaying the intermediate NL response includes providing one or more affordances (e.g., the widget 322) that correspond to alternatives for resolving ambiguity in the at least one underspecified or ambiguous utterance; and receiving the user input includes receiving (1362) a selection of the one or more affordances corresponding to an alternative that resolves ambiguity in the at least one underspecified or ambiguous utterance. For example, the system may show a drop-down menu for selecting a value for a data field, and receive a user input ("e.g., selection of one of the values) to confirm the alternative.

Figure 13K:
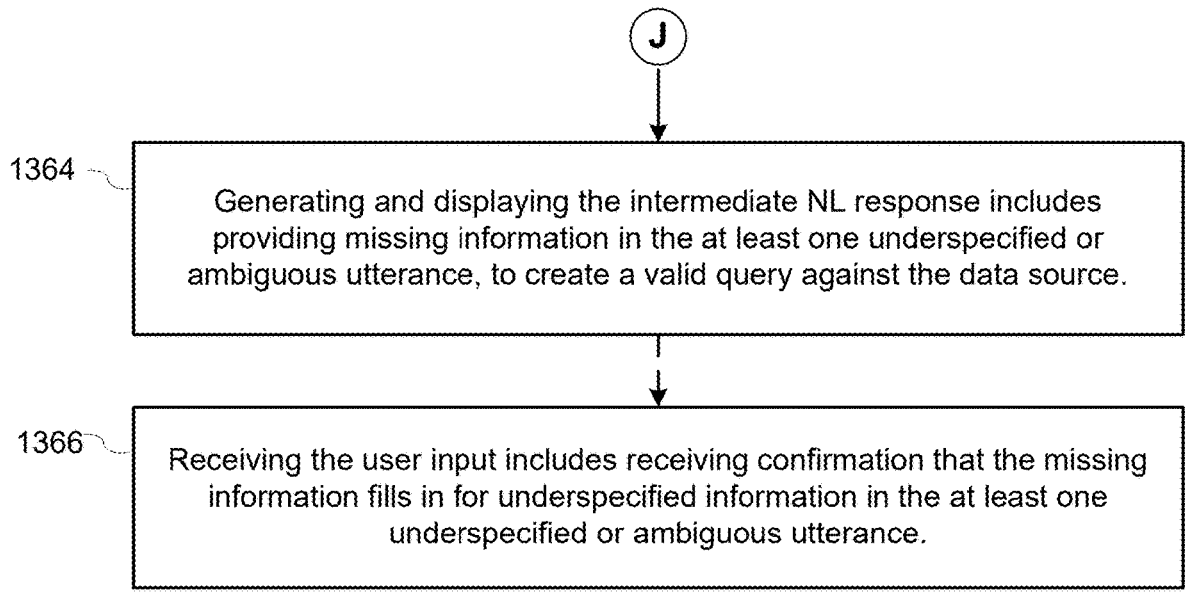

Referring next to FIG. 13K, in some implementations, generating and displaying the intermediate NL response includes providing (1364) missing information in the at least one underspecified or ambiguous utterance, to create a valid query against the data source; and receiving the user input includes receiving (1366) a confirmation that the missing information fills in for underspecified information in the at least one underspecified or ambiguous utterance. For example, the system may add "Did you mean" followed by a value for a data field, and receive a user input ("e.g., "Yes") to confirm the alternative.

Figure 13L:
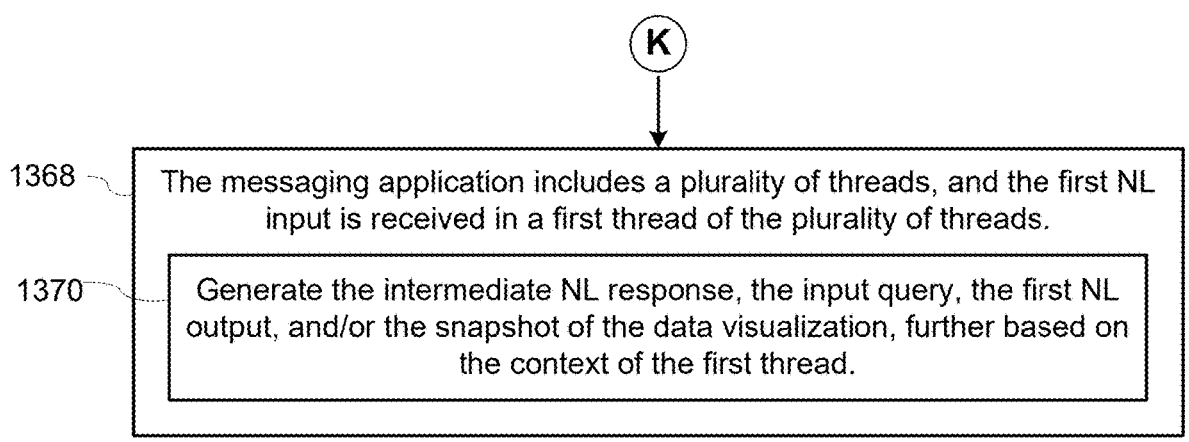

Referring next to FIG. 13L, in some implementations, the messaging application includes (1368) a plurality of threads, and wherein the first NL input is received in a first thread of the plurality of threads, and the method further includes generating (1370) the intermediate NL response, the input query, the first NL output, and/or the snapshot of the data visualization, further based on a context of the first thread. Thread context may include utterances in the thread, preferences for specific data visualizations, terms that indicate intent, values for data fields, filters, and/or any information, that may be used in subsequent data visualizations, for a user, and/or for a group of users (e.g., users in a Slack channel). For example, if users in a channel prefer a bar chart to a pie chart, the system will automatically generate bar charts for data visualizations in the channel. As another example, if a user associates a value to a data field and/or applies a specific filter, in subsequent data visualizations (and/or for generating the query), the system may automatically associate the value the data field, and/or apply the filter, for subsequent queries and/or data visualizations.

FIGS. 14A-14H provide a flowchart of a method 1400 that uses (1402) natural language for visual analysis of a dataset based on input and/or output modalities of clients, according to some implementations. The method is performed (1404) at a computer (e.g., the computing device 200) having a display (e.g., the display 212), one or more processors (e.g., the processors 202), and memory (e.g., the memory 206). The memory stores (1406) one or more programs configured for execution by the one or more processors.

The method includes receiving (1408) a first natural language (NL) input directed to a data source, from a first client. For example, the data visualization application 230 receives NL input received via the conversation module 242. As another example, in FIG. 6, the Chatbot server 604 may receive NL input from any client device that is communicatively connected to the chatbot client 602. Referring next to FIG. 14F, in some implementations, the method further includes: prior to receiving (1478) the first NL input: in accordance with a determination (1480) that the output modality of the first client includes a display: generating and displaying (1482), on the first client, a brief summary of the data source on the display of the first client; and in accordance with a determination (1484) that the output modality of the second client includes voice-only responses: generating and playing (1486), on the first client, a speech output corresponding to a brief textual summary of the data source.

Referring back to FIG. 14A, the method also includes parsing (1410, e.g., using the language processing module 238) the first NL input into tokens based on a grammar and the data source.

The method also includes generating and outputting (1412) an intermediate NL response, to a second client, based on the tokens and output modality of the second client. For example, the language processing module 238 generates the intermediate NL response, and the graphical user interface 232 is used to display the intermediate NL response. As another example, the language processing module 238 generates the intermediate NL response, and the audio I/O module 228 is used to convert text to speech and/or output speech corresponding to the intermediate NL response. In some implementations, the first client and the second client are (1414) different applications. For example, the first client is a communication application (e.g., a messaging application, such as Slack), and the second client is a web browser. In some implementations, the first client and the second client are (1416) a same application executing on different devices. For example, the first client and the second client are a messaging application on a desktop and a mobile device, or vice versa. In some implementations, input modality of the first client is (1418) different from the output modality of the second client. For example, the first client is a Bluetooth device with an audio input modality (i.e., the device accepts speech input), and the second client is an iPad with audio and video output capabilities.

Figure 14A:
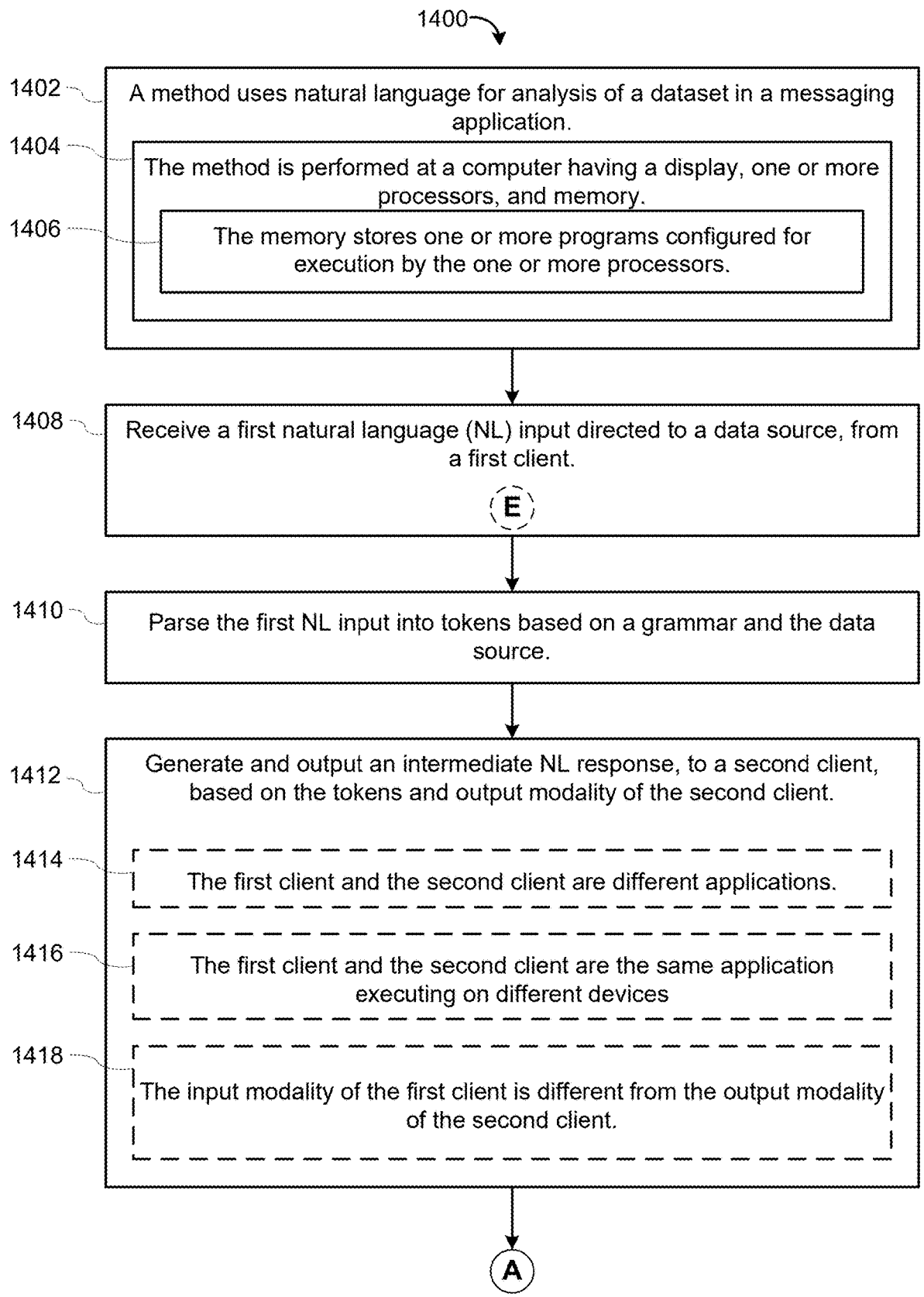
FIGS. 14A-14H provide a flowchart of a method that uses natural language for visual analysis of a dataset based on input and/or output modalities of clients, according to some implementations.
Figure 14B:
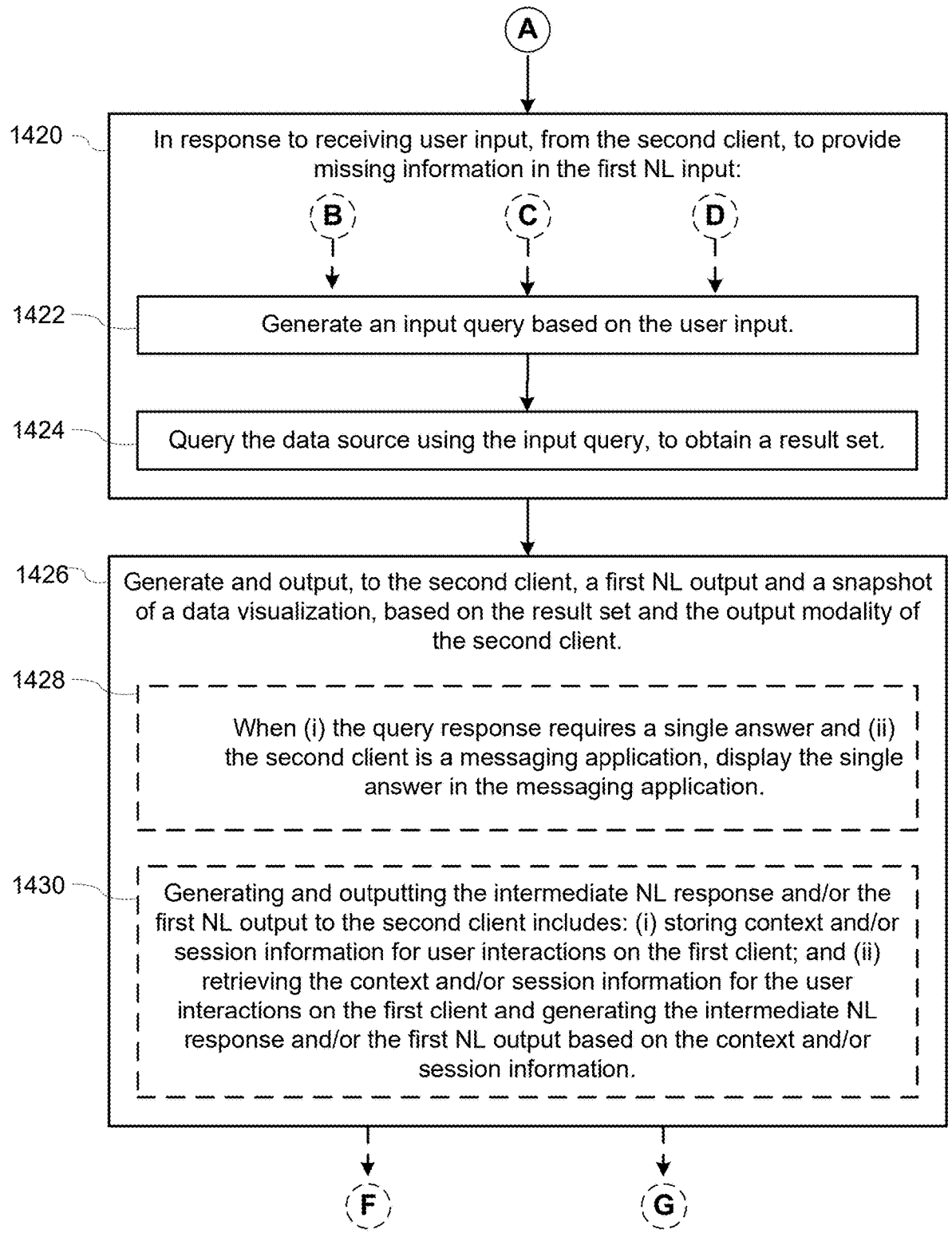

Referring next to FIG. 14B, the method also includes in response to receiving (1420), from the second client, a user input to provide missing information in the first NL input: generating (1422) an input query (e.g., using the data visualization application 230) based on the user input; and querying (1424) the data source using the input query, to obtain a result set.

Figure 14C:
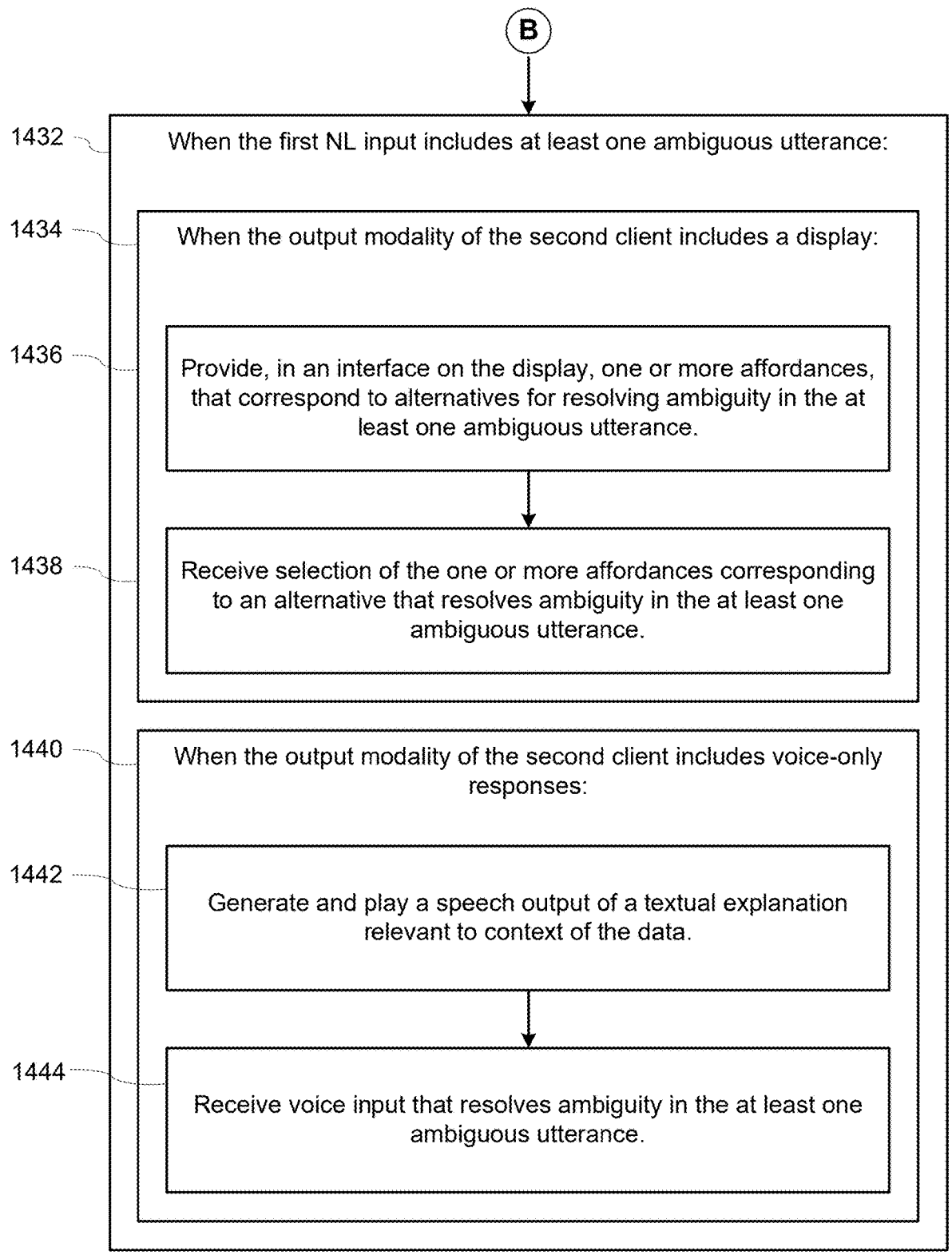

Referring next to FIG. 14C, in some implementations, the method further includes: in accordance with a determination (1432) that the first NL input includes at least one ambiguous utterance: in accordance with a determination (1434) that the output modality of the second client includes a display: providing (1436), in an interface on the display of the second client, one or more affordances, that correspond to alternatives for resolving ambiguity in the at least one ambiguous utterance; and receiving (1438), from the second client, a selection of the one or more affordances corresponding to an alternative that resolves ambiguity in the at least one ambiguous utterance; and in accordance with a determination (1440) that the output modality of the second client includes voice-only responses: generating and playing (1442), on the second client, a speech output of a textual explanation relevant to context of the data; and receiving (1444), from the second client, a voice input that resolves ambiguity in the at least one ambiguous utterance.

Figure 14D:
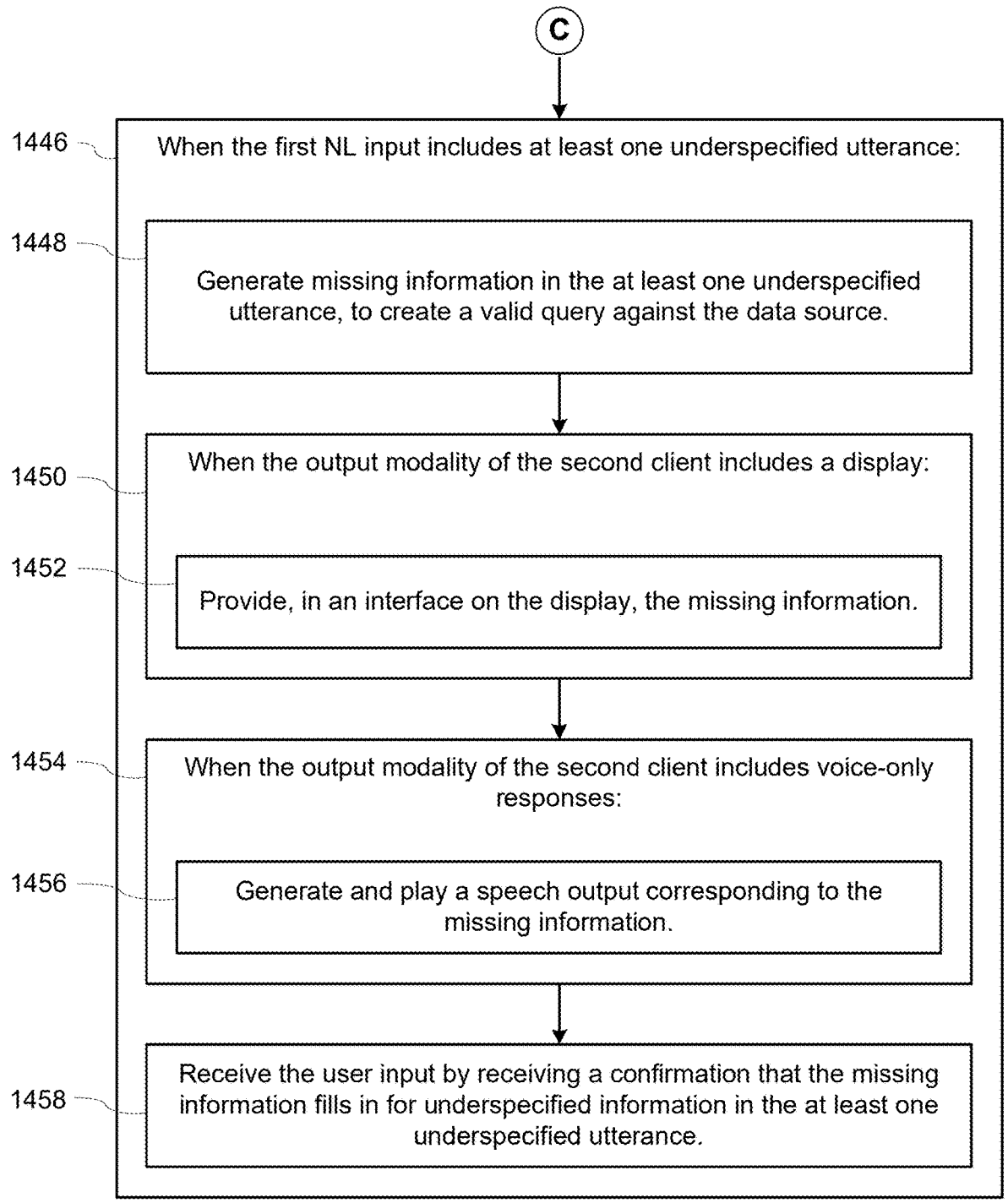

Referring next to FIG. 14D, in some implementations, the method further includes: in accordance with a determination (1446) that the first NL input includes at least one underspecified utterance: generating (1448) missing information in the at least one underspecified utterance, to create a valid query against the data source; in accordance with a determination (1450) that the output modality of the second client includes a display: providing (1452), in an interface on the display of the second client, the missing information; in accordance with a determination (1454) that the output modality of the second client includes voice-only responses: generating and playing (1456), on the second client, a speech output corresponding to the missing information; and receiving (1458) the user input comprises receiving, from the second client, a confirmation that the missing information fills in for underspecified information in the at least one underspecified utterance.

Figure 14E:
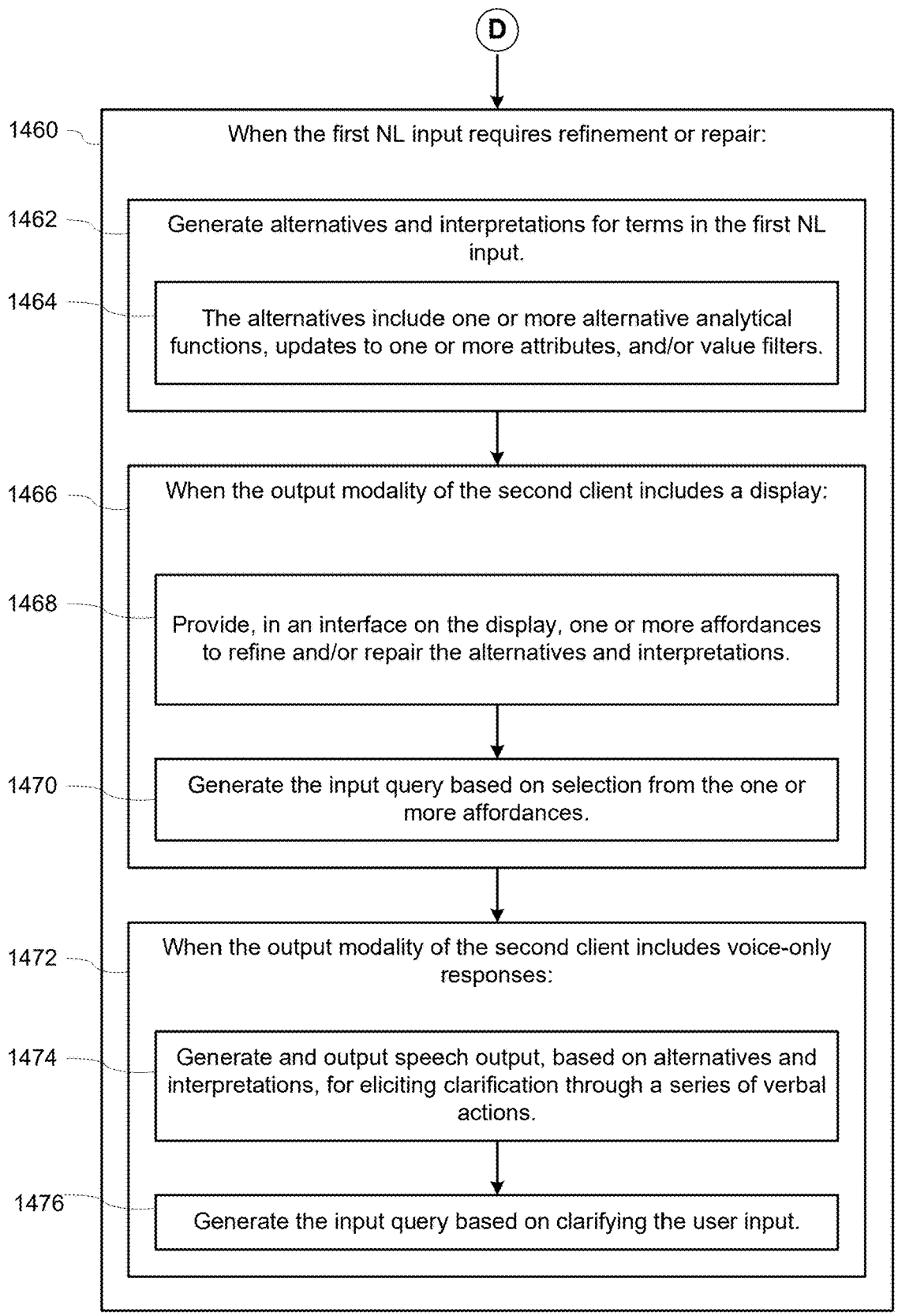
Figure 14F:
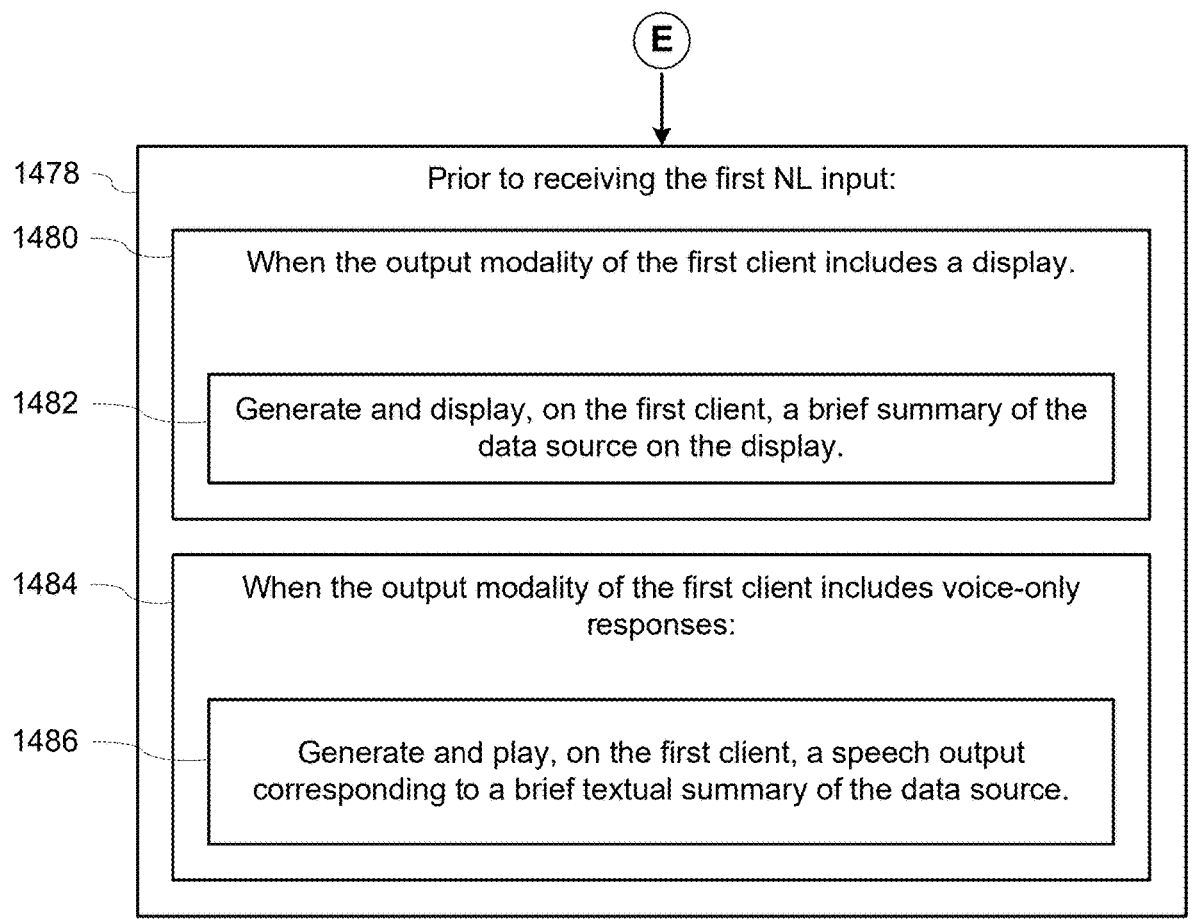

Referring next to FIG. 14E, in some implementations, the method further includes: in accordance with a determination (1460) that the intermediate NL response requires refinement or repair: generating (1462) alternatives and interpretations for terms in the first NL input. The alternatives include (1464) one or more alternative analytical functions, updates to one or more attributes, and/or value filters; in accordance with a determination (1466) that the output modality of the second client includes a display: providing (1468), in an interface on the display of the second client, one or more affordances to refine and/or repair the alternatives and interpretations; and generating (1470) the input query based on a selection of the one or more affordances on the second client; and in accordance with a determination (1472) that the output modality of the second client includes voice-only responses: generating and outputting (1476), on the second client, speech output, based on alternatives and interpretations, for eliciting clarification through a series of verbal actions; and generating the input query based on a clarifying user input on the second client.

Referring back to FIG. 14B, the method also includes generating and outputting (1426), to the second client, a first NL output and a snapshot of a data visualization (e.g., using the data visualization generation module 234), based on the result set and the output modality of the second client.

In some implementations, generating and outputting the snapshot of the data visualization includes: in accordance with a determination that (i) the query response requires a single answer and (ii) the second client is a messaging application, displaying (1428) the single answer in the messaging application. In some implementations, generating and outputting the intermediate NL response and/or the first NL output to the second client includes performing (1430): storing context and/or session information for user interactions on the first client; and retrieving the context and/or session information for the user interactions on the first client and generating the intermediate NL response and/or the first NL output based on the context and/or session information. Examples of context information are described above in reference to FIG. 13L, according to some implementations. Session information may include identifiers for application, user, device, time of day, user preferences, login information, duration of a session, and/or security information for session management, that may be used in subsequent sessions, for the same user, and/or a group of users. For example, the system assigns a security level for a user, during a session, and for all subsequent conversations with the user, the same security level may be used, for accessing files or data sources. As another example, other users or other devices that the one a user used for a conversation may not be able to access at least some parts of a conversation or data visualizations showed therein.

Figure 14G:
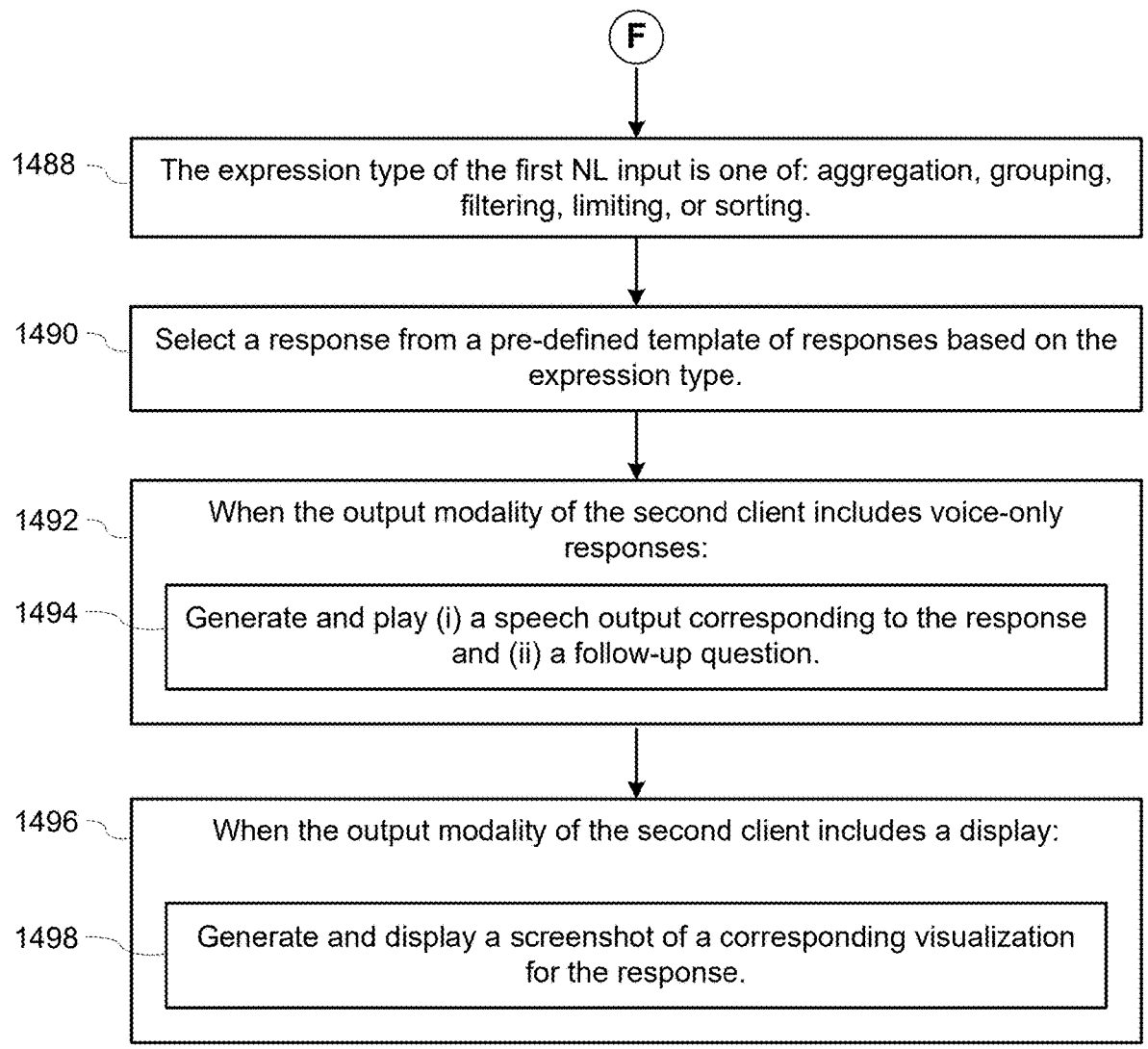

Referring next to FIG. 14G, in some implementations, the method further includes: selecting (1488) an expression type for the first NL input from amongst aggregation, grouping, filtering, limiting and sorting; selecting (1490) a response from a pre-defined template of responses based on the expression type; in accordance with a determination (1492) that the output modality of the second client includes voice-only responses: generating and playing (1494), on the second client, (i) a speech output corresponding to the response and (ii) a follow-up question; and in accordance with a determination (1496) that the output modality of the second client includes a display: generating and displaying (1498), on the second client, a screenshot of a corresponding visualization for the response.

Figure 14H:
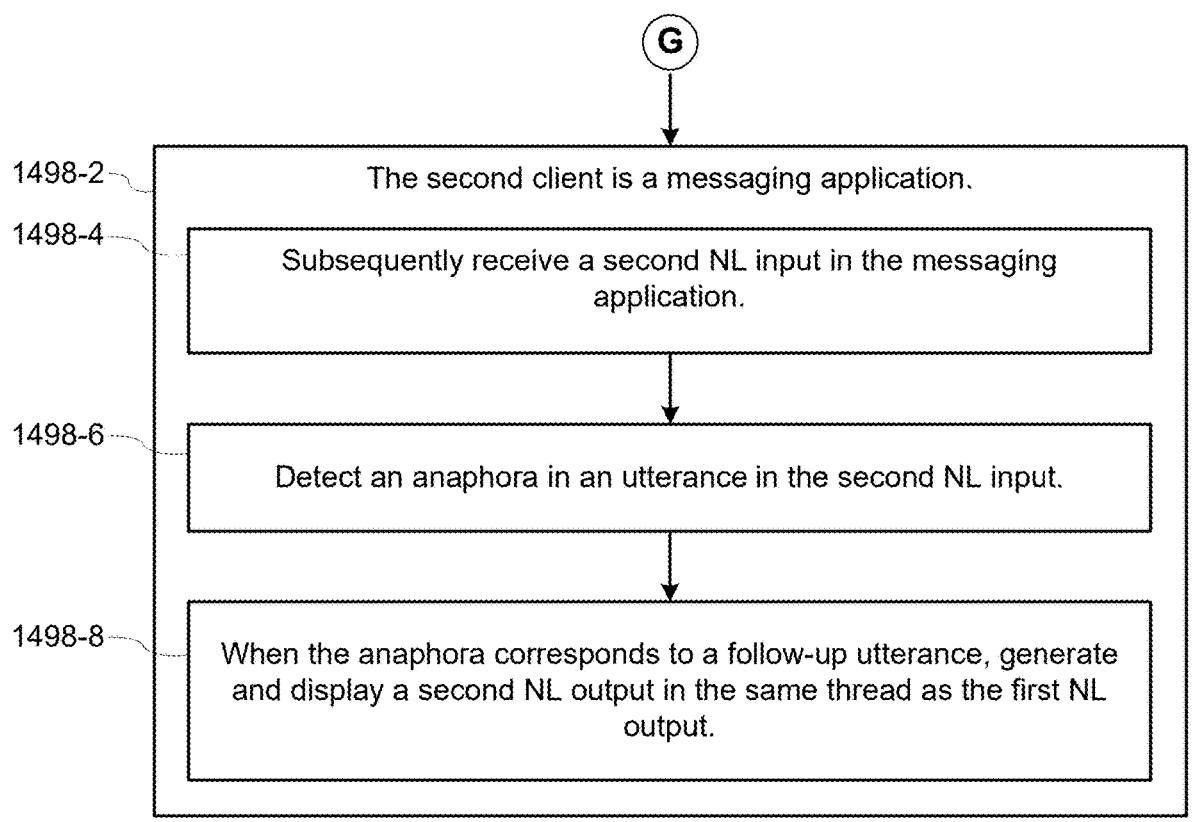

Referring next to FIG. 14H, in some implementations, the second client is (1498-2) a messaging application, the method further includes: subsequently receiving (1498-4) a second NL input in the messaging application; detecting (1498-6) an anaphora in an utterance in the second NL input; in accordance with a determination that the anaphora corresponds to a follow-up utterance: generating and displaying (1498-8) a second NL output in a same thread as the first NL output.

In this way, analytical chatbots may be designed for data analytics. Although conventional interaction design guidelines for chatbots are generally applicable, additional principles inherent to data exploration may be implemented in a system. Results described above suggest approaches to interpret intent and reveal variations in user behavior based on the modality and interface affordances. Users tend to ask fact-finding or simple analytic questions, often as single-turn conversations, when interacting via voice alone. Adding charts, together with voice or text interaction, encourage multi-turn conversation and deeper analytical questions. Threading and widgets especially encourage this sort of behavior. Preferred affordances for follow-up adjustments differed across the platforms, with voice prompts being the overall preferred approach for voice-based chatbots and widgets heavily used in the Slack chatbot. Overall, these studies provide a better understanding of principles for designing analytical chatbots, highlighting the intricacies of language pragmatics and analytical complexities with the UI capabilities of the platform. The techniques described herein may be used to design intelligent analytical chatbots.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for analysis of a data source in a messaging application, comprising:
   receiving a first natural language (NL) input directed to a data source, in an interface of the messaging application, wherein (i) the messaging application supports multiple concurrent analytical conversations, (ii) each analytical conversation is managed as a separate thread with its own analytical context, and (iii) the first NL input is received in a first conversation thread of a plurality of conversation threads of the messaging application;
   parsing the first NL input into tokens based on a grammar and the data source;
   determining that the first NL input includes an underspecified utterance and/or an ambiguous utterance, wherein the underspecified utterance omits information for creating a valid query and the ambiguous utterance specifies multiple ways in which the first NL input can be interpreted;
   generating and displaying, in the messaging application, an intermediate NL response, based on the tokens and an analytical context of the first conversation thread in which the first NL input was received;
   receiving a user input that provides information for clarifying the underspecified utterance and/or the ambiguous utterance;
   in response to receiving the user input:
      generating an input query based on the user input and the analytical context of the first conversation thread; and
      querying the data source using the input query, including restricting the querying to the analytical context of the first conversation thread in which the first NL input was received, to obtain a result set;
   generating and displaying a first NL output and a snapshot of a data chart, in the messaging application, based on the result set and within the first conversation thread corresponding to the analytical conversation, wherein the snapshot of the data chart is generated as an interactive image embedded inline within the first conversation thread, wherein the interactive image comprises one or more user-selectable widgets for modifying the data chart, and wherein user interaction with the one or more user-selectable widgets triggers updates to the data chart within the first conversation thread;
   receiving a second NL input directed to the same data source, in the first conversation thread;
   detecting an anaphora in the second NL input, the anaphora comprising a linguistic element in the second NL input that refers back to a prior utterance in the first conversation thread; and
   in response to detecting the anaphora:
      in accordance with a determination that the anaphora corresponds to a follow-up utterance, generating and displaying a second NL output in the same first conversation thread as the first NL output; and
      in accordance with a determination that the anaphora corresponds to a reset utterance, identifying a break in conversational flow where the analytical context should be reset, and generating and displaying a second NL output in a second conversation thread different from the first conversation thread.

2. The method of claim 1, further comprising:
   receiving a third second NL input directed to the data source, in the messaging application, in response to the first NL output; and
   in accordance with a determination that the third second NL input corresponds to a follow-up question, generating and displaying an NL response to the follow-up question, in the messaging application, as a new thread.

3. The method of claim 1, further comprising:
   generating alternatives and interpretations for terms in the first NL input, wherein the alternatives include one or more alternative analytical functions, updates to one or more attributes, and/or value filters;
   providing one or more affordances, in the messaging application, to refine and/or repair the alternatives and interpretations; and
   generating the input query based on a selection of the one or more affordances.

4. The method of claim 1, further comprising:
   in accordance with a determination that disambiguation is not possible or other viable interpretations are possible, generating and displaying, in the messaging application, a second intermediate NL response that asks for clarification as to data attributes or data range of values to filter.

5. The method of claim 4, further comprising:
   in accordance with a determination that one or more terms in the first NL input require clarification, simultaneously generating and displaying, in the messaging application, a textual explanation relevant to context of the data source.

6. The method of claim 1, further comprising:
   selecting an expression type for the first NL input from amongst aggregation, grouping, filtering, limiting and sorting; and
   selecting and displaying a response from a pre-defined template of responses based on the expression type.

7. The method of claim 1, wherein generating and displaying the snapshot of the data chart comprises:
   in accordance with a determination that a response to the input query requires a single answer, displaying the single answer in the messaging application.

8. The method of claim 1, further comprising:
   identifying intent for the first NL input based on detecting at least one predetermined term for:
      (i) starting a new conversation;
      (ii) comparing two values in a field;
      (iii) providing a clarifying response; or
      (iv) providing a specific visualization type; and
   generating the intermediate NL response, the input query, the first NL output, and/or the snapshot of the data chart, further based on the intent.

9. The method of claim 1, wherein parsing the tokens comprises resolving the tokens as data attributes and values, intent lexicons, or modifiers.

10. The method of claim 1, wherein:
generating and displaying the intermediate NL response comprises providing one or more affordances that correspond to alternatives for resolving ambiguity in the underspecified utterance and/or the ambiguous utterance; and
receiving the user input comprises receiving a selection of the one or more affordances corresponding to an alternative that resolves ambiguity in the underspecified utterance and/or the ambiguous utterance.

11. The method of claim 1, wherein:
generating and displaying the intermediate NL response comprises providing missing information in the underspecified utterance and/or the ambiguous utterance, to create a valid query against the data source; and
receiving the user input comprises receiving a confirmation that the missing information fills in for underspecified information in the underspecified utterance and/or the ambiguous utterance.

12. An electronic device, comprising:
one or more processors;
memory; and
one or more programs, wherein the one or more programs are stored in the memory and configured to be executed by the one or more processors, the one or more programs including instructions for:
  receiving a first natural language (NL) input directed to a data source, in an interface of a messaging application, wherein (i) the messaging application supports multiple concurrent analytical conversations, (ii) each analytical conversation is managed as a separate thread with its own analytical context, and (iii) the first NL input is received in a first conversation thread of a plurality of conversation threads of the messaging application;
  parsing the first NL input into tokens based on a grammar and the data source;
  determining that the first NL input includes an underspecified utterance and/or an ambiguous utterance, wherein the underspecified utterance omits information for creating a valid query and the ambiguous utterance specifies multiple ways in which the first NL input can be interpreted;
  generating and displaying, in the messaging application, an intermediate NL response, based on the tokens and an analytical context of the first conversation thread in which the first NL input was received;
  receiving a user input that provides information for clarifying the underspecified utterance and/or the ambiguous utterance;
  in response to receiving the user input:
    generating an input query based on the user input and the analytical context of the first conversation thread; and
    querying the data source using the input query, including restricting the querying to the analytical context of the first conversation thread in which the first NL input was received, to obtain a result set;
    generating and displaying a first NL output and a snapshot of a data chart, in the messaging application, based on the result set and within the first conversation thread corresponding to the analytical conversation, wherein the snapshot of the data chart is generated as an interactive image embedded inline within in the first conversation thread, wherein the interactive image comprises one or more user-selectable widgets for modifying the data chart, and wherein user interaction with the one or more user-selectable widgets triggers updates to the data chart within the first conversation thread;
  receiving a second NL input directed to the same data source, in the first conversation thread;
  detecting an anaphora in the second NL input, the anaphora comprising a linguistic element in the second NL input that refers back to a prior utterance in the first conversation thread; and
  in response to detecting the anaphora:
    in accordance with a determination that the anaphora corresponds to a follow-up utterance, generating and displaying a second NL output in the same first conversation thread as the first NL output; and
    in accordance with a determination that the anaphora corresponds to a reset utterance, identifying a break in conversational flow where the analytical context should be reset, and generating and displaying a second NL output in a second conversation thread different from the first conversation thread.

13. The electronic device of claim 12, wherein the one or more programs further comprise instructions for:
receiving a third second NL input directed to the data source, in the messaging application, in response to the first NL output; and
in accordance with a determination that the third second NL input corresponds to a follow-up question, generating and displaying an NL response to the follow-up question, in the messaging application, as a new thread.

14. A non-transitory computer readable storage medium storing one or more programs configured for execution by an electronic device with a display, the one or more programs comprising instructions for:
  receiving a first natural language (NL) input directed to a data source, in an interface of the messaging application, wherein (i) the messaging application supports multiple concurrent analytical conversations, (ii) each analytical conversation is managed as a separate thread with its own analytical context, and (iii) the first NL input is received in a first conversation thread of a plurality of conversation threads of the messaging application;
  parsing the first NL input into tokens based on a grammar and the data source;
  determining that the first NL input includes an underspecified utterance and/or an ambiguous utterance, wherein the underspecified utterance omits information for creating a valid query and the ambiguous utterance specifies multiple ways in which the first NL input can be interpreted;
  generating and displaying, in the messaging application, an intermediate NL response, based on the tokens and an analytical context of the first conversation thread in which the first NL input was received;
  receiving a user input that provides information for clarifying the underspecified utterance and/or the ambiguous utterance;
  in response to receiving the user input:
    generating an input query based on the user input and the analytical context of the first conversation thread; and querying the data source using the input query, including restricting the querying to the analytical context of the first conversation thread in which the first NL input was received, to obtain a result set;

generating and displaying a first NL output and a snapshot of a data chart, in the messaging application, based on the result set and within the first conversation thread corresponding to the analytical conversation, wherein the snapshot of the data chart is generated as an interactive image embedded inline within the first conversation thread, wherein the interactive image comprises one or more user-selectable widgets for modifying the data chart, and wherein user interaction with the one or more user-selectable widgets triggers updates to the data chart within the first conversation thread;

receiving a second NL input directed to the same data source, in the first conversation thread;

detecting an anaphora in the second NL input, the anaphora comprising a linguistic element in the second NL input that refers back to a prior utterance in the first conversation thread; and in response to detecting the anaphora:

in accordance with a determination that the anaphora corresponds to a follow-up utterance, generating and displaying a second NL output in the same first conversation thread as the first NL output; and in accordance with a determination that the anaphora corresponds to a reset utterance, identifying a break in conversational flow where the analytical context should be reset, and generating and displaying a second NL output in a second conversation thread different from the first conversation thread.

* * * * *